US010889499B2

(12) United States Patent
Bao et al.

(10) Patent No.: US 10,889,499 B2
(45) Date of Patent: Jan. 12, 2021

(54) DEGRADABLE CONJUGATED POLYMERS

(71) Applicant: The Board of Trustees of the Leland Stanford Junior University of the General Counsel, Stanford, CA (US)

(72) Inventors: Zhenan Bao, Stanford, CA (US); Ting Lei, Palo Alto, CA (US)

(73) Assignee: The Board of Trustees of the Leland Stanford Junior University Office of the General Counsel, Stanford, CA (US)

( * ) Notice: Subject to any disclaimer, the term of this patent is extended or adjusted under 35 U.S.C. 154(b) by 341 days.

(21) Appl. No.: 15/779,380

(22) PCT Filed: Nov. 22, 2016

(86) PCT No.: PCT/IB2016/057029
§ 371 (c)(1),
(2) Date: May 25, 2018

(87) PCT Pub. No.: WO2017/089952
PCT Pub. Date: Jun. 1, 2017

(65) Prior Publication Data
US 2018/0346336 A1 Dec. 6, 2018

Related U.S. Application Data

(60) Provisional application No. 62/260,350, filed on Nov. 27, 2015.

(30) Foreign Application Priority Data

Jan. 11, 2016 (EP) ..................................... 16150727

(51) Int. Cl.
*C01B 32/172* (2017.01)
*C08G 61/12* (2006.01)
*C01B 32/17* (2017.01)
*C08G 73/00* (2006.01)
*B01D 15/16* (2006.01)
(Continued)

(52) U.S. Cl.
CPC .......... *C01B 32/172* (2017.08); *B01D 15/165* (2013.01); *B01F 17/005* (2013.01);
(Continued)

(58) Field of Classification Search
CPC ... C01B 32/172; C01B 32/17; C01B 2202/02; C01B 2202/22; C01B 32/159;
(Continued)

(56) References Cited

U.S. PATENT DOCUMENTS 9,938,149 B1 * 4/2018 Gopalan ............. C09D 179/04
2012/0104328 A1 5/2012 Park et al.

OTHER PUBLICATIONS

Lei, et al., Removable and Recyclable Conjugated Polymers for Highly Selective and High-Yield Dispersion and Release of Low-Cost Carbon Nanotubes, J. Am. Chem. Soc. 2016; 138: 802-805 (Year: 2016).*

(Continued)

*Primary Examiner* — Daniel C. McCracken
(74) *Attorney, Agent, or Firm* — Oblon, McClelland, Maier & Neustadt, L.L.P.

(57) ABSTRACT

A polymer comprising at least one unit of the formula (1) wherein $T^1$ is a carbon atom or a nitrogen atom, $T^2$ is a carbon atom if $T^1$ is a nitrogen atom, or is a nitrogen atom if $T^1$ is a carbon atom, r is 1, 2, 3 or 4, s is 1, 2, 3, or 4, $M^1$ is preferably selected from the group consisting of $M^2$ is preferably The polymers are prepared by reacting monomers (1a) with monomers (2a) $H_2N$-[-$M^1$-]r-$NH_2$ (1a) OHC-[-$M^2$-]s-CHO (2a) or the step of reacting monomers (1b) with monomers (2b) OHC-[-$M^1$-]r-CHO (1b) $H_2N$-[-$M^2$-]s-$NH_2$ (2b).

formula (1)

$$\{=T^1+M^1\}_r T^1=T^2+M^2\}_s T^2=\}$$ (1)

7 Claims, 11 Drawing Sheets

(51) Int. Cl.
*B01F 17/00* (2006.01)
*C08G 12/08* (2006.01)
(52) U.S. Cl.
CPC .......... *B01F 17/0057* (2013.01); *C01B 32/17* (2017.08); *C08G 12/08* (2013.01); *C08G 61/12* (2013.01); *C08G 61/124* (2013.01); *C08G 61/126* (2013.01); *C08G 73/00* (2013.01); *C01B 2202/02* (2013.01); *C01B 2202/22* (2013.01); *C08G 2261/3223* (2013.01); *C08G 2261/334* (2013.01); *C08G 2261/344* (2013.01); *C08G 2261/73* (2013.01); *C08G 2261/964* (2013.01)

(58) Field of Classification Search
CPC .... C08G 61/124; C08G 61/126; C08G 61/12; C08G 73/00; C08G 12/08; C08G 2261/73; C08G 2261/334; C08G 2261/964; C08G 2261/3223; C08G 2261/344; B01D 15/165; B01F 17/005; B01F 17/0057; C08J 11/24; C08K 3/04; C08K 7/06; C08K 7/24; C08L 79/00
See application file for complete search history.

(56) References Cited

OTHER PUBLICATIONS

Wang, et al., Degradable Conjugated Polymers: Synthesis and Applications in Enrichment of Semiconducting Single-Walled Carbon Nanotubes, Adv. Funct. Mater. 2011; 21: 1643-1651 (Year: 2011).*

Wang. et. al., Conjugated polymer sorting of semiconducing carbon nanotubes and their electronic applicaiotns, Nano Today 2015; 10: 737-758 (Year: 2015).*

International Search Report dated Feb. 10, 2017, in PCT/IB2016/057029 filed Nov. 22, 2016.

International Preliminary Report on Patentability dated Nov. 7, 2017, in PCT/IB2016/057029 filed Nov. 22, 2016.

T. Lei et al., "Removable and Recyclable Conjugated Polymers for Highly Selective and High-Yield Dispersion and Release of Low-Cost Carbon Nanotubes", Journal of the American Chemical Society, vol. 138, No. 3, Jan. 2016, pp. 802-805, with supporting information (17 pages).

P. Gerstel et al., "Highly Selective Dispersion of Single-Walled Carbon Nanotubes via Polymer Wrapping: A Combinatorial Study via Modular Conjugation", ACS Macro Letters / American Chemical Society, vol. 3, No. 1, Jan. 2014, pp. 10-15.

N. Giuseppone et al., "Tunable Fluorene-Based Dynamers through Constitutional Dynamic Chemistry", Chemistry—A European Journal, vol. 12, No. 6, Feb. 2006, pp. 1723-1735.

F. Lemasson et al., "Debundling, selection and release of SWNTs using fluorene-based photocleavable polymers", Chemical Communication—CHEMCOM, vol. 47, No. 26, Jan. 2011, pp. 7428-7430.

WZ Wang et al., "Degradable Conjugated Polymers: Synthesis and Applications in Enrichment of Semiconducting Single-Walled Carbon Nanotubes", Advanced Functional Materials, vol. 21, No. 9, May 2011, pp. 1643-1651.

T. Lei et al., "Dispersion of High-Purity Semiconducting Arc-Discharged Carbon Nanotubes Using Backbone Engineered Diketopyrrolopyrrole (DPP)-Based Polymers", Advanced Electronic Materials, vol. 2, No. 1, Oct. 2016, 8 pages.

* cited by examiner

Figure 1  Thermogravimetric analyses (TGA) of PDPP-PD (5% loss, 404 °C) and PF-PD (5% loss, 400 °C).

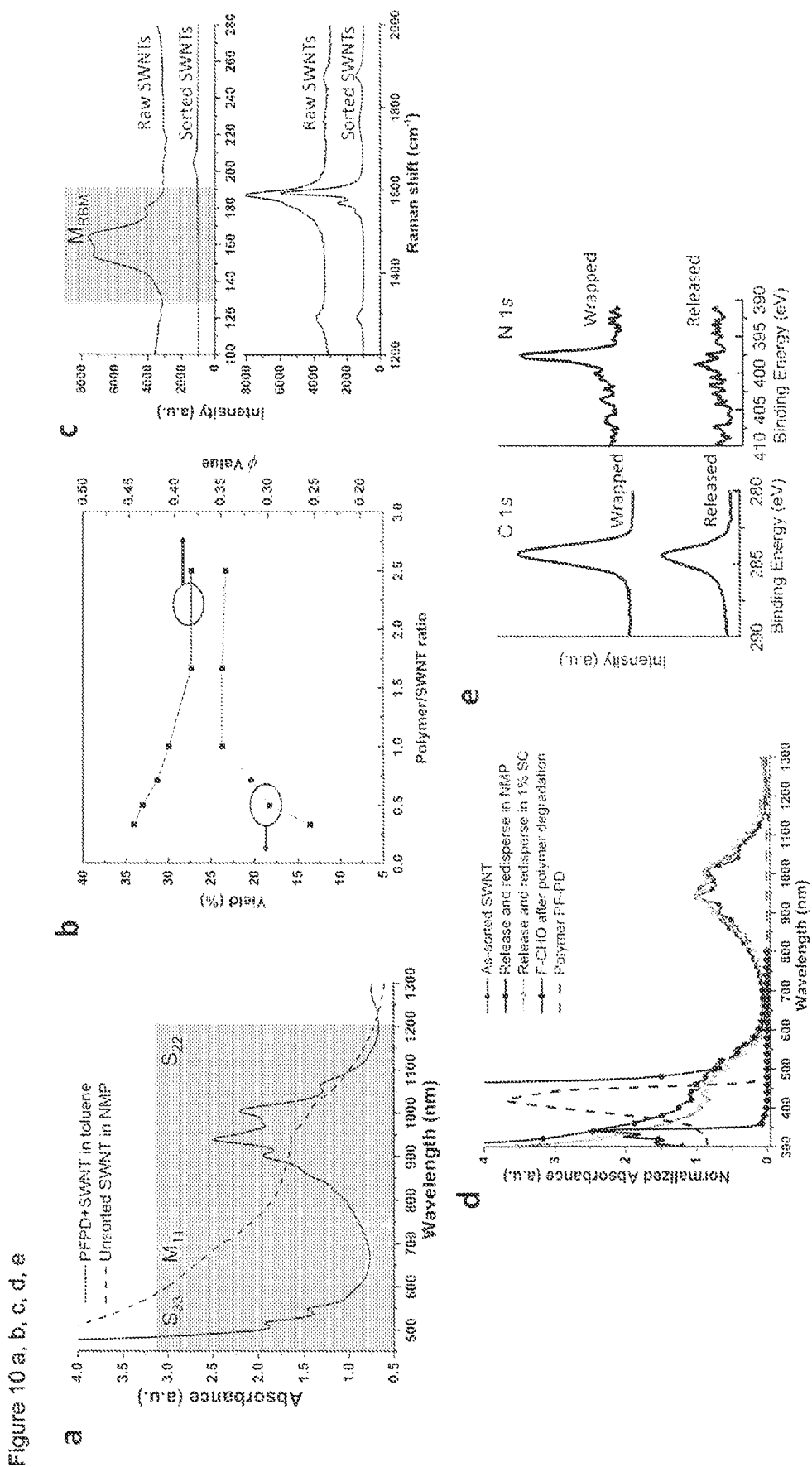
Figure 10 a, b, c, d, e

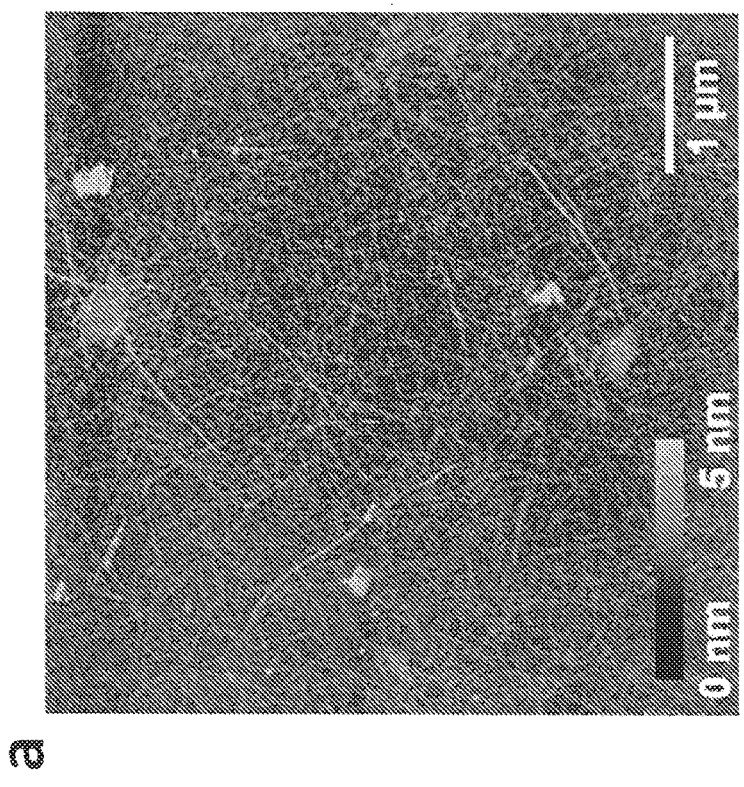
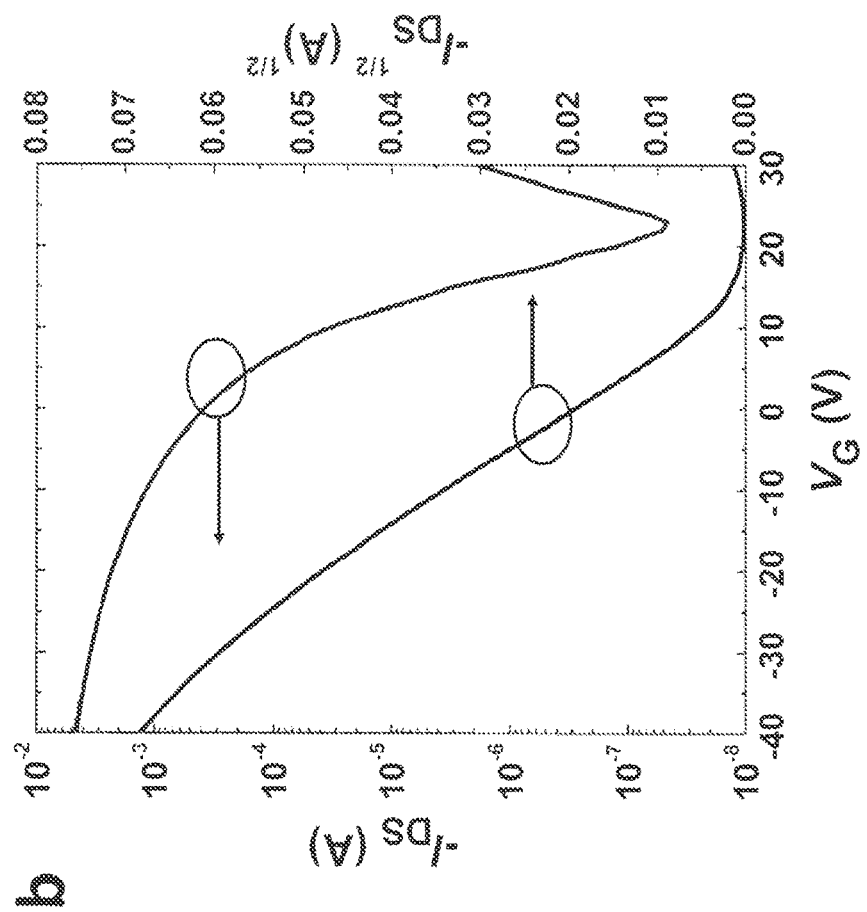
Figure 11 a, b

DEGRADABLE CONJUGATED POLYMERS

The present invention relates to degradable conjugated polymers, a process for preparing the degradable conjugated polymers from monomers, and a process for separating semiconducting single-walled carbon nanotubes from a mixture of semiconducting and metallic single-walled carbon nanotubes using the degradable conjugated polymers as dispersing agents.

Single-walled carbon nanotubes (SWNTs) show metallic or semiconducting properties depending on tube diameter and wrapping angle. A number of applications for SWNTs such as organic photovoltaic (OPV) devices and organic field effect transistors (OFETs) specifically require semiconducting SWNTs with minimal metallic SWNTs impurities. Unfortunately, all current growth methods for SWNTs such as arc discharge or laser ablation produce mixtures of semiconducting and metallic SWNTs.

Several methods of separating semiconducting SWNTs and metallic SWNTs are known, but most of them are not yet suitable for large-scale technological processes. An efficient method relies on dispersing semiconducting SWNTs and metallic SWNTs with polymer, followed by centrifugation.

Nish, A.; Hwang, J.-Y.; Doig, J.; Nicholas, R. J. Nat. Nano 2007, 2, 640-646 describe several polymers and copolymers comprising fluorene units as dispersants for SWNTs. Poly (9,9-diocylfluorenyl-2,7-diyl) (PFO) as dispersant shows the highest selectivity.

Berton, N.; Lemasson, F.; Tittmann, J.; Stürz l, N.; Hennrich, F.; Kappes, M. M.; Mayor, M. Chem. Mat. 2011, 23, 2237-2249 describe several copolymers comprising either fluorene or carbazole units separated by naphthalene, anthracene and anthraquinone spacer as dispersants for SWNTs.

Tange, M.; Okazaki, T.; Iijima, S. J. Am. Chem. Soc. 2011, 133, 11908-11911 describe poly(9,9-diocylfluorene-alt-benzothiadiazole) (F8BT) and poly(9,9-di-n-dodecylfluorene) (PFD) as dispersants for SWNTs. In particular, F8BT selectively separates large (>1.3 nm) diameter SWNTs.

Akazaki, K.; Toshimitsu, F.; Ozawa, H.; Fujigaya T.; Nakashima, N. J. Am. Chem. Soc. 2012, 134, 12700-12707 describe 12 copolymers (9,9-dioctylfluorene-2,7-diyl)$_x$ ((R)- or (S)-2,2'-dimethoxy-1,1'-binaphthalen-6,6-diyl)$_y$, where x and y are copolymer composition ratios, as dispersant for SWNTs.

Jakubka, F.; Schiessl, S. P.; Martin, S.; Englert, J. M.; Hauke, F.; Hirsch A., Zaumseil, J. ACS Marco Lett. 2012, 1, 815-819 describe poly(9,9-dioctylfluorene) and poly(9,9-dioctylfluorene-co-benzothiadiazole) as dispersants for SWNTs.

Misty, K. S.; Larsen, B. A.; Blackburn, J. L. ACS Nano 2013, 7, 2231-2239 describe poly[(9,9-dioctylfluorenyl-2,7-diyl)-alt-co-(6,6'-(2,2'-bipyridine))] and poly[(9,9-dihexylfluorenyl-2,7-diyl)-co-(9,10-anthracene)] as dispersants for laser vaporization SNWTs with average diameter of 1.3 nm.

Qian, L.; Xu, W.; Fan, X.; Wang, C.; Zhang, J.; Zhao, J.; Cui, Z. J. Phys. Chem. 2013, C117, 18243-18250 describe 9,9-dioctylfluorene-co-bithiophene as dispersant for SWNTs in order to selectively separate large diameter SWNTs from commercial arc discharge SWNTs.

Wang, H.; Mei, J.; Liu, P.; Schmidt, K.; Jimenez-Oses, G.; Osuna, S.; Fang, L.; Tassone, C. T.; Zoombelt, A. P.; Sokolov, A. N.; Houk K. N.; Toney, M. F.; Bao, Z. ACS Nano 2013, 7, 2659-2668 describe poly(dithiafulvalene-fluorene-co-m-thiophene) as dispersants for separating semiconducting SWNTs from arc-discharged 1.1-1.8 nm SWNTs.

Berton, N.; Lemasson, F.; Poschlad, A.; Meded, V.; Tristram F.; Wenzel, W.; Hennrich, F.; Kappes, M. M.; Mayor, M. Small 2014, 10, 360-367 describe poly(fluorene-alt-pyridine) copolymers each with 2,7-fluorene units but varying by the connectivity of the pyridyl group as well as a poly(carbazole-alt-pyridine) copolymer as dispersant for SWNTs to selectively separate large (>1 nm and up to 1.3 nm) diameter SWNTs.

Semiconducting polymers as dispersant for SWNTs in separation processes based on centrifugation are particularly useful, as the product of the centrifugation process comprising the semiconducting polymer and the semiconducting SWNT can be used directly in the preparation of organic devices such as organic field effect transistors (OFETs).

Lee, H. W.; Yoon, Y.; Park, S.; Oh, J. H.; Hong, S.; Liyanage, L. S.; Wan, H.; Morishita, S.; Patil, N.; Park, Y. J.; Park, J. J.; Spakowitz, A.; Galli, G., Gygi, F.; Wong, P. H.-S.; Tok, J. B.-H.; Kim, J. M.; Bao, Z. Nat. Commun. 2011, 2, 541-548 describe regioregular poly(3-alkylthiophene), which is commonly used as semiconducting material in organic electronic devices such as organic field effect transistors (OFETs), as dispersant for SWNTs. A transistor is described comprising regioregular poly(3-alkylthiophene) and semiconducting SWNT.

US 2012/0104328 describes a polythiophene derivative including a thiophene ring and a hydro-carbon sidechain linked to the thiophene ring. A transistor is described comprising the polythiophene derivative and semiconducting SWNTs.

Smithson, C; Wu, Y.; Wigglesworth, T.; Gardner, S.; Thu, S.; Nie H.-Y. Organic Electronics 2014, 15, 2639-2646 describe the fabrication of an organic thin film transistor using a semiconductor copolymer of diketopyrrolopyrrole-quaterthiophene and unsorted SWNTs.

Conjugated polymers have been intensively studied for enriching s-SWNTs, because they extract s-SWNT via simple sonication and centrifuge steps within a few hours. In addition, conjugated polymers with certain molecular design can selectively extract a specific chirality (n, m) of semiconducting SWNTs. Although conjugated polymer wrapping provides a fast, low-cost and scalable method for s-SWNT separation, this method has two major drawbacks: (1) the purified s-SWNTs retain many conjugated polymers on their surface. The removal of the conjugated polymers is difficult due to the tight polymer wrapping and strong polymer/SWNT interactions. (2) Usually a similar amount of conjugated polymers are used for SWNT separation. However, the price of the conjugated polymers are comparable and even higher than that of the SWNTs, e.g. poly(9, 9-di-n-dodecylfluorenyl-2,7-diyl) (PFDD), a widely used polymer for SWNT sorting, is $364.50/500 mg; whereas plasma SWNTs with 30% purity are $10/g, and arc-discharged SWNTs with ~30% purity are $35/g. Thus, conjugated polymers account for a significant amount of the costs for this method. To address these issues, three strategies have been developed: (1) releasing SWNTs using conformational variable polymers; (2) employing non-covalently linked supramolecular polymers, which can degrade into small units using excessive acid; (3) non-irreversible degrading polymers into small units. Strategy (1) requires specific design for polymer structure and has not been demonstrated with good selectivity for s-SWNTs. In strategy (2), supramolecular polymers usually requires expensive and complex non-covalent bonding moieties, and they usually form polymers in situ with variable molecular weights for different concentrations. In addition, this strategy also needs an excessive amount of acid to degrade the polymers, and the acid may act as a dopant for SWNTs. Strategy (3) is destructive and the degraded monomers cannot be recycled. Thus, an ideal conjugated polymer used for SWNT sorting should be low-cost, removable, recyclable, high-selectivity and less damage to SWNTs. However, it is challenging to fulfill all these criteria.

It was the object of the present invention to provide degradable conjugated polymers suitable as dispersants for separating semiconducting single-walled carbon nanotubes from a mixture of semiconducting and metallic single-walled carbon nanotubes. In particular, the degradable polymers should be easy to synthesize and should be non-irreversibly degradable into small units.

This object is solved by a polymer comprising at least one unit of the formula (1)

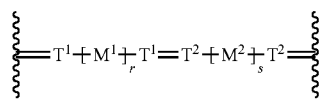

(1)

wherein $T^1$ is a carbon atom or a nitrogen atom, $T^2$ is carbon atom if $T^1$ is a nitrogen atom, or is a nitrogen atom if $T^1$ is a carbon atom, r is 1, 2, 3, or 4, s is 1, 2, 3, or 4, $M^1$ and $M^2$ are independently of each other selected from the group consisting of

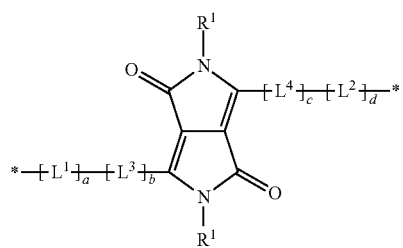

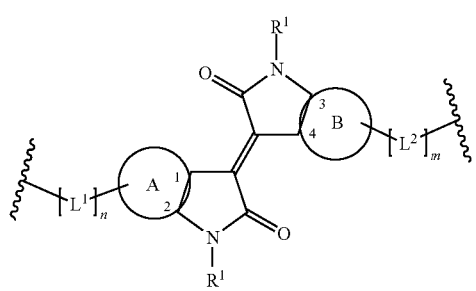

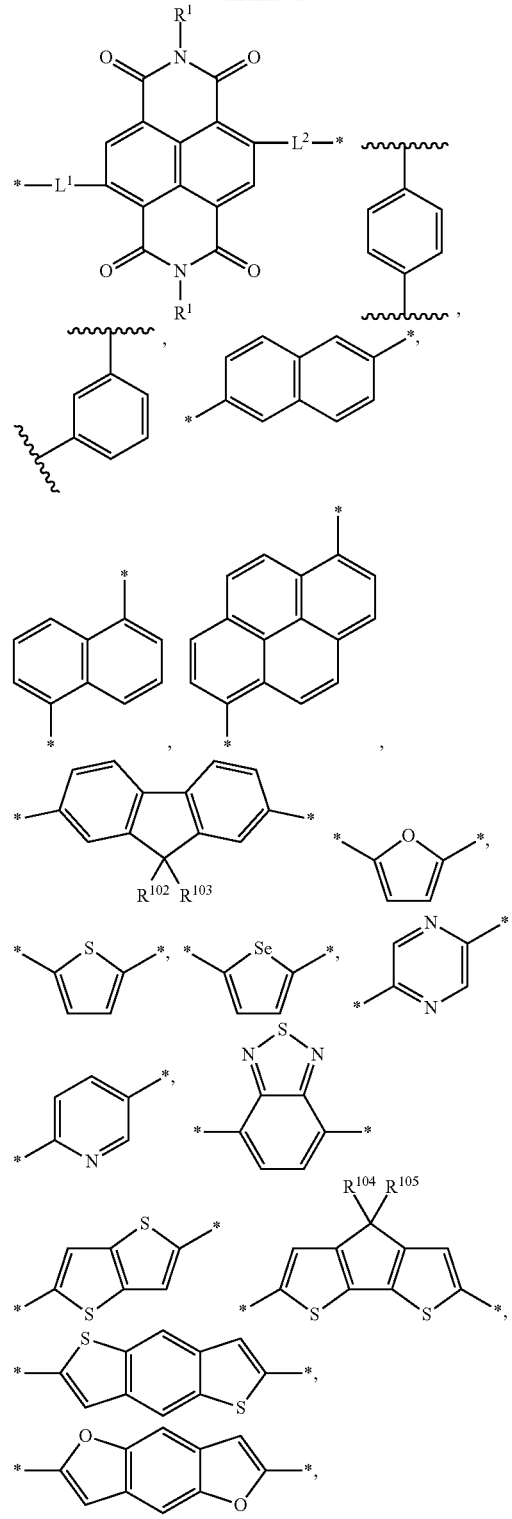

Wherein, in $M^1$ and $M^2$, b and c are independently from each other 1, 2, 3, 4, 5 or 6, a and d are independently from each other 0, 1, 2, 3 or 4, n and m are independently from each other 0, 1, 2, 3 or 4, A is selected from the group consisting of

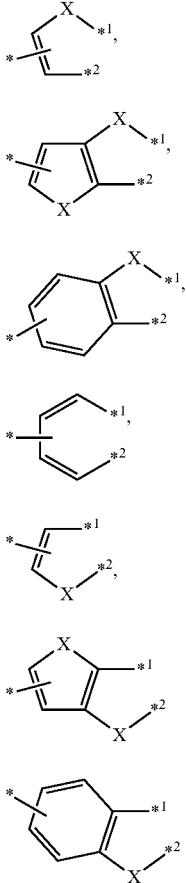

and

B is selected from the group consisting of

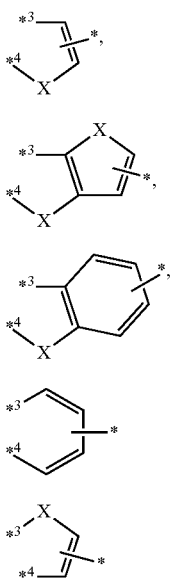

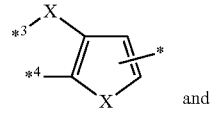

and

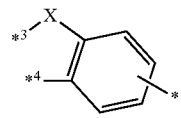

wherein

X is at each occurrence O, S, Se or $NR^1$, $M^1$ or $M^2$ can be substituted with one to four substituents $R^2$, $L^1$ and $L^2$ are independently from each other and at each occurrence selected from the group consisting of $C_{6-18}$-arylene, 5 to 20 membered heteroarylene,

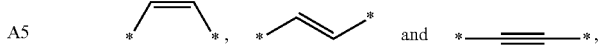

wherein $C_{6-18}$-arylene and 5 to 20 membered heteroarylene can be substituted with one to six substituents $R^3$ at each occurrence selected from the group consisting of $C_{1-30}$-alkyl, $C_{2-30}$-alkenyl, $C_{2-30}$-alkynyl, $C_{5-12}$-cycloalkyl, $C_{6-18}$-aryl and 5 to 20 membered heteroaryl, $OR^{31}$, $OC(O)—R^{31}$, $C(O)—OR^{31}$, $C(O)—R^{31}$, $NR^{31}R^{32}$, $NR^{31}—C(O)R^{32}$, $C(O)—NR^{31}R^{32}$, $N[C(O)R^{31}][C(O)R^{32}]$, $SR^{31}$, halogen, CN, $SiR^{Siv}R^{Siw}R^{Six}$ and OH, and wherein

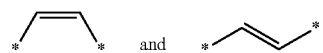

can be substituted with one or two substituents $R^4$ at each occurrence selected from the group consisting of $C_{1-30}$-alkyl, $C_{2-30}$-alkenyl, $C_{2-30}$-alkynyl, $C_{5-12}$-cycloalkyl, $C_{6-18}$-aryl and 5 to 20 membered heteroaryl, $C(O)—R^{41}$, $C(O)—NR^{41}R^{42}$, $C(O)—OR^{41}$ and CN, wherein $R^{31}$, $R^{32}$, $R^{41}$ and $R^{42}$ are independently from each other and at each occurrence selected from the group consisting of H, $C_{1-30}$-alkyl, $C_{2-30}$-alkenyl, $C_{2-30}$-alkynyl, $C_{5-12}$-cycloalkyl, $C_{6-18}$-aryl and 5 to 20 membered heteroaryl, and wherein $C_{1-30}$-alkyl, $C_{2-30}$-alkenyl and $C_{2-30}$-alkynyl can be substituted with one to ten substituents independently selected from the group consisting of $C_{5-8}$-cycloalkyl, $C_{6-14}$-aryl, 5 to 14 membered heteroaryl, $OR^i$, $OC(O)—R^j$, $C(O)—OR^i$, $C(O)—R^i$, $NR^iR^j$, $NR^i—C(O)R^j$, $C(O)—NR^iR^j$, $N[C(O)R^i][C(O)R^j]$, $SR^i$, halogen, CN, $SiR^{Siv}R^{Siw}R^{Six}$ and $NO_2$; and at least two $CH_2$-groups, but not adjacent $CH_2$-groups of $C_{1-30}$-alkyl, $C_{2-30}$-alkenyl and $C_{2-30}$-alkynyl can be replaced by O or S, $C_{5-12}$-cycloalkyl can be substituted with one to six substituents independently selected from the group consisting of $C_{1-20}$-alkyl, $C_{2-20}$-alkenyl and $C_{2-20}$-alkynyl, $C_{5-8}$-cycloalkyl, $C_{6-14}$-aryl, 5 to 14 membered heteroaryl, $OR^i$, $OC(O)-R^j$, $C(O)-OR^i$, $C(O)-R^i$, $NR^iR^j$, $NR^i-C(O)R^j$, $C(O)-NR^iR^j$, $N[C(O)R^i][C(O)R^j]$, $SR^i$, halogen, CN, $SiR^{Siv}R^{Siw}R^{Six}$ and $NO_2$; and one or two $CH_2$-groups, but not adjacent $CH_2$-groups, of $C_{5-12}$-cycloalkyl can be replaced by O, S, OC(O), CO, $NR^i$ or $NR^i-CO$, $C_{6-18}$-aryl and 5 to 20 membered heteroaryl can be substituted with one to six substituents independently selected from the group consisting of $C_{1-20}$-alkyl, $C_{2-20}$-alkenyl, $C_{2-20}$-alkynyl, $C_{5-8}$-cycloalkyl, $C_{6-14}$-aryl, 5 to 14 membered heteroaryl, $OR^i$, $OC(O)-R^j$, $C(O)-OR^i$, $C(O)-R^i$, $NR^iR^j$, $NR^i-C(O)R^j$, $C(O)-NR^iR^j$, $N[C(O)R^i][C(O)R^j]$, $SR^i$, halogen, CN, $SiR^{Siv}R^{Siw}R^{Six}$ and $NO_2$, wherein $R^{Siv}$, $R^{Siw}$, $R^{Six}$ are independently from each other selected from the group consisting of H, $C_{1-20}$-alkyl, $C_{2-20}$-alkenyl, $C_{2-20}$-alkynyl, $C_{5-6}$-cycloalkyl, phenyl and $O-Si(CH_3)_3$, $R^i$ and $R^j$ are independently selected from the group consisting of H, $C_{1-20}$-alkyl, $C_{2-20}$-alkenyl, $C_{2-20}$-alkynyl, $C_{5-8}$-cycloalkyl, $C_{6-14}$-aryl, and 5 to 14 membered heteroaryl, wherein $C_{1-20}$-alkyl, $C_{2-20}$-alkenyl and $C_{2-20}$-alkynyl can be substituted with one to five substituents selected from the group consisting of $C_{5-6}$-cycloalkyl, $C_{6-10}$-aryl, 5 to 10 membered heteroaryl, $OR^k$, $OC(O)-R^l$, $C(O)-OR^k$, $C(O)-R^k$, $NR^kR^l$, $NR^k-C(O)R^l$, $C(O)-NR^kR^l$, $N[C(O)R^k][C(O)R^l]$, $SR^k$, halogen, CN, and $NO_2$;

$C_{5-8}$-cycloalkyl can be substituted with one to five substituents selected from the group consisting of $C_{1-10}$-alkyl, $C_{2-10}$-alkenyl, $C_{2-10}$-alkynyl, $C_{5-6}$-cycloalkyl, $C_{6-10}$-aryl, 5 to 10 membered heteroaryl, $OR^k$, $OC(O)-R^l$, $C(O)-OR^k$, $C(O)-R^k$, $NR^kR^l$, $NR^k-C(O)R^l$, $C(O)-NR^kR^l$, $N[C(O)R^k][C(O)R^l]$, $SR^k$, halogen, CN, and $NO_2$;

$C_{6-14}$-aryl and 5 to 14 membered heteroaryl can be substituted with one to five substituents independently selected from the group consisting of $C_{1-10}$-alkyl, $C_{2-10}$-alkenyl, $C_{2-10}$-alkynyl, $C_{5-6}$-cycloalkyl, $C_{6-10}$-aryl, 5 to 10 membered heteroaryl, $OR^k$, $OC(O)-R^l$, $C(O)-OR^k$, $C(O)-R^k$, $NR^kR^l$, $NR^k-C(O)R^l$, $C(O)-NR^kR^l$, $N[C(O)R^k][C(O)R^l]$, $SR^k$, halogen, CN, and $NO_2$;

wherein $R^k$ and $R^l$ are independently selected from the group consisting of H, $C_{1-10}$-alkyl, $C_{2-10}$-alkenyl and $C_{2-10}$-alkynyl, wherein $C_{1-10}$-alkyl, $C_{2-10}$-alkenyl and $C_{2-10}$-alkynyl can be substituted with one to five substituents selected from the group consisting of halogen, CN and $NO_2$.

$L^3$ and are $L^4$ are independently from each other and at each occurrence selected from the group consisting of $C_{6-18}$-arylene and 5 to 20 membered heteroarylene wherein $C_{6-18}$-arylene and 5 to 20 membered heteroarylene can be substituted with one to six substituents $R^9$ at each occurrence selected from the group consisting of $C_{1-30}$-alkyl, $C_{2-30}$-alkenyl, $C_{2-30}$-alkynyl, $C_{5-12}$-cycloalkyl, $C_{6-18}$-aryl and 5 to 20 membered heteroaryl, $OR^{91}$, $OC(O)-R^{91}$, $C(O)-OR^{91}$, $C(O)-R^{91}$, $NR^{91}R^{92}$, $NR^{91}-C(O)R^{92}$, $C(O)-NR^{91}R^{92}$, $N[C(O)R^{91}][C(O)R^{92}]$, $SR^{91}$, halogen, CN, $SiR^{Siy}R^{Siz}R^{Siaa}$ and OH, and wherein $R^{91}$ and $R^{92}$ are independently from each other and at each occurrence selected from the group consisting of H, $C_{1-30}$-alkyl, $C_{2-30}$-alkenyl, $C_{2-30}$-alkynyl, $C_{5-12}$-cycloalkyl, $C_{6-18}$-aryl and 5 to 20 membered heteroaryl, and wherein $C_{1-30}$-alkyl, $C_{2-30}$-alkenyl and $C_{2-30}$-alkynyl can be substituted with one to ten substituents independently selected from the group consisting of $C_{5-8}$-cycloalkyl, $C_{6-14}$-aryl, 5 to 14 membered heteroaryl, $OR^m$, $OC(O)-R^m$, $C(O)-OR^m$, $C(O)-R^m$, $NR^mR^n$, $NR^m-C(O)R^n$, $C(O)-NR^mR^n$, $N[C(O)R^m][C(O)R^n]$, $SR^n$, halogen, CN, $SiR^{Siy}R^{Siz}R^{Siaa}$ and $NO_2$; and at least two $CH_2$-groups, but not adjacent $CH_2$-groups of $C_{1-30}$-alkyl, $C_{2-30}$-alkenyl and $C_{2-30}$-alkynyl can be replaced by O or S, $C_{5-12}$-cycloalkyl can be substituted with one to six substituents independently selected from the group consisting of $C_{1-20}$-alkyl, $C_{2-20}$-alkenyl and $C_{2-20}$-alkynyl, $C_{5-8}$-cycloalkyl, $C_{6-14}$-aryl, 5 to 14 membered heteroaryl, $OR^m$, $OC(O)-R^m$, $C(O)-OR^m$, $C(O)-R^m$, $NR^mR^n$, $NR^m-C(O)R^n$, $C(O)-NR^mR^n$, $N[C(O)R^m][C(O)R^n]$, $SR^m$, halogen, CN, $SiR^{Siy}R^{Siz}R^{Siaa}$ and $NO_2$; and one or two $CH_2$-groups, but not adjacent $CH_2$-groups, of $C_{5-12}$-cycloalkyl can be replaced by O, S, OC(O), CO, $NR^m$ or $NR^m-CO$, $C_{6-18}$-aryl and 5 to 20 membered heteroaryl can be substituted with one to six substituents independently selected from the group consisting of $C_{1-20}$-alkyl, $C_{2-20}$-alkenyl, $C_{2-20}$-alkynyl, $C_{5-8}$-cycloalkyl, $C_{6-14}$-aryl, 5 to 14 membered heteroaryl, $OR^m$, $OC(O)-R^m$, $C(O)-OR^m$, $C(O)-R^m$, $NR^mR^n$, $NR^m-C(O)R^n$, $C(O)-NR^mR^n$, $N[C(O)R^m][C(O)R^n]$, $SR^m$, halogen, CN, $SiR^{Siy}R^{Siz}R^{Siaa}$ and $NO_2$, $R^{Siy}$, $R^{Siz}$, $R^{Siaa}$ are independently from each other selected from the group consisting of H, $C_{1-20}$-alkyl, $C_{2-20}$-alkenyl, $C_{2-20}$-alkynyl, $C_{5-6}$-cycloalkyl, phenyl and $O-Si(CH_3)_3$, wherein $R^m$ and $R^n$ are independently selected from the group consisting of H, $C_{1-20}$-alkyl, $C_{2-20}$-alkenyl, $C_{2-20}$-alkynyl, $C_{5-8}$-cycloalkyl, $C_{6-14}$-aryl, and 5 to 14 membered heteroaryl, $C_{1-20}$-alkyl, $C_{2-20}$-alkenyl and $C_{2-20}$-alkynyl can be substituted with one to five substituents selected from the group consisting of $C_{5-6}$-cycloalkyl, $C_{6-10}$-aryl, 5 to 10 membered heteroaryl, $OR^o$, $OC(O)-R^o$, $C(O)-OR^o$, $C(O)-R^o$, $NR^oR^p$, $NR^o-C(O)R^p$, $C(O)-NR^oR^p$, $N[C(O)R^o][C(O)R^p]$, $SR^o$, halogen, CN, and $NO_2$;

$C_{5-8}$-cycloalkyl can be substituted with one to five substituents selected from the group consisting of $C_{1-10}$-alkyl, $C_{2-10}$-alkenyl, $C_{2-10}$-alkynyl, $C_{5-6}$-cycloalkyl, $C_{6-10}$-aryl, 5 to 10 membered heteroaryl, $OR^o$, $OC(O)-R^o$, $C(O)-OR^o$, $C(O)-R^o$, $NR^oR^p$, $NR^o-C(O)R^p$, $C(O)-NR^oR^p$, $N[C(O)R^o][C(O)R^p]$, $SR^o$, halogen, CN, and $NO_2$;

$C_{6-14}$-aryl and 5 to 14 membered heteroaryl can be substituted with one to five substituents independently selected from the group consisting of $C_{1-10}$-alkyl, $C_{2-10}$-alkenyl, $C_{2-10}$-alkynyl, $C_{5-6}$-cycloalkyl, $C_{6-10}$-aryl, 5 to 10 membered heteroaryl, $OR^o$, $OC(O)-R^o$, $C(O)-OR^o$, $C(O)-R^o$, $NR^oR^p$, $NR^o$—$C(O)R^p$, $C(O)$—$NR^oR^p$, $N[C(O)R^o][C(O)R^p]$, $SR^o$, halogen, CN, and $NO_2$;
wherein
$R^o$ and $R^p$ are independently selected from the group consisting of H, $C_{1-10}$-alkyl, $C_{2-10}$-alkenyl and $C_{2-10}$-alkynyl,
wherein
$C_{1-10}$-alkyl, $C_{2-10}$-alkenyl and $C_{2-10}$-alkynyl can be substituted with one to five substituents selected from the group consisting of halogen, CN and $NO_2$.
$R^1$ is at each occurrence selected from the group consisting of $C_{1-100}$-alkyl, $C^{2-100}$-alkenyl, $C^{2-100}$-alkynyl, $C_{5-12}$-cycloalkyl, $C_{6-18}$-aryl, a 5 to 20 membered heteroaryl, $C(O)$—$C_{1-100}$-alkyl, $C(O)$-$C_{5-12}$-cycloalkyl and $C(O)$—$OC_{1-100}$-alkyl,
wherein
$C_{1-100}$-alkyl, $C^{2-100}$-alkenyl and $C^{2-100}$-alkynyl can be substituted with one to fourty substituents independently selected from the group consisting of $C_{5-8}$-cycloalkyl, $C_{6-14}$-aryl, 5 to 14 membered heteroaryl, $OR^a$, $OC(O)$—$R^a$, $C(O)$—$OR^a$, $C(O)$—$R^a$, $NR^aR^b$, $NR^a$—$C(O)R^b$, $C(O)$—$NR^aR^b$, $N[C(O)R^a][C(O)R^b]$, $SR^a$, $Si(R^{Sia})(R^{Sib})(R^{Sic})$, —$O$—$Si(R^{Sia})(R^{Sib})(R^{Sic})$, halogen, CN, and $NO_2$; and at least two $CH_2$-groups, but not adjacent $CH_2$-groups, of $C_{1-100}$-alkyl, $C^{2-100}$-alkenyl and $C^{2-100}$-alkynyl can be replaced by O or S,
$C_{5-12}$-cycloalkyl can be substituted with one to six substituents independently selected from the group consisting of $C_{1-60}$-alkyl, $C_{2-60}$-alkenyl, $C_{2-60}$-alkynyl, $C_{5-8}$-cycloalkyl, $C_{6-14}$-aryl, 5 to 14 membered heteroaryl, $OR^a$, $OC(O)$—$R^a$, $C(O)$—$OR^a$, $C(O)$—$R^a$, $NR^aR^b$, $NR^a$—$C(O)R^b$, $C(O)$—$NR^aR^b$, $N[C(O)R^a][C(O)R^b]$, $SR^a$, $Si(R^{Sia})(R^{Sib})(R^{Sic})$, —$O$—$Si(R^{Sia})(R^{Sib})(R^{Sic})$, halogen, CN, and $NO_2$; and one or two $CH_2$-groups, but not adjacent $CH_2$-groups, of $C_{5-12}$-cycloalkyl can be replaced by O, S, OC(O), CO, $NR^a$ or $NR^a$—CO,
$C_{6-18}$-aryl and 5 to 20 membered heteroaryl can be substituted with one to six substituents independently selected from the group consisting of $C_{1-60}$-alkyl, $C_{2-60}$-alkenyl, $C_{2-60}$-alkynyl, $C_{5-8}$-cycloalkyl, $C_{6-14}$-aryl, 5 to 14 membered heteroaryl, $OR^a$, $OC(O)$—$R^a$, $C(O)$—$OR^a$, $C(O)$—$R^a$, $NR^aR^b$, $NR^a$—$C(O)R^b$, $C(O)$—$NR^aR^b$, $N[C(O)R^a][C(O)R^b]$, $SR^a$, $Si(R^{Sia})(R^{Sib})(R^{Sic})$, —$O$—$Si(R^{Sia})(R^{Sib})(R^{Sic})$, halogen, CN, and $NO_2$,
wherein
$R^a$ and $R^b$ are independently selected from the group consisting of H, $C_{1-60}$-alkyl, $C_{2-60}$-alkenyl, $C^{2-60}$-alkynyl, $C_{5-8}$-cycloalkyl, $C_{6-14}$-aryl and 5 to 14 membered heteroaryl,
$R^{Sia}$, $R^{Sib}$ and $R^{Sic}$ are independently selected from the group consisting of H, $C_{1-60}$-alkyl, $C_{2-60}$-alkenyl, $C^{2-60}$-alkynyl, $C_{5-8}$-cycloalkyl, $C_{6-14}$-aryl, 5 to 14 membered heteroaryl, $O$—$C_{1-60}$-alkyl, $O$—$C^{2-60}$-alkenyl, $O$—$C^{2-60}$-alkynyl, $O$—$C_{5-8}$-cycloalkyl, $O$—$C_{6-14}$-aryl, O-5 to 14 membered heteroaryl, —$[O$—$SiR^{Sid}R^{Sie}]_o$—$R^{Sif}$, $NR^5R^6$, halogen and $O$—$C(O)$—$R^5$,
wherein
o is an integer from 1 to 50,
$R^{Sid}$, $R^{Sie}$, $R^{Sif}$ are independently selected from the group consisting of H, $C_{1-60}$-alkyl, $C_{2-60}$-alkenyl, $C^{2-60}$-alkynyl, $C_{5-8}$-cycloalkyl, $C_{6-14}$-aryl, 5 to 14 membered heteroaryl, $O$—$C_{1-60}$-alkyl, $O$—$C_{2-60}$-alkenyl, $O$—$C_{2-60}$-alkynyl, $O$—$C_{5-8}$-cycloalkyl, $O$—$C_{6-14}$-aryl, O-5 to 14 membered heteroaryl, —$[O$—$SiR^{Sig}R^{Sih}]_p$—$R^{Sii}$, $NR^{50}R^{60}$, halogen and $O$—$C(O)$—$R^{50}$;
wherein
p is an integer from 1 to 50,
$R^{Sig}$, $R^{Sih}$, $R^{Sii}$ are independently selected from the group consisting of H, $C_{1-30}$-alkyl, $C_{2-30}$-alkenyl, $C_{2-30}$-alkynyl, $C_{5-6}$-cycloalkyl, $C_{6-10}$-aryl, 5 to 10 membered heteroaryl, $O$—$C_{1-30}$-alkyl, $O$—$C_{2-30}$-alkenyl, $O$—$C_{2-30}$-alkynyl, $O$—$C_{5-6}$-cycloalkyl, $O$—$C_{6-10}$-aryl, O-5 to 10 membered heteroaryl, $O$—$Si(CH_3)_3$, $NR^{500}R^{600}$, halogen and $O$—$C(O)$—$R^{500}$,
$R^5$, $R^6$, $R^{50}$, $R^{60}$, $R^{500}$ and $R^{600}$ are independently selected from the group consisting of H, $C_{1-60}$-alkyl, $C_{2-60}$-alkenyl, $C_{2-60}$-alkynyl, $C_{5-8}$-cycloalkyl, $C_{6-14}$-aryl, and 5 to 14 membered heteroaryl,
$C_{1-60}$-alkyl, $C^{2-60}$-alkenyl and $C^{2-60}$-alkynyl can be substituted with one to twenty substituents selected from the group consisting of $C_{5-6}$-cycloalkyl, $C_{6-10}$-aryl, $OR^c$, $OC(O)$—$R^c$, $C(O)$—$OR^c$, $C(O)$—$R^c$, $NR^cR^d$, $NR^c$—$C(O)R^d$, $C(O)$—$NR^cR^d$, $N[C(O)R^c][C(O)R^d]$, $SR^c$, $Si(R^{Sij})(R^{Sik})(R^{Sil})$, —$O$—$Si(R^{Sij})(R^{Sik})(R^{Sil})$halogen, CN, and $NO_2$; and at least two $CH_2$-groups, but not adjacent $CH_2$-groups, of $C_{1-60}$-alkyl, $C_{2-60}$-alkenyl and $C_{2-60}$-alkynyl can be replaced by O or S,
$C_{5-8}$-cycloalkyl can be substituted with one to five substituents selected from the group consisting of $C_{1-30}$-alkyl, $C_{2-30}$-alkenyl, $C_{2-30}$-alkynyl, $C_{5-6}$-cycloalkyl, $C_{6-10}$-aryl, $OR^c$, $OC(O)$—$R^c$, $C(O)$—$OR^c$, $C(O)$—$R^c$, $NR^cR^d$, $NR^c$—$C(O)R^d$, $C(O)$—$NR^cR^d$, $N[C(O)R^c][C(O)R^d]$, $SR^c$, $Si(R^{Sij})(R^{Sik})(R^{Sil})$, —$O$—$Si(R^{Sij})(R^{Sik})(R^{Sil})$, halogen, CN, and $NO_2$; and one or two $CH_2$-groups, but not adjacent $CH_2$-groups, of $C_{5-8}$-cycloalkyl can be replaced by O, S, OC(O), CO, $NR^c$ or $NR^c$—CO,
$C_{6-14}$-aryl and 5 to 14 membered heteroaryl can be substituted with one to five substituents independently selected from the group consisting of $C_{1-30}$-alkyl, $C_{2-30}$-alkenyl, $C_{2-30}$-alkynyl, $C_{5-6}$-cycloalkyl, $C_{6-10}$-aryl, $OR^c$, $OC(O)$—$R^c$, $C(O)$—$OR^c$, $C(O)$—$R^c$, $NR^cR^d$, $NR^c$—$C(O)R^d$, $C(O)$—$NR^cR^d$, $N[C(O)R^c][C(O)R^d]$, $SR^c$, $Si(R^{Sij})(R^{Sik})(R^{Sil})$, —$O$—$SiR^{Sij})(R^{Sik})(R^{Sil})$, halogen, CN and $NO_2$;
wherein
$R^c$ and $R^d$ are independently selected from the group consisting of H, $C_{1-30}$-alkyl, $C_{2-30}$-alkenyl and $C_{2-30}$-alkynyl,
$R^{Sij}$, $R^{Sik}$ and $R^{Sil}$ are independently selected from the group consisting of H, $C_{1-30}$-alkyl, $C_{2-30}$-alkenyl, $C_{2-30}$-alkynyl, $C_{5-6}$-cycloalkyl, $C_{6-10}$-aryl, 5 to 10 membered heteroaryl, $O$—$C_{1-30}$-alkyl, $O$—$C_{2-30}$-alkynyl, $O$—$C_{5-6}$-cycloalkyl, $O$—$C_{6-10}$-aryl, O-5 to 10 membered heteroaryl, —$[O$—$SiR^{Sim}R^{Sin}]_q$—$R^{Sio}$, $NR^7R^8$, halogen, and $O$—$C(O)$—$R^7$,
wherein
q is an integer from 1 to 50,
$R^{Sim}$, $R^{Sin}$, $R^{Sio}$ are independently selected from the group consisting of H, $C_{1-30}$-alkyl, $C_{2-30}$-alkenyl, $C_{2-30}$-alkynyl, $C_{5-6}$-cycloalkyl, $C_{6-10}$-aryl, 5 to 10 membered heteroaryl, $O$—$C_{1-30}$-alkyl, $O$—$C_{2-30}$-alkenyl, $O$—$C_{2-30}$-alkynyl, $O$—$C_{5-6}$-cycloalkyl, $O$—$C_{6-10}$-aryl, O-5 to 10 membered heteroaryl, —$[O$—$SiR^{Sip}R^{Siq}]_r$—$R^{Sir}$, $NR^{70}R^{80}$, halogen, and $O$-$C(O)$—$R^{70}$;

wherein
r is an integer from 1 to 50,
$R^{Sip}$, $R^{Siq}$, $R^{Sir}$ are independently selected from the group consisting of H, $C_{1-30}$-alkyl, $C_{2-30}$-alkenyl, $C_{2-30}$-alkynyl, $C_{5-6}$-cycloalkyl, $C_{6-10}$-aryl, 5 to 10 membered heteroaryl, O—$C_{1-30}$-alkyl, O—$C_{2-30}$-alkenyl, O—$C_{2-30}$-alkynyl, O—$C_{5-6}$-cycloalkyl, O-$C_{6-10}$-aryl, O-5 to 10 membered heteroaryl, O—Si(CH$_3$)$_3$, NR$^{700}$R$^{800}$, halogen and O—C(O)—R$^{700}$,
$R^7$, $R^8$, $R^{70}$, $R^{80}$, $R^{700}$ and $R^{800}$ are independently selected from the group consisting of H, $C_{1-30}$-alkyl, $C_{2-30}$-alkenyl, $C_{2-30}$-alkynyl, $C_{5-6}$-cycloalkyl, $C_{6-10}$-aryl, and 5 to 10 membered heteroaryl,
$C_{1-30}$-alkyl, $C_{2-30}$-alkenyl and $C_{2-30}$-alkynyl can be substituted with one to ten substituents selected from the group consisting of halogen, CN and NO$_2$,
$R^2$ is at each occurrence selected from the group consisting of $C_{1-30}$-alkyl, $C_{2-30}$-alkenyl, $C_{2-30}$-alkynyl, $C_{5-12}$-cycloalkyl, $C_{6-18}$-aryl, 5 to 20 membered heteroaryl, OR$^{21}$, OC(O)—R$^{21}$, C(O)—OR$^{21}$, C(O)—R$^{21}$, NR$^{21}$R$^{22}$, NR$^{21}$—C(O)R$^{22}$, C(O)—NR$^{21}$R$^{22}$, N[C(O)R$^{21}$][C(O)R$^{22}$], SR$^{21}$, halogen, CN, SiR$^{Sis}$R$^{Sit}$R$^{Siu}$ and OH,
wherein
$R^{21}$ and $R^{22}$ and are independently selected from the group consisting of H, $C_{1-30}$-alkyl, $C_{2-30}$-alkenyl, $C_{2-30}$-alkynyl, $C_{5-12}$-cycloalkyl, $C_{6-18}$-aryl and 5 to 20 membered heteroaryl, and
$C_{1-30}$-alkyl, $C_{2-30}$-alkenyl and $C_{2-30}$-alkynyl can be substituted with one to ten substituents independently selected from the group consisting of $C_{5-8}$-cycloalkyl, $C_{6-14}$-aryl, 5 to 14 membered heteroaryl, OR$^e$, OC(O)—R$^e$, C(O)—OR$^e$, C(O)—R$^e$, NR$^e$R$^f$, NR$^e$—C(O)R$^f$, C(O)—NR$^e$R$^f$, N[C(O)R$^e$][C(O)R$^f$], SR$^e$, halogen, CN, SiR$^{Sis}$R$^{Sit}$R$^{Siu}$ and NO$_2$; and at least two CH$_2$-groups, but not adjacent CH$_2$-groups, of $C_{1-30}$-alkyl, $C_{2-30}$-alkenyl and $C_{2-30}$-alkynyl can be replaced by O or S,
$C_{5-12}$-cycloalkyl can be substituted with one to six substituents independently selected from the group consisting of $C_{1-20}$-alkyl, $C_{2-20}$-alkenyl and $C_{2-20}$-alkynyl, $C_{5-8}$-cycloalkyl, $C_{6-14}$-aryl, 5 to 14 membered heteroaryl, OR$^e$, OC(O)—R$^e$, C(O)—OR$^e$, C(O)—R$^e$, NR$^e$R$^f$, NR$^e$—C(O)R$^f$, C(O)—NR$^e$R$^f$, N[C(O)R$^e$][C(O)R$^f$], SR$^e$, halogen, CN, SiR$^{Sis}$R$^{Sit}$R$^{Siu}$ and NO$_2$; and one or two CH$_2$-groups, but not adjacent CH$_2$-groups, of $C_{5-12}$-cycloalkyl can be replaced by O, S, OC(O), CO, NR$^e$ or NR$^e$—CO,
$C_{6-18}$-aryl and 5 to 20 membered heteroaryl can be substituted with one to six substituents independently selected from the group consisting of $C_{1-20}$-alkyl, $C_{2-20}$-alkenyl, $C_{2-20}$-alkynyl, $C_{5-8}$-cycloalkyl, $C_{6-14}$-aryl, 5 to 14 membered heteroaryl, OR$^e$, OC(O)—R$^e$, C(O)—OR$^e$, C(O)—R$^e$, NR$^e$R$^f$, NR$^e$—C(O)R$^f$, C(O)—NR$^e$R$^f$, N[C(O)R$^e$][C(O)R$^f$], SR$^e$, halogen, CN, SiR$^{Sis}$R$^{Sit}$R$^{Siu}$ and NO$_2$,
$R^{Sis}$, $R^{Sit}$ and $R^{Siu}$ are independently from each other selected from the group consisting of H, $C_{1-20}$-alkyl, $C_{2-20}$-alkenyl, $C_{2-20}$-alkynyl, $C_{5-6}$-cycloalkyl, phenyl and O—Si(CH$_3$)$_3$,
wherein
$R^e$ and $R^f$ are independently selected from the group consisting of H, $C_{1-20}$-alkyl, $C_{2-20}$-alkenyl, $C_{2-20}$-alkynyl, $C_{5-8}$-cycloalkyl, $C_{6-14}$-aryl, and 5 to 14 membered heteroaryl,
$C_{1-20}$-alkyl, $C_{2-20}$-alkenyl and $C_{2-20}$-alkynyl can be substituted with one to five substituents selected from the group consisting of $C_{5-6}$-cycloalkyl, $C_{6-10}$-aryl, 5 to 10 membered heteroaryl, OR$^g$, OC(O)—R$^g$, C(O)—OR$^g$, C(O)—R$^g$, NR$^g$R$^h$, NR$^g$—C(O)R$^h$, C(O)—NR$^g$R$^h$, N[C(O)R$^g$][C(O)R$^h$], SR$^g$, halogen, CN, and NO$_2$;
$C_{5-8}$-cycloalkyl can be substituted with one to five substituents selected from the group consisting of $C_{1-10}$-alkyl, $C_{2-10}$-alkenyl, $C_{2-10}$-alkynyl, $C_{5-6}$-cycloalkyl, $C_{6-10}$-aryl, 5 to 10 membered heteroaryl, OR$^g$, OC(O)—R$^g$, C(O)—OR$^g$, C(O)—R$^g$, NR$^g$R$^h$, NR$^g$—C(O)R$^h$, C(O)—NR$^g$R$^h$, N[C(O)R$^g$][C(O)R$^h$], SR$^g$, halogen, CN, and NO$_2$;
$C_{6-14}$-aryl and 5 to 14 membered heteroaryl can be substituted with one to five substituents independently selected from the group consisting of $C_{1-10}$-alkyl, $C_{2-10}$-alkenyl, $C_{2-10}$-alkynyl, $C_{5-6}$-cycloalkyl, $C_{6-10}$-aryl, 5 to 10 membered heteroaryl, OR$^g$, OC(O)—R$^g$, C(O)—OR$^g$, C(O)—R$^g$, NR$^g$R$^h$, NR$^g$—C(O)R$^h$, C(O)—NR$^g$R$^h$, N[C(O)R$^g$][C(O)R$^h$], SR$^g$, halogen, CN, and NO$_2$;
wherein
$R^g$ and $R^h$ are independently selected from the group consisting of H, $C_{1-10}$-alkyl, $C_{2-10}$-alkenyl and $C_{2-10}$-alkynyl,
wherein
$C_{1-10}$-alkyl, $C_{2-10}$-alkenyl and $C_{2-10}$-alkynyl can be substituted with one to five substituents selected from the group consisting of halogen, CN and NO$_2$.
$R^{102}$, $R^{103}$, $R^{104}$ and $R^{105}$ are independently and at each occurrence selected from the group consisting of H, $C_{1-20}$-alkyl, $C_{2-20}$-alkenyl, $C_{2-20}$-alkynyl, $C_{5-8}$-cycloalkyl, $C_{6-14}$-aryl, and 5 to 14 membered heteroaryl,
wherein
$C_{1-20}$-alkyl, $C_{2-20}$-alkenyl and $C_{2-20}$-alkynyl can be substituted with one to five substituents selected from the group consisting of $C_{5-6}$-cycloalkyl, $C_{6-10}$-aryl, 5 to 10 membered heteroaryl, OR$^s$, OC(O)—R$^t$, C(O)—OR$^s$, C(O)—R$^s$, NR$^s$R$^t$, NR$^s$—C(O)R$^t$, C(O)—NR$^s$R$^t$, N[C(O)R$^s$][C(O)R$^t$], SR$^s$, halogen, CN, and NO$_2$;
$C_{5-8}$-cycloalkyl can be substituted with one to five substituents selected from the group consisting of $C_{1-10}$-alkyl, $C_{2-10}$-alkenyl, $C_{2-10}$-alkynyl, $C_{5-6}$-cycloalkyl, $C_{6-10}$-aryl, 5 to 10 membered heteroaryl, OR$^s$, OC(O)—R$^t$, C(O)—OR$^s$, C(O)—R$^s$, NR$^s$R$^t$, NR$^s$—C(O)R$^t$, C(O)—NR$^s$R$^t$, N[C(O)R$^s$][C(O)R$^t$], SR$^s$, halogen, CN, and NO$_2$;
$C_{6-14}$-aryl and 5 to 14 membered heteroaryl can be substituted with one to five substituents independently selected from the group consisting of $C_{1-10}$-alkyl, $C_{2-10}$-alkenyl, $C_{2-10}$-alkynyl, $C_{5-6}$-cycloalkyl, $C_{6-10}$-aryl, 5 to 10 membered heteroaryl, OR$^s$, OC(O)—R$^t$, C(O)—OR$^s$, C(O)—R$^s$, NR$^s$R$^t$, NR$^s$—C(O)R$^t$, C(O)—NR$^s$R$^t$, N[C(O)R$^s$][C(O)R$^t$], SR$^s$, halogen, CN, and NO$_2$;
5 to 12 membered ring system can be substituted with one to five substituents selected from the group consisting of $C_{1-10}$-alkyl, $C_{2-10}$-alkenyl, $C_{2-10}$-alkynyl, $C_{5-6}$-cycloalkyl, $C_{6-10}$-aryl, 5 to 10 membered heteroaryl, $OR^s$, $OC(O)-R^t$, $C(O)-OR^s$, $C(O)-R^s$, $NR^sR^t$, $NR^s-C(O)R^t$, $C(O)-NR^sR^t$, $N[C(O)R^s][C(O)R^t]$, $SR^s$, halogen, CN, and $NO_2$;

wherein $R^s$ and $R^t$ are independently selected from the group consisting of H, $C_{1-10}$-alkyl, $C_{2-10}$-alkenyl and $C_{2-10}$-alkynyl, wherein $C_{1-10}$-alkyl, $C_{2-10}$-alkenyl and $C_{2-10}$-alkynyl can be substituted with one to five substituents selected from the group consisting of halogen, CN and $NO_2$.

Polyimines, also known as polyazomethines or Schiff base polymers, are a family of conjugated polymers constructed from imine bonds (C═N) in the backbone and have been used for several optoelectronic applications and synthesizing covalent-organic frameworks. The conjugated aromatic imines bonds are environmentally stable, however, it is reversible under the catalysis of acid. According to the invention, the advantage of the imine bonds to design degradable conjugated polymers for the separation of large-diameter semiconducting SWNTs with no polymer contaminations and much lower polymer costs is taken. Compared with small-diameter s-SWCNTs, large-diameter s-SWCNTs are more desired for electronic devices due to their smaller Schottky barrier and higher current density. Both of the imine polymers have exhibited high selectivity (>99%) for large-diameter s-SWNTs. After separation, the wrapping polymers can be degraded into small molecules with a catalytic amount of acid and then be recycled, thus demonstrating a novel low-cost approach for separating high-purity "clean" s-SWNT.

Accordingly, the polymers of the invention can be prepared from diamines containing r $M^1$ units and dialdehydes containing s $M^2$ units or from diamines containing r units $M^2$ units and dialdehydes containing s $M^2$ units.

$M^1$ is preferably selected from a group of

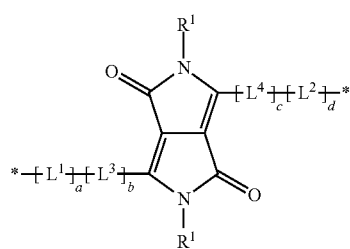

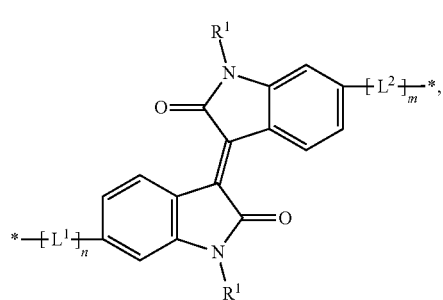

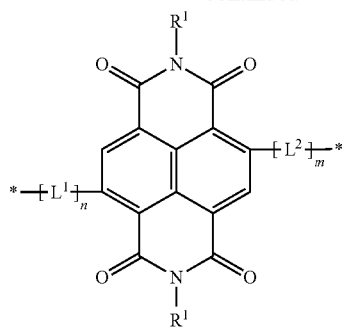

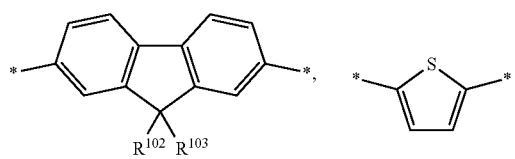

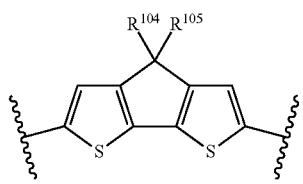

$M^1$ is more preferably selected from a group of

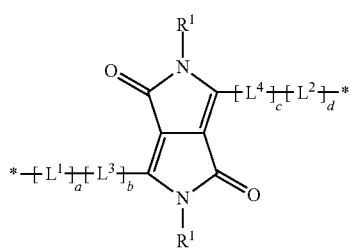

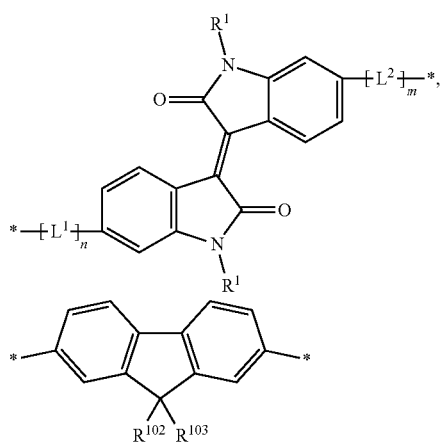

$M^1$ is even more preferably selected from a group of
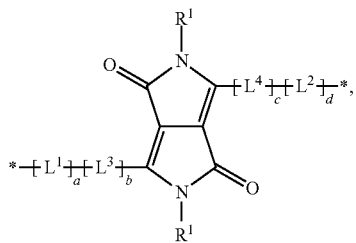
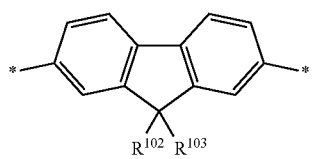
$M^1$ is most preferably selected from a group of
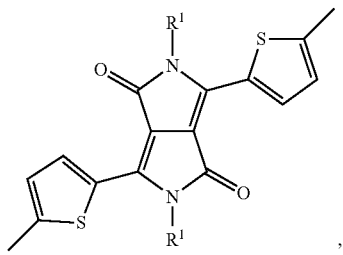
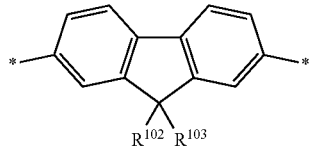
$M^2$ is selected from a group of
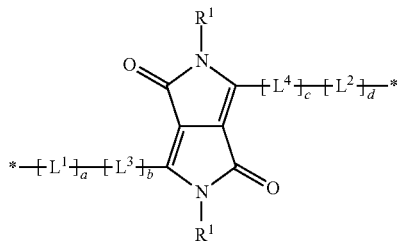
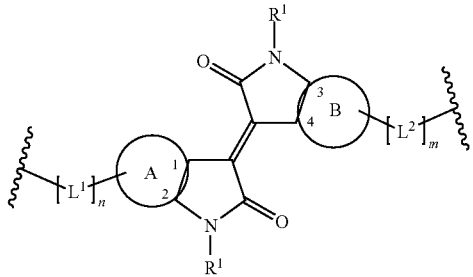
-continued
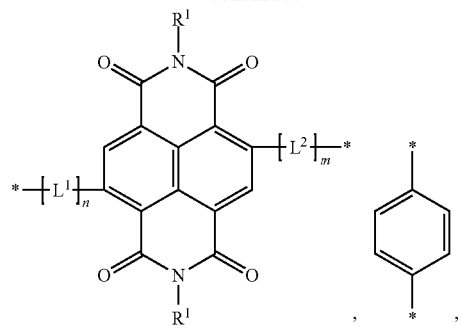
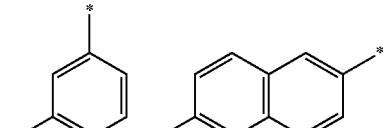
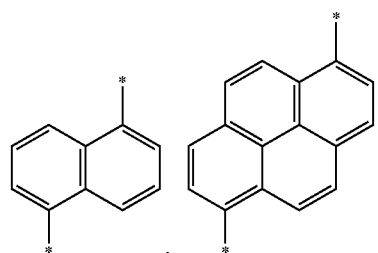
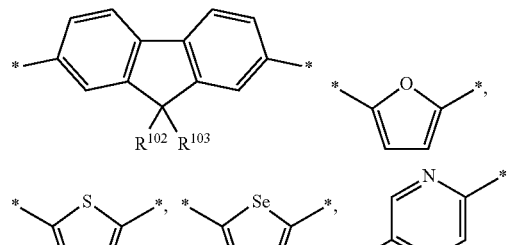
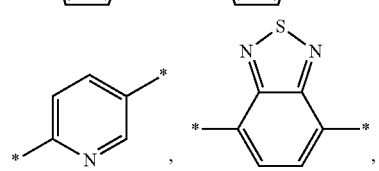
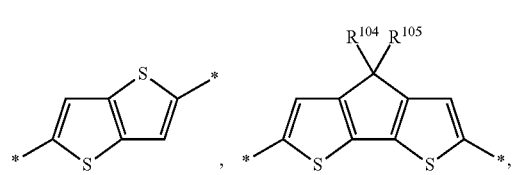
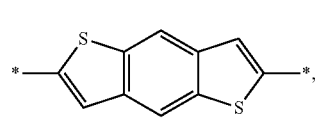
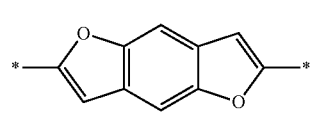

$M^2$ is preferably selected from a group
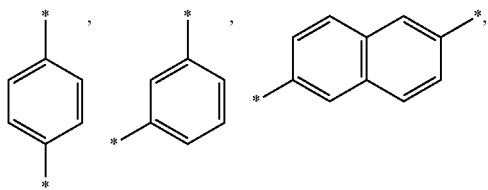
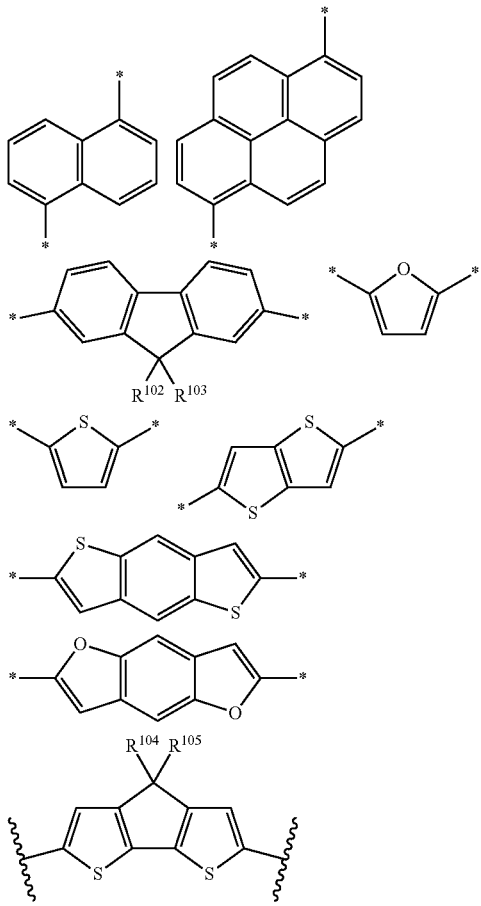
$M^2$ is more preferably selected from a group of
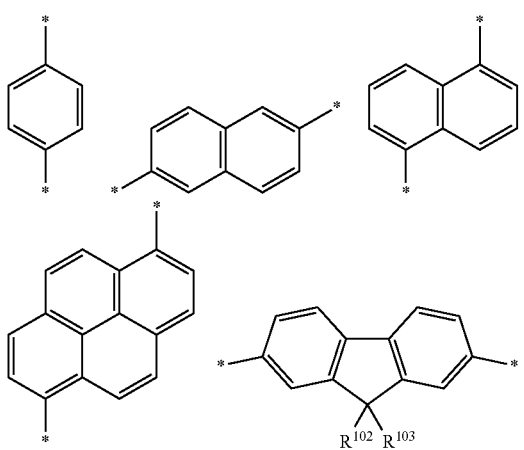
-continued
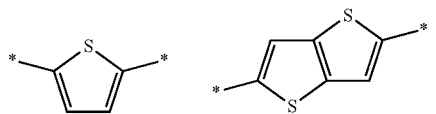
$M^2$ is most preferably
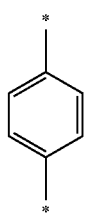
Examples for $C_{6-14}$-arylen are
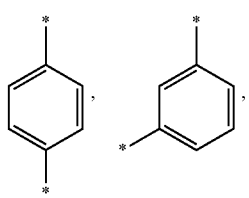
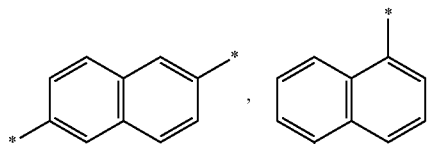
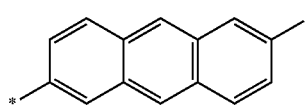
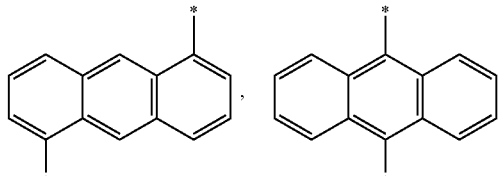
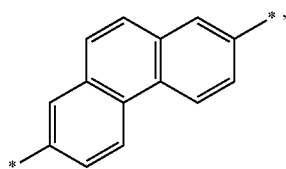
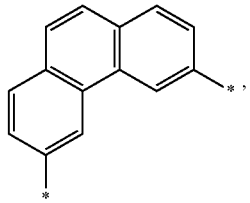

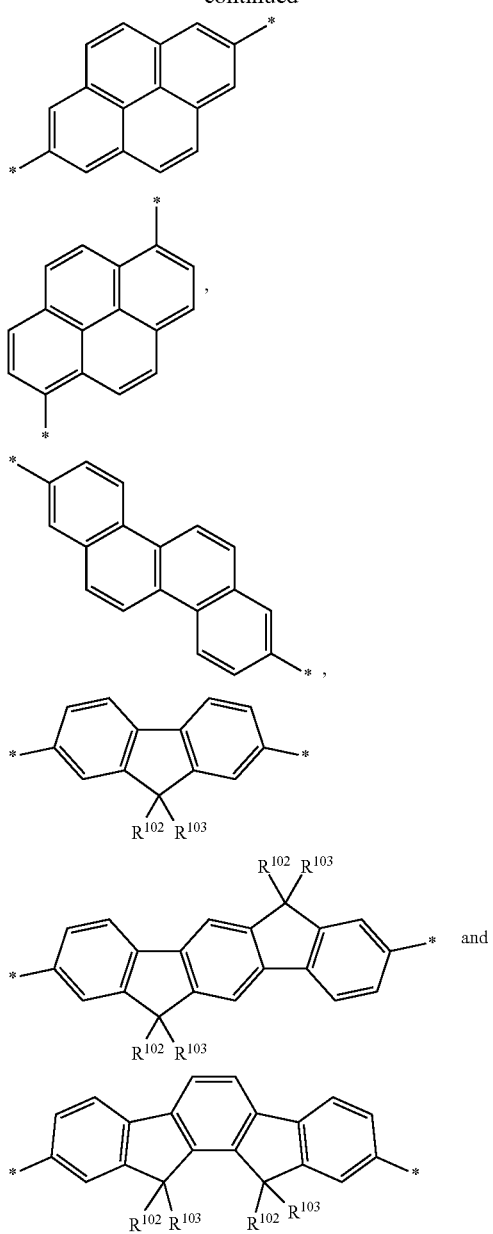
Examples for 5 to 14 membered heteroarylen are
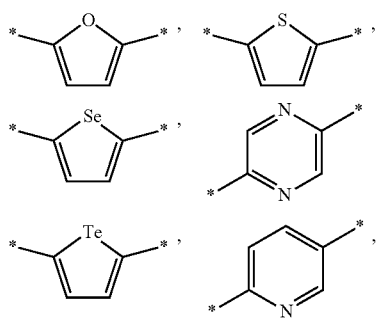
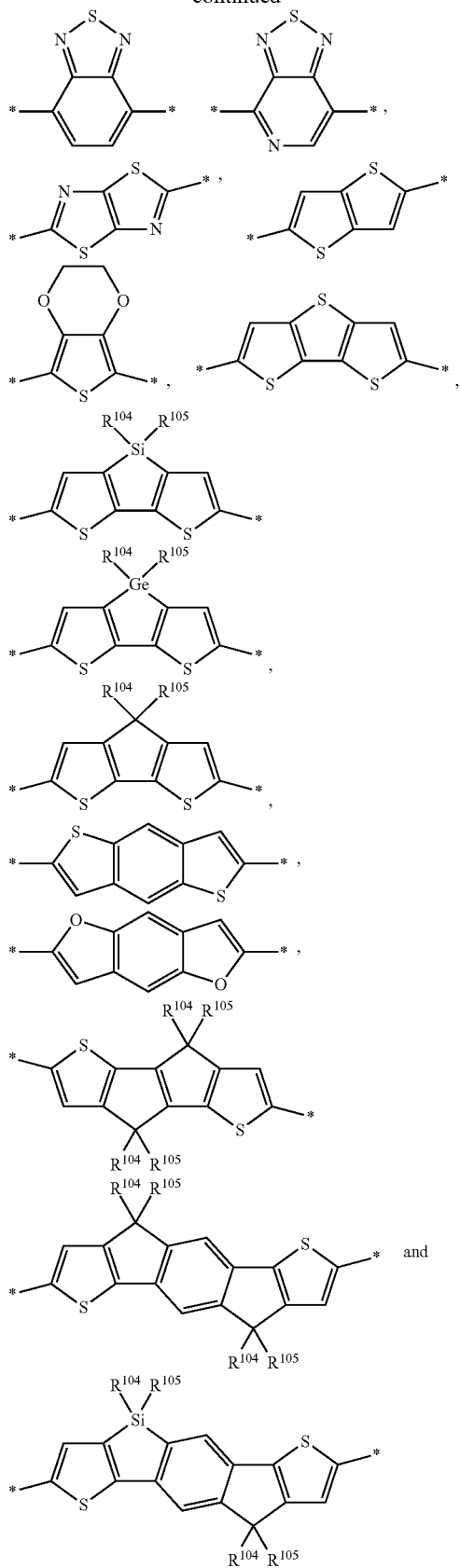
Halogen can be F, Cl, Br and I.

$C_{1-4}$-alkyl, $C_{1-10}$-alkyl, $C_{1-20}$-alkyl, $C_{1-30}$-alkyl, $C_{1-36}$-alkyl, $C_{1-50}$-alkyl, $C_{1-60}$-alkyl and $C_{1-100}$-alkyl can be branched or unbranched. Examples of $C_{1-4}$-alkyl are methyl, ethyl, n-propyl, isopropyl, n-butyl, sec-butyl, isobutyl and tert-butyl. Examples of $C_{1-10}$-alkyl are $C_{1-4}$-alkyl, n-pentyl, neopentyl, isopentyl, n-(1-ethyl)propyl, n-hexyl, n-heptyl, n-octyl, n-(2-ethyl)hexyl, n-nonyl and n-decyl. Examples of $C_{1-20}$-alkyl are $C_{1-10}$-alkyl and n-undecyl, n-dodecyl, n-tridecyl, n-tetradecyl, n-pentadecyl, n-hexadecyl, n-heptadecyl, n-octadecyl, n-nonadecyl and n-icosyl ($C_{20}$). Examples of $C_{1-30}$-alkyl, $C_{1-36}$-alkyl, $C_{1-50}$-alkyl, $C_{1-60}$-alkyl and $C_{1-100}$-alkyl are $C_{1-20}$-alkyl and n-docosyl ($C_{22}$), n-tetracosyl ($C_{24}$), n-hexacosyl ($C_{26}$), n-octacosyl ($C_{28}$) and n-triacontyl ($C_{30}$).

$C_{2-10}$-alkenyl, $C_{2-20}$-alkenyl, $C_{2-30}$-alkenyl, $C_{2-60}$-alkenyl and $C_{2-100}$-alkenyl can be branched or unbranched. Examples of $C_{2-10}$-alkenyl are vinyl, propenyl, cis-2-butenyl, trans-2-butenyl, 3-butenyl, cis-2-pentenyl, trans-2-pentenyl, cis-3-pentenyl, trans-3-pentenyl, 4-pentenyl, 2-methyl-3-butenyl, hexenyl, heptenyl, octenyl, nonenyl and docenyl. Examples of $C_{2-20}$-alkenyl are $C_{2-10}$-alkenyl and linoleyl ($C_{18}$), linolenyl ($C_{18}$), oleyl ($C_{18}$), and arachidonyl ($C_{20}$). Examples of $C_{2-30}$-alkenyl, $C^{2-60}$-alkenyl and $C^{2-100}$-alkenyl are $C_{2-20}$-alkenyl and erucyl ($C_{22}$).

$C_{2-10}$-alkynyl, $C_{2-20}$-alkynyl, $C_{2-30}$-alkynyl, $C_{2-60}$-alkynyl and $C_{2-100}$-alkynyl can be branched or unbranched. Examples of $C_{2-10}$-alkynyl are ethynyl, 2-propynyl, 2-butynyl, 3-butynyl, pentynyl, hexynyl, heptynyl, octynyl, nonynyl and decynyl. Examples of $C_{2-20}$-alkynyl, $C_{2-30}$-alkynyl, $C^{2-60}$-alkynyl and $C^{2-100}$-alkynyl are $C_{2-10}$-alkynyl and undecynyl, dodecynyl, undecynyl, dodecynyl, tridecynyl, tetradecynyl, pentadecynyl, hexadecynyl, heptadecynyl, octadecynyl, nonadecynyl and icosynyl ($C_{20}$).

Examples of $C_{5-6}$-cycloalkyl are cyclopentyl and cyclohexyl. Examples of $C_{5-8}$-cycloalkyl are $C_{5-6}$-cycloalkyl and cycloheptyl and cyclooctyl. $C_{5-12}$-cycloalkyl are $C_{5-8}$-cycloalkyl and cyclononyl, cyclodecyl, cycloundecyl and cyclododecyl.

Examples of $C_{6-10}$-aryl are phenyl,

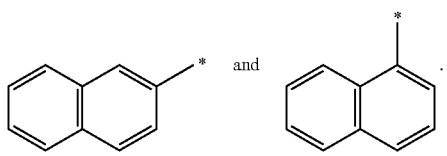

Examples of $C_{6-14}$-aryl are $C_{6-10}$-aryl and

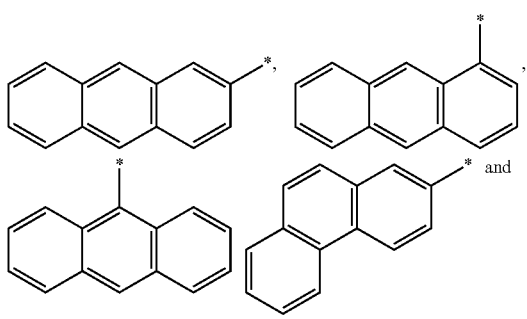

Examples of $C_{6-18}$-aryl are $C_{6-14}$-aryl and

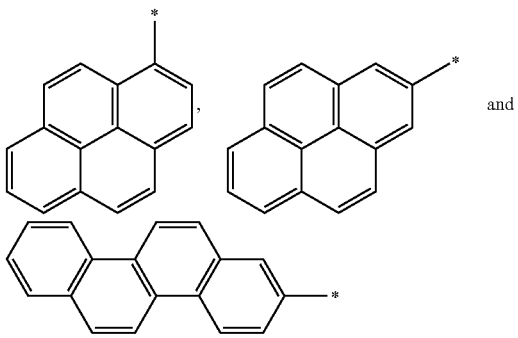

5 to 10 membered heteroaryl are 5 to 10 membered monocyclic or polycyclic, such as dicyclic, tricyclic or tetracyclic, ring systems, which comprise at least one heteroaromatic ring, and which may also comprise non-aromatic rings, which may be substituted by =O.

5 to 14 membered heteroaryl are 5 to 14 membered monocyclic or polycyclic, such as dicyclic, tricyclic or tetracyclic, ring systems, which comprise at least one heteroaromatic ring, and which may also comprise non-aromatic rings, which may be substituted by =O.

5 to 20 membered heteroaryl are 5 to 20 membered monocyclic or polycyclic, such as dicyclic, tricyclic or tetracyclic, ring systems, which comprise at least one heteroaromatic ring, and which may also comprise non-aromatic rings, which may be substituted by =O.

Examples of 5 to 10 membered heteroaryl are

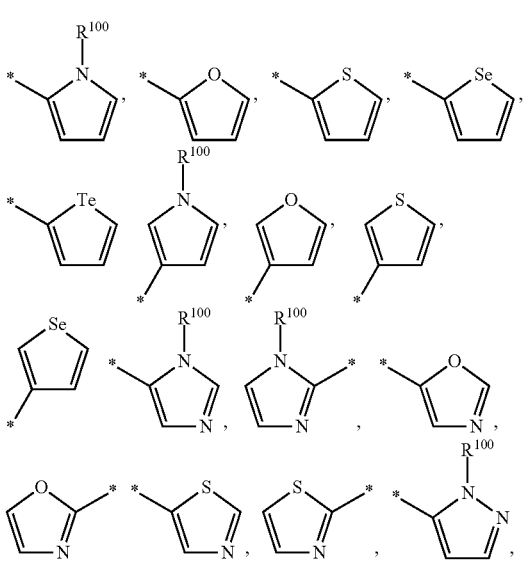

-continued
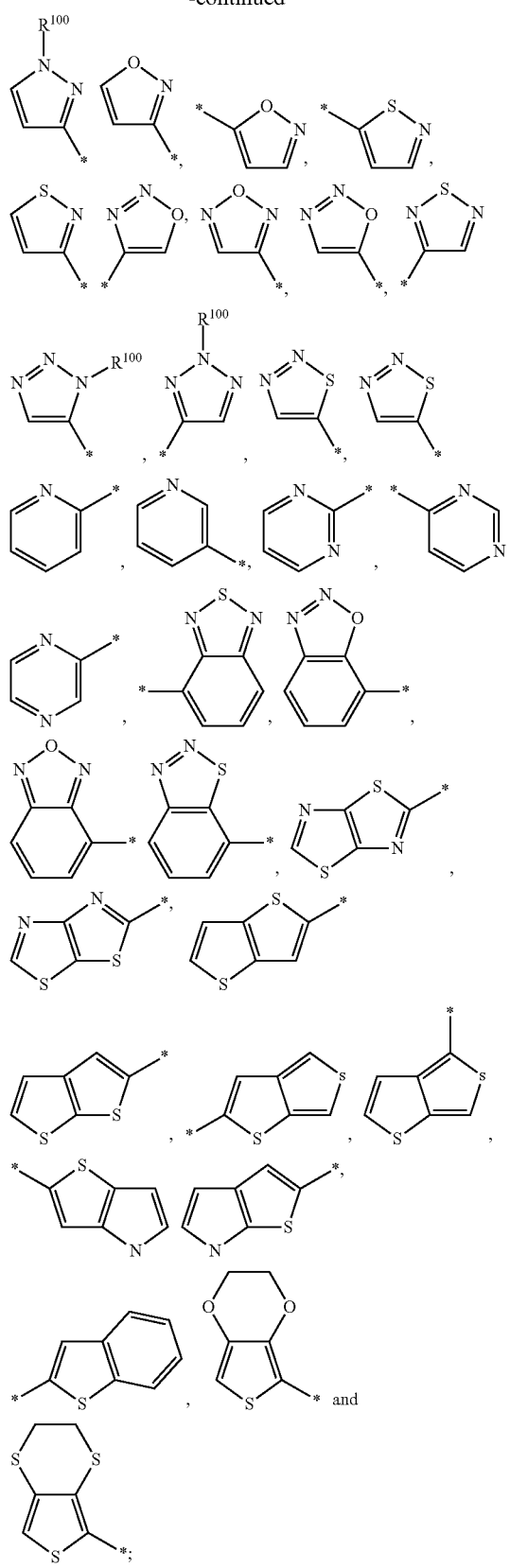
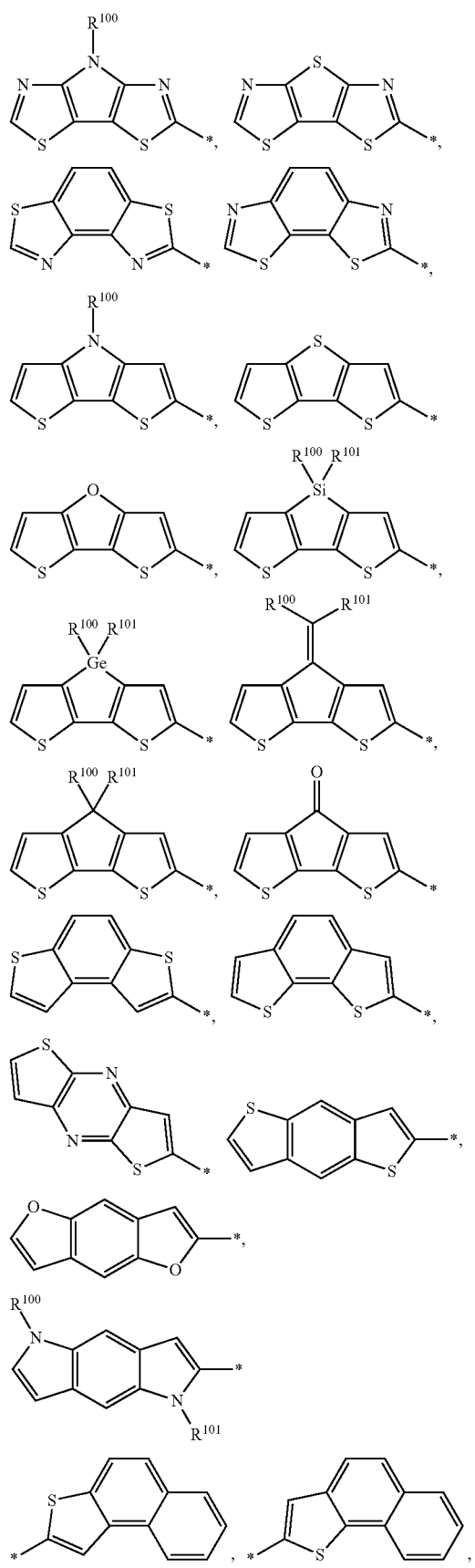
examples of 5 to 14 membered heteroaryl are the examples given for the 5 to 10 membered heteroaryl and

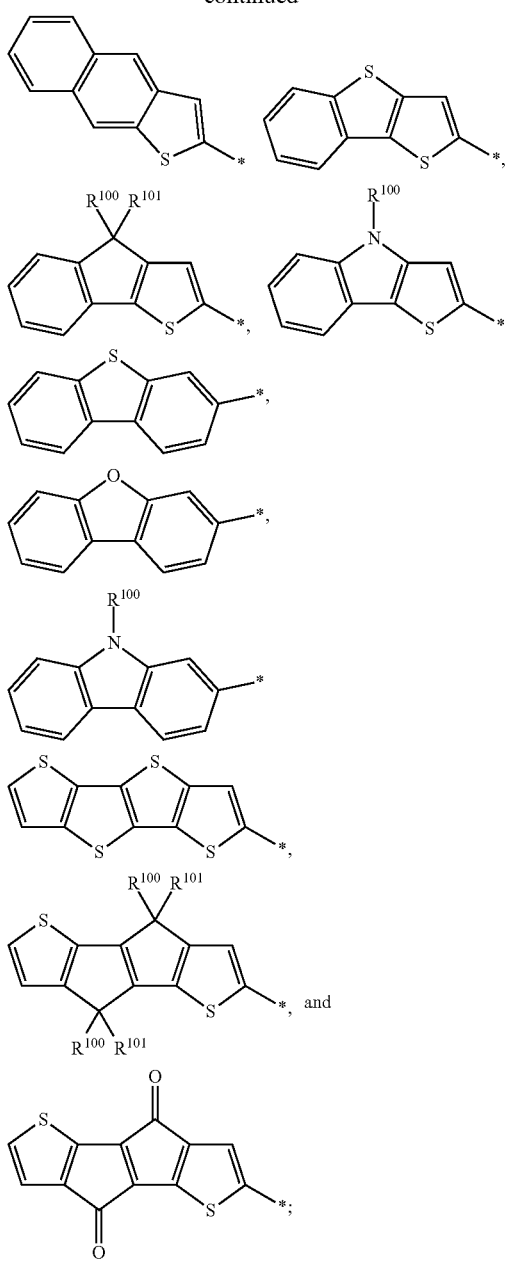
examples of 5 to 20 membered heteroaryl are the examples given for the 5 to 14 membered heteroaryl and
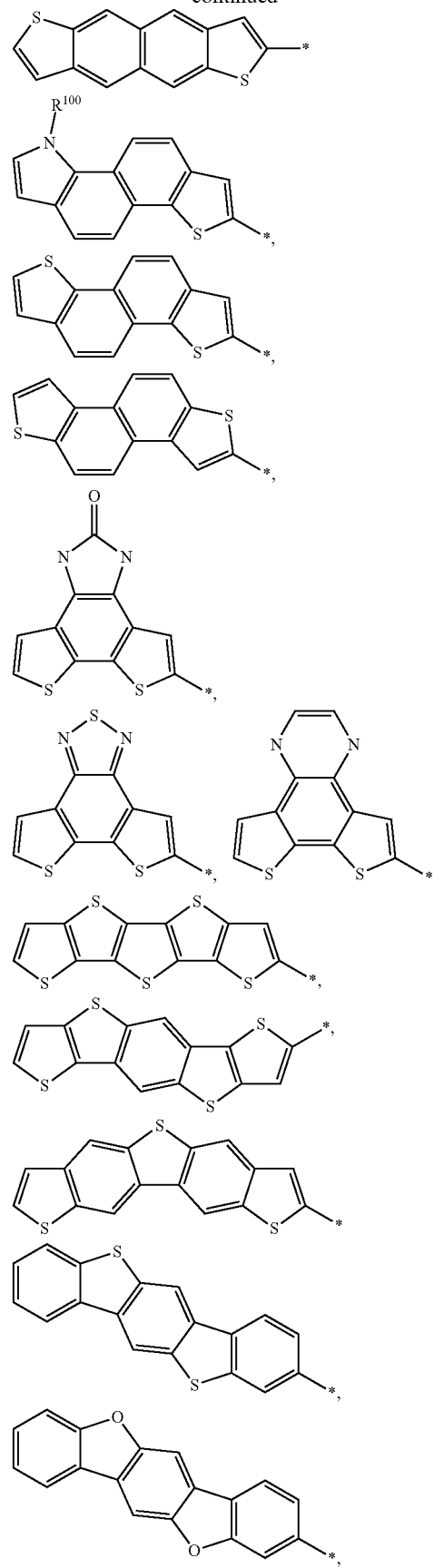

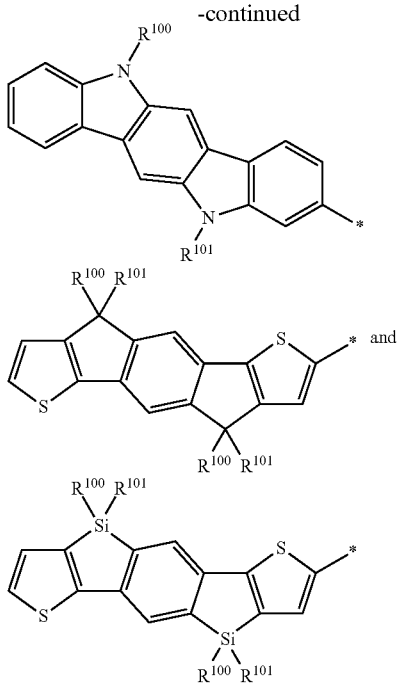

-continued wherein
R[100] and R[101] are independently and at each occurrence selected from the group consisting of H, $C_{1-20}$-alkyl, $C_{2-20}$-alkenyl, $C_{2-20}$-alkynyl, $C_{5-8}$-cycloalkyl, $C_{6-14}$-aryl, and 5 to 14 membered heteroaryl, or R[100] and R[101], if attached to the same atom, together with the atom, to which they are attached, form a 5 to 12 membered ring system,
wherein
$C_{1-20}$-alkyl, $C_{2-20}$-alkenyl and $C_{2-20}$-alkynyl can be substituted with one to five substituents selected from the group consisting of $C_{5-6}$-cycloalkyl, $C_{6-10}$-aryl, 5 to 10 membered heteroaryl, $OR^q$, $OC(O)$—$R^q$, $C(O)$—$OR^q$, $C(O)$—$R^q$, $NR^qR^r$, $NR^q$—$C(O)R^r$, $C(O)$—$NR^qR^r$, $N[C(O)R^q][C(O)R^r]$, $SR^q$, halogen, CN, and $NO_2$;
$C_{5-8}$-cycloalkyl can be substituted with one to five substituents selected from the group consisting of $C_{1-10}$-alkyl, $C_{2-10}$-alkenyl, $C_{2-10}$-alkynyl, $C_{5-6}$-cycloalkyl, $C_{6-10}$-aryl, 5 to 10 membered heteroaryl, $OR^q$, $OC(O)$—$R^q$, $C(O)$—$OR^q$, $C(O)$—$R^q$, $NR^qR^r$, $NR^q$—$C(O)R^r$, $C(O)$—$NR^qR^r$, $N[C(O)R^q][C(O)R^r]$, $SR^q$, halogen, CN, and $NO_2$;
$C_{6-14}$-aryl and 5 to 14 membered heteroaryl can be substituted with one to five substituents independently selected from the group consisting of $C_{1-10}$-alkyl, $C_{2-10}$-alkenyl, $C_{2-10}$-alkynyl, $C_{5-6}$-cycloalkyl, $C_{6-10}$-aryl, 5 to 10 membered heteroaryl, $OR^q$, $OC(O)$—$R^q$, $C(O)$—$OR^q$, $C(O)$—$R^q$, $NR^qR^r$, $NR^q$—$C(O)R^r$, $C(O)$—$NR^qR^r$, $N[C(O)R^q][C(O)R^r]$, $SR^q$, halogen, CN, and $NO_2$;
5 to 12 membered ring system can be substituted with one to five substituents selected from the group consisting of $C_{1-10}$-alkyl, $C_{2-10}$-alkenyl, $C_{2-10}$-alkynyl, $C_{5-6}$-cycloalkyl, $C_{6-10}$-aryl, 5 to 10 membered heteroaryl, $OR^q$, $OC(O)$—$R^q$, $C(O)$—$OR^q$, $C(O)$—$R^q$, $NR^qR^r$, $NR^q$—$C(O)R^r$, $C(O)$—$NR^qR^r$, $N[C(O)R^q][C(O)R^r]$, $SR^q$, halogen, CN, and $NO_2$;

wherein
$R^q$ and $R^r$ are independently selected from the group consisting of H, $C_{1-10}$-alkyl, $C_{2-10}$-alkenyl and $C_{2-10}$-alkynyl,
wherein
$C_{1-10}$-alkyl, $C_{2-10}$-alkenyl and $C_{2-10}$-alkynyl can be substituted with one to five substituents selected from the group consisting of halogen, CN and $NO_2$.

Preferably, b and c are independently from each other 1, 2, 3 or 4. More preferably, b and c are independently from each other 1, 2 or 3.

Preferably, a and d are independently from each other 0, 1, 2 or 3. More preferably, a and d are independently from each other 0, 1 or 2. Even more preferably, a and d are independently from each other 0 or 1. Most preferably, a and d are 0.

Preferably, n is 0, 1 or 2, and m is 0, 1 or 2. More preferably, n is 0 or 1, and m is 0, 1 or 2. Most preferably, n is 0, and m is 0, 1 or 2.

Preferably, $R^1$ is at each occurrence selected from the group consisting of H, $C_{1-100}$-alkyl, $C_{2-100}$-alkenyl, $C_{2-100}$-alkynyl, $C_{5-12}$-cycloalkyl, $C_{6-18}$-aryl, and a 5 to 20 membered heteroaryl,
wherein
$C_{1-100}$-alkyl, $C^{2-100}$-alkenyl and $C^{2-100}$-alkynyl can be substituted with one to fourty substituents independently selected from the group consisting of $C_{5-8}$-cycloalkyl, $C_{6-14}$-aryl, 5 to 14 membered heteroaryl, $OR^a$, $OC(O)$—$R^a$, $C(O)$—$OR^a$, $C(O)$—$R^a$, $NR^a$—$C(O)R^b$, $C(O)$—$NR^aR^b$, $SR^a$, $Si(R^{Sia})(R^{Sib})(R^{Sic})$, —O—$Si(R^{Sia})(R^{Sib})(R^{Sic})$, halogen and CN; and at least two $CH_2$-groups, but not adjacent $CH_2$-groups, of $C_{1-100}$-alkyl, $C_{2-100}$-alkenyl and $C_{2-100}$-alkynyl can be replaced by O or S,
$C_{5-12}$-cycloalkyl can be substituted with one to six substituents independently selected from the group consisting of $C_{1-60}$-alkyl, $C_{2-60}$-alkenyl, $C_{2-60}$-alkynyl, $C_{5-8}$-cycloalkyl, $C_{6-14}$-aryl, 5 to 14 membered heteroaryl, $OR^a$, $OC(O)$—$R^a$, $C(O)$—$OR^a$, $C(O)$—$R^a$, $NR^a$—$C(O)R^b$, $C(O)$—$NR^aR^b$, $SR^a$, $Si(R^{Sia})(R^{Sib})(R^{Sic})$, —O—$Si(R^{Sia})(R^{Sib})(R^{Sic})$, halogen, and CN; and one or two $CH_2$-groups, but not adjacent $CH_2$-groups, of $C_{5-12}$-cycloalkyl can be replaced by O, S, OC(O), CO, $NR^a$ or $NR^a$—CO,
$C_{6-18}$-aryl and 5 to 20 membered heteroaryl can be substituted with one to six substituents independently selected from the group consisting of $C_{1-60}$-alkyl, $C_{2-60}$-alkenyl, $C_{2-60}$-alkynyl, $C_{5-8}$-cycloalkyl, $C_{6-14}$-aryl, 5 to 14 membered heteroaryl, $OR^a$, $OC(O)$—$R^a$, $C(O)$—$OR^a$, $C(O)$—$R^a$, $NR^a$—$C(O)R^b$, $C(O)$—$NR^aR^b$, $SR^a$, $Si(R^{Sia})(R^{Sib})(R^{Sic})$, —O—$Si(R^{Sia})(R^{Sib})(R^{Sic})$, halogen, and CN,
wherein
$R^a$ and $R^b$ are independently selected from the group consisting of H, $C_{1-60}$-alkyl, $C_{2-60}$-alkenyl, $C^{2-60}$-alkynyl, $C_{5-8}$-cycloalkyl, $C_{6-14}$-aryl and 5 to 14 membered heteroaryl,
$R^{Sia}$, $R^{Sib}$ and $R^{Sic}$ are independently selected from the group consisting of H, $C_{1-60}$-alkyl, $C^{2-60}$-alkenyl, $C^{2-60}$-alkynyl, $C_{5-8}$-cycloalkyl, $C_{6-14}$-aryl, 5 to 14 membered heteroaryl, O—$C_{1-60}$-alkyl, O—$C_{2-60}$-alkenyl, O—$C_{2-60}$-alkynyl, O—$C_{5-8}$-cycloalkyl, —[O—$SiR^{Sid}R^{Sie}]_o$—$R^{Sif}$, wherein o is an integer from 1 to 50, $R^{Sid}$, $R^{Sie}$ and $R^{Sif}$ are independently selected from the group consisting of H, $C_{1-60}$-alkyl, $C^{2-60}$-alkenyl, $C^{2-60}$-alkynyl, $C_{5-8}$-cycloalkyl, $C_{6-14}$-aryl, wherein p is an integer from 1 to 50, $R^{Sig}$ $R^{Sih}$ and $R^{Sii}$ are independently selected from the group consisting of H, $C_{1-30}$-alkyl, $C_{2-30}$-alkenyl, $C_{2-30}$-alkynyl, $C_{5-6}$-cycloalkyl, $C_{6-10}$-aryl, O—Si(CH$_3$)$_3$, $R^5$, $R^6$, $R^{50}$, $R^{60}$, $R^{500}$ and $R^{600}$ are independently selected from the group consisting of H, $C_{1-60}$-alkyl, $C_{2-60}$-alkenyl, $C_{2-60}$-alkynyl, $C_{5-8}$-cycloalkyl, $C_{6-14}$-aryl, and 5 to 14 membered heteroaryl, $C_{1-60}$-alkyl, $C^{2-60}$-alkenyl and $C^{2-60}$-alkynyl can be substituted with one to twenty substituents selected from the group consisting of $C_{5-6}$-cycloalkyl, $C_{6-10}$-aryl, OR$^c$, OC(O)—R$^c$, C(O)—OR$^c$, C(O)—R$^c$, NR$^c$—C(O)R$^d$, C(O)—NR$^c$R$^d$, SR$^c$, Si(R$^{Sij}$)(R$^{Sik}$)(R$^{Sil}$), —O—Si(R$^{Sij}$)(R$^{Sik}$)(R$^{Sil}$), halogen, and CN; and at least two CH$_2$-groups, but not adjacent CH$_2$-groups, of $C_{1-60}$-alkyl, $C_{2-60}$-alkenyl and $C_{2-60}$-alkynyl can be replaced by O or S, $C_{5-8}$-cycloalkyl can be substituted with one to five substituents selected from the group consisting of $C_{1-30}$-alkyl, $C_{2-30}$-alkenyl, $C_{2-30}$-alkynyl, $C_{5-6}$-cycloalkyl, $C_{6-10}$-aryl, OR$^c$, OC(O)—R$^c$, C(O)—OR$^c$, C(O)—R$^c$, NR$^c$—C(O)R$^d$, C(O)—NR$^c$R$^d$, SR$^c$, Si(R$^{Sij}$)(R$^{Sik}$)(R$^{Sil}$), —O—Si(R$^{Sij}$)(R$^{Sik}$)(R$^{Sil}$), halogen, and CN; and one or two CH$_2$-groups, but not adjacent CH$_2$-groups, of $C_{5-8}$-cycloalkyl can be replaced by O, S, OC(O), CO, NR$^c$ or NR$^c$—CO, $C_{6-14}$-aryl and 5 to 14 membered heteroaryl can be substituted with one to five substituents independently selected from the group consisting of $C_{1-30}$-alkyl, $C_{2-30}$-alkenyl, $C_{2-30}$-alkynyl, $C_{5-6}$-cycloalkyl, $C_{6-10}$-aryl, OR$^c$, OC(O)—R$^c$, C(O)—OR$^c$, C(O)—R$^c$, NR$^c$—C(O)R$^d$, C(O)—NR$^c$R$^d$, SR$^c$, Si(R$^{Sij}$)(R$^{Sik}$)(R$^{Sil}$), —O—Si(R$^{Sij}$)(R$^{Sik}$)(R$^{Sil}$), halogen and CN;

wherein

R$^c$ and R$^d$ are independently selected from the group consisting of H, $C_{1-30}$-alkyl, $C_{2-30}$-alkenyl and $C_{2-30}$-alkynyl, R$^{Sij}$, R$^{Sik}$ and R$^{Sil}$ are independently selected from the group consisting of H, $C_{1-30}$-alkyl, $C_{2-30}$-alkenyl, $C_{2-30}$-alkynyl, $C_{5-6}$-cycloalkyl, $C_{6-10}$-aryl, —[O—Si(R$^{Sim}$R$^{Sin}$]$_q$—R$^{Sio}$, wherein q is an integer from 1 to 50, R$^{Sim}$, R$^{Sin}$, R$^{Sio}$ are independently selected from the group consisting of H, $C_{1-30}$-alkyl, $C_{2-30}$-alkenyl, $C_{2-30}$-alkynyl, $C_{5-6}$-cycloalkyl, $C_{6-10}$-aryl, 5 to 10 membered heteroaryl, O—$C_{1-30}$-alkyl, O—$C_{2-30}$-alkenyl, O—$C_{2-30}$-alkynyl, O—$C_{5-6}$-cycloalkyl, O—$C_{6-10}$-aryl, O-5 to 10 membered heteroaryl, —[O—SiR$^{Sip}$R$^{Siq}$]$_r$—R$^{Sir}$, NR$^{70}$R$^{80}$, halogen, and O—C(O)—R$^{70}$;

wherein r is an integer from 1 to 50,

R$^{Sip}$, R$^{Siq}$, R$^{Sir}$ are independently selected from the group consisting of H, $C_{1-30}$-alkyl, $C_{2-30}$-alkenyl, $C_{2-30}$-alkynyl, $C_{5-6}$-cycloalkyl, $C_{6-10}$-aryl, 5 to 10 membered heteroaryl, O—$C_{1-30}$-alkyl, O—$C_{2-30}$-alkenyl, O—$C_{2-30}$-alkynyl, O—$C_{5-6}$-cycloalkyl, O—$C_{6-10}$-aryl, O-5 to 10 membered heteroaryl, O—Si(CH$_3$)$_3$, NR$^{700}$R$^{800}$, halogen and O—C(O)—R$^{700}$, R$^7$, R$^8$, R$^{70}$, R$^{80}$, R$^{700}$ and R$^{800}$ are independently selected from the group consisting of H, $C_{1-30}$-alkyl, $C_{2-30}$-alkenyl, $C_{2-30}$-alkynyl, $C_{5-6}$-cycloalkyl, $C_{6-10}$-aryl, and 5 to 10 membered heteroaryl, $C_{1-30}$-alkyl, $C_{2-30}$-alkenyl and $C_{2-30}$-alkynyl can be substituted with one to ten substituents selected from the group consisting of halogen and CN.

More preferably, $R^1$ is at each occurrence selected from the group consisting of $C_{1-100}$-alkyl, $C_{2-100}$-alkenyl and $C^{2-100}$-alkynyl, wherein $C_{1-100}$-alkyl, $C^{2-100}$-alkenyl and $C^{2-100}$-alkynyl can be substituted with one to fourty substituents independently selected from the group consisting of $C_{5-8}$-cycloalkyl, $C_{6-14}$-aryl, 5 to 14 membered heteroaryl, OR$^a$, OC(O)—R$^a$, C(O)—OR$^a$, C(O)—R$^a$, NR$^a$—C(O)R$^b$, C(O)—NR$^a$R$^b$, SR$^a$, Si(R$^{Sia}$)(R$^{Sib}$)(R$^{Sic}$), —O—Si(R$^{Sia}$)(R$^{Sib}$)(R$^{Sic}$), halogen, and CN; and at least two CH$_2$-groups, but not adjacent CH$_2$-groups, of $C_{1-100}$-alkyl, $C_{2-100}$-alkenyl and $C_{2-100}$-alkynyl can be replaced by O or S, wherein R$^a$ and R$^b$ are independently selected from the group consisting of H, $C_{1-60}$-alkyl, $C_{2-60}$-alkenyl, $C^{2-60}$-alkynyl, $C_{5-8}$-cycloalkyl, $C_{6-14}$-aryl and 5 to 14 membered heteroaryl, R$^{Sia}$, R$^{Sib}$ and R$^{Sic}$ are independently selected from the group consisting of H, $C^{1-60}$-alkyl, $C^{2-60}$-alkenyl, $C^{2-60}$-alkynyl, $C_{5-8}$-cycloalkyl, $C_{6-14}$-aryl, —[O—SiR$^{Sid}$R$^{Sie}$]$_o$—R$^{Sif}$, wherein o is an integer from 1 to 50, $R^{Sid}$, $R^{Sie}$ and $R^{Sif}$ are independently selected from the group consisting of H, $C_{1-60}$-alkyl, $C^{2-60}$-alkenyl, $C^{2-60}$-alkynyl, $C_{5-8}$-cycloalkyl, $C_{6-14}$-aryl, —[O—SiR$^{Sig}$R$^{Sih}$]$_p$—R$^{Sii}$, wherein p is an integer from 1 to 50, $R^{Sig}$ $R^{Sih}$, $R^{Sii}$ are independently selected from the group consisting of H, $C_{1-30}$-alkyl, $C_{2-30}$-alkenyl, $C_{2-30}$-alkynyl, $C_{5-6}$-cycloalkyl, $C_{6-10}$-aryl, O—Si(CH$_3$)$_3$, $R^5$, $R^6$, $R^{50}$, $R^{60}$, $R^{500}$ and $R^{600}$ are independently selected from the group consisting of H, $C_{1-60}$-alkyl, $C_{2-60}$-alkenyl, $C_{2-60}$-alkynyl, $C_{5-8}$-cycloalkyl, $C_{6-14}$-aryl, and 5 to 14 membered heteroaryl, $C_{1-60}$-alkyl, $C^{2-60}$-alkenyl and $C^{2-60}$-alkynyl can be substituted with one to twenty substituents selected from the group consisting of $C_{5-6}$-cycloalkyl, $C_{6-10}$-aryl, OR$^c$, OC(O)—R$^c$, C(O)—OR$^c$, C(O)—R$^c$, NR$^c$—C(O)R$^d$, C(O)—NR$^c$R$^d$, SR$^c$, Si(R$^{Sij}$)(R$^{Sik}$)(R$^{Sil}$), —O—Si(R$^{Sij}$)(R$^{Sik}$)(R$^{Sil}$), halogen, and CN; and at least two CH$_2$-groups, but not adjacent CH$_2$-groups, of $C_{1-60}$-alkyl, $C_{2-60}$-alkenyl and $C_{2-60}$-alkynyl can be replaced by O or S, $C_{5-8}$-cycloalkyl can be substituted with one to five substituents selected from the group consisting of $C_{1-30}$-alkyl, $C_{2-30}$-alkenyl, $C_{2-30}$-alkynyl, $C_{5-6}$-cycloalkyl, $C_{6-10}$-aryl, OR$^c$, OC(O)—R$^c$, C(O)—

$OR^c$, $C(O)$—$R^c$, $NR^c$—$C(O)R^d$, $C(O)$—$NR^cR^d$, $SR^c$, $Si(R^{Sij})(R^{Sik})(R^{Sil})$, —$O$—$Si(R^{Sij})(R^{Sik})(R^{Sil})$, halogen, and CN; and one or two $CH_2$-groups, but not adjacent $CH_2$-groups, of $C_{5-8}$-cycloalkyl can be replaced by O, S, OC(O), CO, $NR^c$ or $NR^c$—CO, $C_{6-14}$-aryl and 5 to 14 membered heteroaryl can be substituted with one to five substituents independently selected from the group consisting of $C_{1-30}$-alkyl, $C_{2-30}$-alkenyl, $C_{2-30}$-alkynyl, $C_{5-6}$-cycloalkyl, $C_{6-10}$-aryl, $OR^c$, $OC(O)$—$R^c$, $C(O)$—$OR^c$, $C(O)$—$R^c$, $NR^c$—$C(O)R^d$, $C(O)$—$NR^cR^d$, $SR^c$, $Si(R^{Sij})(R^{Sik})(R^{Sil})$, —$O$—$Si(R^{Sij})(R^{Sik})(R^{Sil})$, halogen, and CN;

wherein $R^c$ and $R^d$ are independently selected from the group consisting of H, $C_{1-30}$-alkyl, $C_{2-30}$-alkenyl and $C_{2-30}$-alkynyl, $R^{Sij}$, $R^{Sik}$ and $R^{Sil}$ are independently selected from the group consisting of H, $C_{1-30}$-alkyl, $C_{2-30}$-alkenyl, $C_{2-30}$-alkynyl, $C_{5-6}$-cycloalkyl, $C_{6-10}$-aryl, —[O—$SiR^{Sim}R^{Sin}]_q$—$R^{Sio}$, wherein q is an integer from 1 to 50, $R^{Sim}$, $R^{Sin}$, $R^{Sio}$ are independently selected from the group consisting of H, $C_{1-30}$-alkyl, $C_{2-30}$-alkenyl, $C_{2-30}$-alkynyl, $C_{5-6}$-cycloalkyl, $C_{6-10}$-aryl, —[O—$SiR^{Sip}R^{Siq}]_r$—$R^{Sir}$, wherein r is an integer from 1 to 50, $R^{Sip}$, $R^{Siq}$, $R^{Sir}$ are independently selected from the group consisting of H, $C_{1-30}$-alkyl, $C_{2-30}$-alkenyl, $C_{2-30}$-alkynyl, $C_{5-6}$-cycloalkyl, $C_{6-10}$-aryl, O—$Si(CH_3)_3$, $R^7$, $R^8$, $R^{70}$, $R^{80}$, $R^{700}$ and $R^{800}$ are independently selected from the group consisting of H, $C_{1-30}$-alkyl, $C_{2-30}$-alkenyl, $C_{2-30}$-alkynyl, $C_{5-6}$-cycloalkyl, $C_{6-10}$-aryl, and 5 to 10 membered heteroaryl, $C_{1-30}$-alkyl, $C_{2-30}$-alkenyl and $C_{2-30}$-alkynyl can be substituted with one to ten substituents selected from the group consisting of halogen and CN.

Even more preferably, $R^1$ is at each occurrence selected from the group consisting of $C_{1-50}$-alkyl, $C_{2-50}$-alkenyl and $C_{2-50}$-alkynyl, wherein $C_{1-50}$-alkyl, $C_{2-50}$-alkenyl and $C_{2-50}$-alkynyl can be substituted with one to twenty substituents independently selected from the group consisting of $C_{5-6}$-cycloalkyl, $C_{6-10}$-aryl, 5 to 10 membered heteroaryl, $OR^a$, $SR^a$, $Si(R^{Sia})(R^{Sib})(R^{Sic})$, —$O$—$Si(R^{Sia})(R^{Sib})(R^{Sic})$, halogen, and CN; and at least two $CH_2$-groups, but not adjacent $CH_2$-groups, of $C_{1-50}$-alkyl, $C_{2-50}$-alkenyl and $C_{2-50}$-alkynyl can be replaced by O or S, wherein $R^a$ and $R^b$ are independently selected from the group consisting of H, $C_{1-30}$-alkyl, $C_{2-30}$-alkenyl, $C_{2-30}$-alkynyl, $C_{5-6}$-cycloalkyl and $C_{6-10}$-aryl, $R^{Sia}$, $R^{Sib}$ and $R^{Sic}$ are independently selected from the group consisting of H, $C_{1-30}$-alkyl, $C_{2-30}$-alkenyl, $C_{2-30}$-alkynyl, $C_{5-6}$-cycloalkyl, $C_{6-10}$-aryl, —[O—$SiR^{Sid}R^{Sie}]_o$—$R^{Sif}$, wherein o is an integer from 1 to 50, $R^{Sid}$, $R^{Sie}$, $R^{Sif}$ are independently selected from the group consisting of H, $C_{1-30}$-alkyl, $C_{2-30}$-alkenyl, $C_{2-30}$-alkynyl, $C_{5-6}$-cycloalkyl, $C_{6-10}$-aryl, —[O—$SiR^{Sig}R^{Sih}]_p$—$R^{Sii}$, wherein p is an integer from 1 to 50, $R^{Sig}$, $R^{Sih}$, $R^{Sii}$ are independently selected from the group consisting of H, $C_{1-30}$-alkyl, $C_{2-30}$-alkenyl, $C_{2-30}$-alkynyl, $C_{5-6}$-cycloalkyl, $C_{6-10}$-aryl, O—$Si(CH_3)_3$, $R^5$, $R^6$, $R^{50}$, $R^{60}$, $R^{500}$ and $R^{600}$ are independently selected from the group consisting of H, $C_{1-30}$-alkyl, $C_{2-30}$-alkenyl, $C_{2-30}$-alkynyl, $C_{5-6}$-cycloalkyl, $C_{6-10}$-aryl, and 5 to 10 membered heteroaryl, $C_{1-30}$-alkyl, $C_{2-30}$-alkenyl and $C_{2-30}$-alkynyl can be substituted with one to ten substituents selected from the group consisting of halogen and CN.

Most preferably, $R^1$ is at each occurrence selected from the group consisting of $C_{1-36}$-alkyl, $C_{2-36}$-alkenyl and $C_{2-36}$-alkynyl, wherein $C_{1-36}$-alkyl, $C_{2-36}$-alkenyl and $C_{2-36}$-alkynyl can be substituted with one to twenty substituents independently selected from the group consisting of $C_{5-6}$-cycloalkyl, $C_{6-10}$-aryl, 5 to 10 membered heteroaryl, $OR^a$, $SR^a$, $Si(R^{Sia})(R^{Sib})(R^{Sic})$, —$O$—$Si(R^{Sia})(R^{Sib})(R^{Sic})$, halogen, and CN; and at least two $CH_2$-groups, but not adjacent $CH_2$-groups, of $C_{1-36}$-alkyl, $C_{2-36}$-alkenyl and $C_{2-36}$-alkynyl can be replaced by O or S, wherein $R^a$ and $R^b$ are independently selected from the group consisting of H, $C_{1-20}$-alkyl, $C_{2-20}$-alkenyl, $C_{2-20}$-alkynyl, $C_{5-6}$-cycloalkyl and $C_{6-10}$-aryl $R^{Sia}$, $R^{Sib}$ and $R^{Sic}$ are independently selected from the group consisting of H, $C_{1-20}$-alkyl, $C_{2-20}$-alkenyl, $C_{2-20}$-alkynyl, $C_{5-6}$-cycloalkyl, $C_{6-10}$-aryl, —[O—$SiR^{Sid}R^{Sie}]_o$—$R^{Sif}$ wherein o is an integer from 1 to 50, $R^{Sid}$, $R^{Sie}$, $R^{Sif}$ are independently selected from the group consisting of H, $C_{1-30}$-alkyl, $C_{2-20}$-alkenyl, $C_{2-20}$-alkynyl, $C_{5-6}$-cycloalkyl, $C_{6-10}$-aryl, —[O—$SiR^{Sig}R^{Sih}]_p$—$R^{Sii}$, wherein p is an integer from 1 to 50, $R^{Sig}$, $R^{Sih}$, $R^{Sii}$ are independently selected from the group consisting of H, $C_{1-30}$-alkyl, $C_{2-20}$-alkenyl, $C_{2-20}$-alkynyl, $C_{5-6}$-cycloalkyl, $C_{6-10}$-aryl, O—$Si(CH_3)_3$, $R^5$, $R^6$, $R^{50}$, $R^{60}$, $R^{500}$ and $R^{600}$ are independently selected from the group consisting of H, $C_{1-20}$-alkyl, $C_{2-20}$-alkenyl, $C_{2-20}$-alkynyl, $C_{5-6}$-cycloalkyl, $C_{6-10}$-aryl, and 5 to 10 membered heteroaryl, $C_{1-20}$-alkyl, $C_{2-20}$-alkenyl and $C_{2-20}$-alkynyl can be substituted with one to ten substituents selected from the group consisting of halogen and CN.

In particular, $R^1$ is at each occurrence unsubstituted $C_{1-36}$-alkyl.

Preferably, $L^1$ and $L^2$ are independently from each other and at each occurrence selected from the group consisting of $C_{6-18}$-arylene, 5 to 20 membered heteroarylene, and

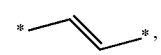, wherein $C_{6-18}$-arylene and 5 to 20 membered heteroarylene can be substituted with one to six substituents $R^3$ at each occurrence selected from the group consisting of $C_{1-30}$-alkyl, $C_{2-30}$-alkenyl, $C_{2-30}$-alkynyl, $C_{5-12}$-cycloalkyl, $C_{6-18}$-aryl and 5 to 20 membered heteroaryl, $OR^{31}$, $OC(O)-R^{31}$, $C(O)-OR^{31}$, $C(O)-R^{31}$, $NR^{31}R^{32}$, $NR^{31}-C(O)R^{32}$, $C(O)-NR^{31}R^{32}$, $SR^{31}$, halogen, CN, $SiR^{Siv}R^{Siw}R^{Six}$ and OH, and wherein

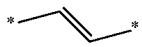

can be substituted with one or two substituents $R^4$ at each occurrence selected from the group consisting of $C_{1-30}$-alkyl, $C_{2-30}$-alkenyl, $C_{2-30}$-alkynyl, $C_{5-12}$-cycloalkyl, $C_{6-18}$-aryl and 5 to 20 membered heteroaryl, $C(O)R^{41}$, $C(O)-NR^{41}R^{42}$, $C(O)-OR^{41}$ and CN, wherein $R^{31}$, $R^{32}$, $R^{41}$ and $R^{42}$ are independently from each other and at each occurrence selected from the group consisting of H, $C_{1-30}$-alkyl, $C_{2-30}$-alkenyl, $C_{2-30}$-alkynyl, $C_{5-12}$-cycloalkyl, $C_{6-18}$-aryl and 5 to 20 membered heteroaryl, and wherein $C_{1-30}$-alkyl, $C_{2-30}$-alkenyl and $C_{2-30}$-alkynyl can be substituted with one to ten substituents independently selected from the group consisting of $C_{5-8}$-cycloalkyl, $C_{6-14}$-aryl, 5 to 14 membered heteroaryl, $OR^i$, $OC(O)-R^j$, $C(O)-OR^i$, $C(O)-R^i$, $NR^iR^j$, $NR^i-C(O)R^j$, $C(O)-NR^iR^j$, $N[C(O)R^i][C(O)R^j]$, $SR^i$, halogen, CN, $SiR^{Siv}R^{Siw}R^{Six}$ and $NO_2$; and at least two $CH_2$-groups, but not adjacent $CH_2$-groups of $C_{1-30}$-alkyl, $C_{2-30}$-alkenyl and $C_{2-30}$-alkynyl can be replaced by O or S, $C_{5-12}$-cycloalkyl can be substituted with one to six substituents independently selected from the group consisting of $C_{1-20}$-alkyl, $C_{2-20}$-alkenyl and $C_{2-20}$-alkynyl, $C_{5-8}$-cycloalkyl, $C_{6-14}$-aryl, 5 to 14 membered heteroaryl, $OR^i$, $OC(O)-R^j$, $C(O)-OR^i$, $C(O)-R^i$, $NR^iR^j$, $NR^i-C(O)R^j$, $C(O)-NR^iR^j$, $N[C(O)R^i][C(O)R^j]$, $SR^i$, halogen, CN, $SiR^{Siv}R^{Siw}R^{Six}$ and $NO_2$; and one or two $CH_2$-groups, but not adjacent $CH_2$-groups, of $C_{5-12}$-cycloalkyl can be replaced by O, S, OC(O), CO, $NR^i$ or $NR^i$—CO, $C_{6-18}$-aryl and 5 to 20 membered heteroaryl can be substituted with one to six substituents independently selected from the group consisting of $C_{1-20}$-alkyl, $C_{2-20}$-alkenyl, $C_{2-20}$-alkynyl, $C_{5-8}$-cycloalkyl, $C_{6-14}$-aryl, 5 to 14 membered heteroaryl, $OR^i$, $OC(O)-R^j$, $C(O)-OR^i$, $C(O)-R^i$, $NR^iR^j$, $NR^i-C(O)R^j$, $C(O)-NR^iR^j$, $N[C(O)R^i][C(O)R^j]$, $SR^i$, halogen, CN, $SiR^{Siv}R^{Siw}R^{Six}$ and $NO_2$, wherein $R^{Siv}$, $R^{Siw}$, $R^{Six}$ are independently from each other selected from the group consisting of H, $C_{1-20}$-alkyl, $C_{2-20}$-alkenyl, $C_{2-20}$-alkynyl, $C_{5-6}$-cycloalkyl, phenyl and O—Si(CH$_3$)$_3$, $R^i$ and $R^j$ are independently selected from the group consisting of H, $C_{1-20}$-alkyl, $C_{2-20}$-alkenyl, $C_{2-20}$-alkynyl, $C_{5-8}$-cycloalkyl, $C_{6-14}$-aryl, and 5 to 14 membered heteroaryl, wherein $C_{1-20}$-alkyl, $C_{2-20}$-alkenyl and $C_{2-20}$-alkynyl can be substituted with one to five substituents selected from the group consisting of $C_{5-6}$-cycloalkyl, $C_{6-10}$-aryl, 5 to 10 membered heteroaryl, $OR^k$, $OC(O)-R^l$, $C(O)-OR^k$, $C(O)-R^k$, $NR^kR^l$, $NR^k-C(O)R^l$, $C(O)-NR^kR^l$, $N[C(O)R^k][C(O)R^l]$, $SR^k$, halogen, CN, and $NO_2$;

$C_{5-8}$-cycloalkyl can be substituted with one to five substituents selected from the group consisting of $C_{1-10}$-alkyl, $C_{2-10}$-alkenyl, $C_{2-10}$-alkynyl, $C_{5-6}$-cycloalkyl, $C_{6-10}$-aryl, 5 to 10 membered heteroaryl, $OR^k$, $OC(O)-R^l$, $C(O)-OR^k$, $C(O)-R^k$, $NR^kR^l$, $NR^k-C(O)R^l$, $C(O)-NR^kR^l$, $N[C(O)R^k][C(O)R^l]$, $SR^k$, halogen, CN, and $NO_2$;

$C_{6-14}$-aryl and 5 to 14 membered heteroaryl can be substituted with one to five substituents independently selected from the group consisting of $C_{1-10}$-alkyl, $C_{2-10}$-alkenyl, $C_{2-10}$-alkynyl, $C_{5-6}$-cycloalkyl, $C_{6-10}$-aryl, 5 to 10 membered heteroaryl, $OR^k$, $OC(O)-R^l$, $C(O)-OR^k$, $C(O)-R^k$, $NR^kR^l$, $NR^k-C(O)R^l$, $C(O)-NR^kR^l$, $N[C(O)R^k][C(O)R^l]$, $SR^k$, halogen, CN, and $NO_2$;

wherein $R^k$ and $R^l$ are independently selected from the group consisting of H, $C_{1-10}$-alkyl, $C_{2-10}$-alkenyl and $C_{2-10}$-alkynyl, wherein $C_{1-10}$-alkyl, $C_{2-10}$-alkenyl and $C_{2-10}$-alkynyl can be substituted with one to five substituents selected from the group consisting of halogen, CN and $NO_2$.

More preferably, $L^1$ and $L^2$ are independently from each other and at each occurrence selected from the group consisting of 5 to 20 membered heteroarylene, and

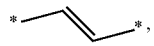

wherein 5 to 20 membered heteroarylene can be substituted with one to six substituents $R^3$ at each occurrence selected from the group consisting of $C_{1-30}$-alkyl, $C_{2-30}$-alkenyl, $C_{2-30}$-alkynyl, $C_{5-12}$-cycloalkyl, $C_{6-18}$-aryl and 5 to 20 membered heteroaryl, $OR^{31}$, $OC(O)-R^{31}$, $C(O)-OR^{31}$, $C(O)-R^{31}$, $NR^{31}R^{32}$, $NR^{31}-C(O)R^{32}$, $C(O)-NR^{31}R^{32}$, $SR^{31}$, halogen, CN, $SiR^{Siv}R^{Siw}R^{Six}$ and OH, and wherein

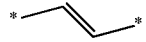

can be substituted with one or two substituents $R^4$ at each occurrence selected from the group consisting of $C_{1-30}$-alkyl, $C_{2-30}$-alkenyl, $C_{2-30}$-alkynyl, $C_{5-12}$-cycloalkyl, $C_{6-18}$-aryl and 5 to 20 membered heteroaryl, $C(O)-R^{41}$, $C(O)-NR^{41}R^{42}$, $C(O)-OR^{41}$ and CN, wherein $R^{31}$, $R^{32}$, $R^{41}$ and $R^{42}$ are independently from each other and at each occurrence selected from the group consisting of H, $C_{1-30}$-alkyl, $C_{2-30}$-alkenyl, $C_{2-30}$-alkynyl, $C_{5-12}$-cycloalkyl, $C_{6-18}$-aryl and 5 to 20 membered heteroaryl, and wherein
- $C_{1-30}$-alkyl, $C_{2-30}$-alkenyl and $C_{2-30}$-alkynyl can be substituted with one to ten substituents independently selected from the group consisting of $C_{5-8}$-cycloalkyl, $C_{6-14}$-aryl, 5 to 14 membered heteroaryl, $OR^i$, $OC(O)-R^j$, $C(O)-OR^i$, $C(O)-R^i$, $NR^iR^j$, $NR^i-C(O)R^j$, $C(O)-NR^iR^j$, $N[C(O)R^i][C(O)R^j]$, $SR^i$, halogen, CN, $SiR^{Siv}R^{Siw}R^{Six}$ and $NO_2$; and at least two $CH_2$-groups, but not adjacent $CH_2$-groups of $C_{1-30}$-alkyl, $C_{2-30}$-alkenyl and $C_{2-30}$-alkynyl can be replaced by O or S,
- $C_{5-12}$-cycloalkyl can be substituted with one to six substituents independently selected from the group consisting of $C_{1-20}$-alkyl, $C_{2-20}$-alkenyl and $C_{2-20}$-alkynyl, $C_{5-8}$-cycloalkyl, $C_{6-14}$-aryl, 5 to 14 membered heteroaryl, $OR^i$, $OC(O)-R^j$, $C(O)-OR^i$, $C(O)-R^i$, $NR^iR^j$, $NR^i-C(O)R^j$, $C(O)-NR^iR^j$, $N[C(O)R^i][C(O)R^j]$, $SR^i$, halogen, CN, $SiR^{Siv}R^{Siw}R^{Six}$ and $NO_2$; and one or two $CH_2$-groups, but not adjacent $CH_2$-groups, of $C_{5-12}$-cycloalkyl can be replaced by O, S, OC(O), CO, $NR^i$ or $NR^i-CO$,
- $C_{6-18}$-aryl and 5 to 20 membered heteroaryl can be substituted with one to six substituents independently selected from the group consisting of $C_{1-20}$-alkyl, $C_{2-20}$-alkenyl, $C_{2-20}$-alkynyl, $C_{5-8}$-cycloalkyl, $C_{6-14}$-aryl, 5 to 14 membered heteroaryl, $OR^i$, $OC(O)-R^j$, $C(O)-OR^i$, $C(O)-R^i$, $NR^iR^j$, $NR^i-C(O)R^j$, $C(O)-NR^iR^j$, $N[C(O)R^i][C(O)R^j]$, $SR^i$, halogen, CN, $SiR^{Siv}R^{Siw}R^{Six}$ and $NO_2$, wherein
- $R^{Siv}$, $R^{Siw}$, $R^{Six}$ are independently from each other selected from the group consisting of H, $C_{1-20}$-alkyl, $C_{2-20}$-alkenyl, $C_{2-20}$-alkynyl, $C_{5-6}$-cycloalkyl, phenyl and $O-Si(CH_3)_3$,
- $R^i$ and $R^j$ are independently selected from the group consisting of H, $C_{1-20}$-alkyl, $C_{2-20}$-alkenyl, $C_{2-20}$-alkynyl, $C_{5-8}$-cycloalkyl, $C_{6-14}$-aryl, and 5 to 14 membered heteroaryl,
  wherein
  - $C_{1-20}$-alkyl, $C_{2-20}$-alkenyl and $C_{2-20}$-alkynyl can be substituted with one to five substituents selected from the group consisting of $C_{5-6}$-cycloalkyl, $C_{6-10}$-aryl, 5 to 10 membered heteroaryl, $OR^k$, $OC(O)-R^l$, $C(O)-OR^k$, $C(O)-R^k$, $NR^kR^l$, $NR^k-C(O)R^l$, $C(O)-NR^kR^l$, $N[C(O)R^k][C(O)R^l]$, $SR^k$, halogen, CN, and $NO_2$;
  - $C_{5-8}$-cycloalkyl can be substituted with one to five substituents selected from the group consisting of $C_{1-10}$-alkyl, $C_{2-10}$-alkenyl, $C_{2-10}$-alkynyl, $C_{5-6}$-cycloalkyl, $C_{6-10}$-aryl, 5 to 10 membered heteroaryl, $OR^k$, $OC(O)-R^l$, $C(O)-OR^k$, $C(O)-R^k$, $NR^kR^l$, $NR^k-C(O)R^l$, $C(O)-NR^kR^l$, $N[C(O)R^k][C(O)R^l]$, $SR^k$, halogen, CN, and $NO_2$;
  - $C_{6-14}$-aryl and 5 to 14 membered heteroaryl can be substituted with one to five substituents independently selected from the group consisting of $C_{1-10}$-alkyl, $C_{2-10}$-alkenyl, $C_{2-10}$-alkynyl, $C_{5-6}$-cycloalkyl, $C_{6-10}$-aryl, 5 to 10 membered heteroaryl, $OR^k$, $OC(O)-R^l$, $C(O)-OR^k$, $C(O)-R^k$, $NR^kR^l$, $NR^k-C(O)R^l$, $C(O)-NR^kR^l$, $N[C(O)R^k][C(O)R^l]$, $SR^k$, halogen, CN, and $NO_2$;
    wherein
    - $R^k$ and $R^l$ are independently selected from the group consisting of H, $C_{2-10}$-alkenyl and $C_{2-10}$-alkynyl, wherein
$C_{1-10}$-alkyl, $C_{2-10}$-alkenyl and $C_{2-10}$-alkynyl can be substituted with one to five substituents selected from the group consisting of halogen, CN and $NO_2$.

Even more preferably, $L^1$ and $L^2$ are independently from each other and at each occurrence selected from the group consisting of 5 to 20 membered heteroarylene, and

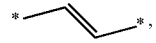

wherein 5 to 20 membered heteroarylene is selected from the group consisting of

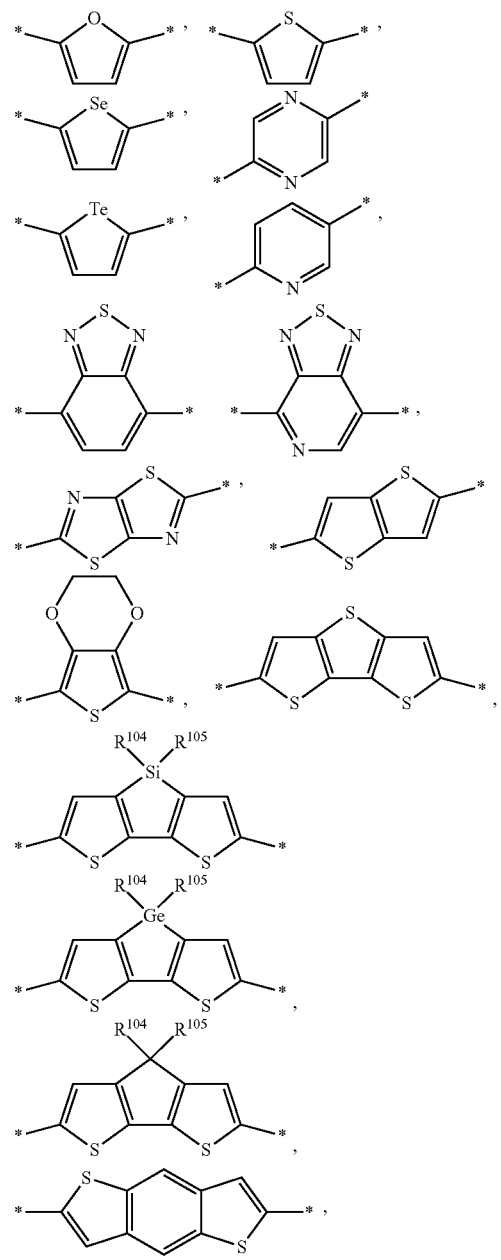

-continued

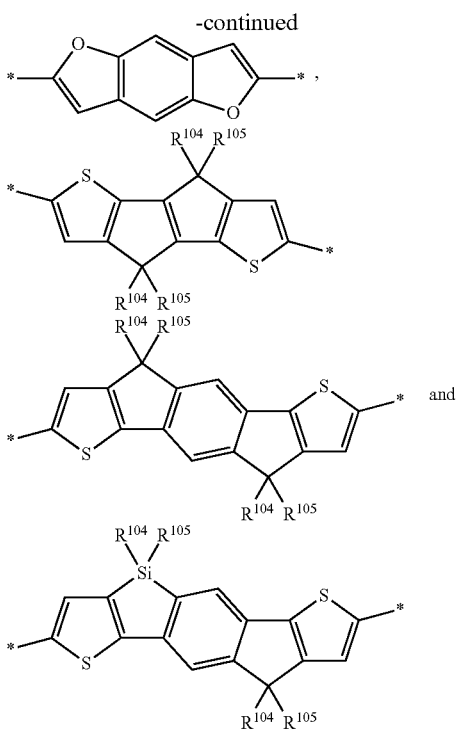

wherein
R$^{104}$ and R$^{105}$ are independently and at each occurrence selected from the group consisting of H, C$_{1-20}$-alkyl, C$_{2-20}$-alkenyl, C$_{2-20}$-alkynyl, C$_{5-8}$-cycloalkyl, C$_{6-14}$-aryl, and 5 to 14 membered heteroaryl, or R$^{104}$ and R$^{105}$, if attached to the same atom, together with the atom, to which they are attached, form a 5 to 12 membered ring system,
wherein
C$_{1-20}$-alkyl, C$_{2-20}$-alkenyl and C$_{2-20}$-alkynyl can be substituted with one to five substituents selected from the group consisting of C$_{5-6}$-cycloalkyl, C$_{6-10}$-aryl, 5 to 10 membered heteroaryl, OR$^u$, OC(O)—R$^u$, C(O)—OR$^u$, C(O)—R$^u$, NR$^u$R$^v$, NR$^u$—C(O)R$^v$, C(O)—NR$^u$R$^v$, N[C(O)R$^u$][C(O)R$^v$], SR$^u$, halogen, CN, and NO$_2$;
C$_{5-8}$-cycloalkyl can be substituted with one to five substituents selected from the group consisting of C$_{1-10}$-alkyl, C$_{2-10}$-alkenyl, C$_{2-10}$-alkynyl, C$_{5-6}$-cycloalkyl, C$_{6-10}$-aryl, 5 to 10 membered heteroaryl, OR$^u$, OC(O)—R$^u$, C(O)—OR$^u$, C(O)—R$^u$, NR$^u$R$^v$, NR$^u$—C(O)R$^v$, C(O)—NR$^u$R$^v$, N[C(O)R$^u$][C(O)R$^v$], SR$^u$, halogen, CN, and NO$_2$;
C$_{6-14}$-aryl and 5 to 14 membered heteroaryl can be substituted with one to five substituents independently selected from the group consisting of C$_{1-10}$-alkyl, C$_{2-10}$-alkenyl, C$_{2-10}$-alkynyl, C$_{5-6}$-cycloalkyl, C$_{6-10}$-aryl, 5 to 10 membered heteroaryl, OR$^u$, OC(O)—R$^u$, C(O)—OR$^u$, C(O)—R$^u$, NR$^u$R$^v$, NR$^u$—C(O)R$^v$, C(O)—NR$^u$R$^v$, N[C(O)R$^u$][C(O)R$^v$], SR$^u$, halogen, CN, and NO$_2$;
5 to 12 membered ring system can be substituted with one to five substituents selected from the group consisting of C$_{1-10}$-alkyl, C$_{2-10}$-alkenyl, C$_{2-10}$-alkynyl, C$_{5-6}$-cycloalkyl, C$_{6-10}$-aryl, 5 to 10 membered heteroaryl, OR$^u$, OC(O)—R$^u$, C(O)—OR$^u$, C(O)—R$^u$, NR$^u$R$^v$, NR$^u$—C(O)R$^v$, C(O)—NR$^u$R$^v$, N[C(O)R$^u$][C(O)R$^v$], SR$^u$, halogen, CN, and NO$_2$;

wherein
R$^u$ and R$^v$ are independently selected from the group consisting of H, C$_{1-10}$-alkyl, C$_{2-10}$-alkenyl and C$_{2-10}$-alkynyl,
wherein
C$_{1-10}$-alkyl, C$_{2-10}$-alkenyl and C$_{2-10}$-alkynyl can be substituted with one to five substituents selected from the group consisting of halogen, CN and NO$_2$,
wherein
5 to 20 membered heteroarylene can be substituted with one to four substituents R$^3$ at each occurrence selected from the group consisting of C$_{1-30}$-alkyl and halogen, and
wherein

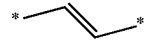

can be substituted with one or two substituents R$^4$ at each occurrence selected from the group consisting of C$_{1-30}$-alkyl, C(O)—R$^{41}$, C(O)—OR$^{41}$ and CN,
wherein
R$^{41}$ is at each occurrence C$_{1-30}$-alkyl.
Even even more preferably, L$^1$ and L$^2$ are independently from each other and at each occurrence selected from the group consisting of 5 to 20 membered heteroarylene, and

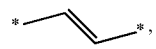

wherein 5 to 20 membered heteroarylene is selected from the group consisting of

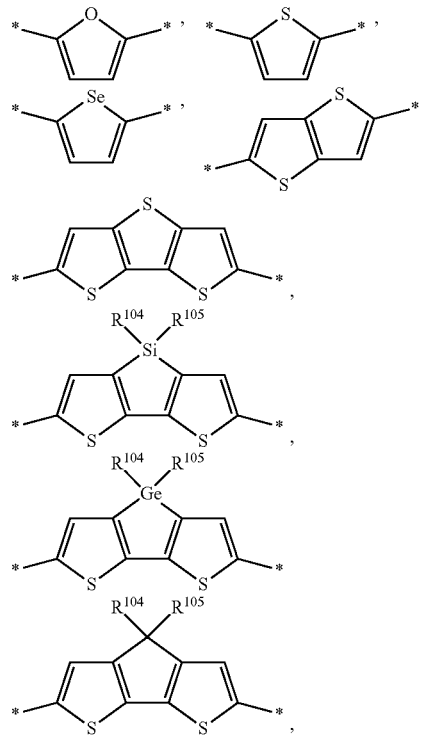

-continued

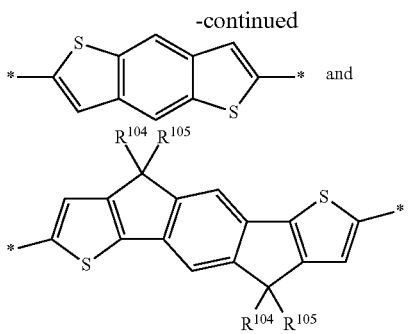
and wherein
R$^{104}$ and R$^{105}$ are independently and at each occurrence selected from the group consisting of H and C$_{1-20}$-alkyl,
wherein
5 to 20 membered heteroarylene can be substituted with one to four substituents R$^3$ at each occurrence selected from the group consisting of C$_{1-30}$-alkyl and halogen, and
wherein

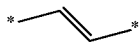

is unsubstituted.

Most preferably, L$^1$ and L$^2$ are independently from each other and at each occurrence selected from the group consisting of 5 to 20 membered heteroarylene, and

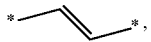, wherein 5 to 20 membered heteroarylene is

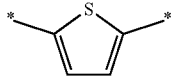

wherein
5 to 20 membered heteroarylene is unsubstituted, and
wherein

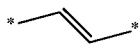

is unsubstituted.

In particular, L$^1$ and L$^2$ are independently from each other and at each occurrence 5 to 20 membered heteroarylene, wherein 5 to 20 membered heteroarylene is

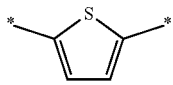

wherein
5 to 20 membered heteroarylene is unsubstituted.

Preferably, L$^3$ and are L$^4$ are independently from each other and at each occurrence selected from the group consisting of C$_{6-18}$-arylene and 5 to 20 membered heteroarylene
wherein
C$_{6-18}$-arylene and 5 to 20 membered heteroarylene can be substituted with one to six substituents R$^9$ at each occurrence selected from the group consisting of C$_{1-30}$-alkyl, C$_{2-30}$-alkenyl, C$_{2-30}$-alkynyl, C$_{5-12}$-cycloalkyl, C$_{6-18}$-aryl and 5 to 20 membered heteroaryl, OR$^{91}$, OC(O)—R$^{91}$, C(O)—OR$^{91}$, C(O)—R$^{91}$, NR$^{91}$R$^{92}$, NR$^{91}$—C(O)R$^{92}$, C(O)—NR$^{91}$R$^{92}$, SR$^{91}$, halogen, CN, SiR$^{Siy}$R$^{Siz}$R$^{Siaa}$ and OH, and
wherein
R$^{91}$ and R$^{92}$ are independently from each other and at each occurrence selected from the group consisting of H, C$_{1-30}$-alkyl, C$_{2-30}$-alkenyl, C$_{2-30}$-alkynyl, C$_{5-12}$-cycloalkyl, C$_{6-18}$-aryl and 5 to 20 membered heteroaryl, and
wherein
C$_{1-30}$-alkyl, C$_{2-30}$-alkenyl and C$_{2-30}$-alkynyl can be substituted with one to ten substituents independently selected from the group consisting of C$_{5-8}$-cycloalkyl, C$_{6-14}$-aryl, 5 to 14 membered heteroaryl, OR$'''$, OC(O)—R$'''$, C(O)—OR$'''$, C(O)—R$'''$, NR$'''$R$''$, NR$'''$—C(O)R$''$, C(O)—NR$''$R$'''$, N[C(O)R$''$][C(O)R$'''$], SR$''$, halogen, CN, SiR$^{Siy}$R$^{Siz}$R$^{Siaa}$ and NO$_2$; and at least two CH$_2$-groups, but not adjacent CH$_2$-groups of C$_{1-30}$-alkyl, C$_{2-30}$-alkenyl and C$_{2-30}$-alkynyl can be replaced by O or S,
C$_{5-12}$-cycloalkyl can be substituted with one to six substituents independently selected from the group consisting of C$_{1-20}$-alkyl, C$_{2-20}$-alkenyl, C$_{2-20}$-alkynyl, C$_{5-8}$-cycloalkyl, C$_{6-14}$-aryl, 5 to 14 membered heteroaryl, OR$'''$, OC(O)—R$'''$, C(O)—OR$'''$, C(O)—R$'''$, NR$'''$R$''$, NR$'''$—C(O)R$''$, C(O)—NR$''$R$'''$, N[C(O)R$'''$][C(O)R$''$], SR$'''$, halogen, CN, SiR$^{Siy}$R$^{Siz}$R$^{Siaa}$ and NO$_2$; and one or two CH$_2$-groups, but not adjacent CH$_2$-groups, of C$_{5-12}$-cycloalkyl can be replaced by O, S, OC(O), CO, NR$'''$ or NR$'''$—CO,
C$_{6-18}$-aryl and 5 to 20 membered heteroaryl can be substituted with one to six substituents independently selected from the group consisting of C$_{1-20}$-alkyl, C$_{2-20}$-alkenyl, C$_{2-20}$-alkynyl, C$_{5-8}$-cycloalkyl, C$_{6-14}$-aryl, 5 to 14 membered heteroaryl, OR$'''$, OC(O)—R$'''$, C(O)—OR$'''$, C(O)—R$'''$, NR$'''$R$''$, NR$'''$—C(O)R$''$, C(O)—NR$''$R$'''$, N[C(O)R$'''$][C(O)R$''$], SR$'''$, halogen, CN, SiR$^{Siy}$R$^{Siz}$R$^{Siaa}$ and NO$_2$,
R$^{Siy}$, R$^{Siz}$, R$^{Siaa}$ are independently from each other selected from the group consisting of H, C$_{1-20}$-alkyl, C$_{2-20}$-alkenyl, C$_{2-20}$-alkynyl, C$_{5-6}$-cycloalkyl, phenyl and O—Si(CH$_3$)$_3$,
wherein
R$'''$ and R$''$ are independently selected from the group consisting of H, C$_{1-20}$-alkyl, C$_{2-20}$-alkenyl, C$_{2-20}$-alkynyl, C$_{5-8}$-cycloalkyl, C$_{6-14}$-aryl, and 5 to 14 membered heteroaryl,
C$_{1-20}$-alkyl, C$_{2-20}$-alkenyl and C$_{2-20}$-alkynyl can be substituted with one to five substituents selected from the group consisting of C$_{5-6}$-cycloalkyl, C$_{6-10}$-aryl, 5 to 10 membered heteroaryl, OR$^o$, OC(O)—R$^o$, C(O)—OR$^o$, C(O)—R$^o$, NR$^o$R$^p$, NR$^o$—C(O)R$^p$, C(O)—NR$^o$R$^p$, N[C(O)R$^o$][C(O)R$^p$], SR$^o$, halogen, CN, and NO$_2$;
C$_{5-8}$-cycloalkyl can be substituted with one to five substituents selected from the group consisting of C$_{1-10}$-alkyl, C$_{2-10}$-alkenyl, C$_{2-10}$-alkynyl, C$_{5-6}$-cycloalkyl, C$_{6-10}$-aryl, 5 to 10 membered heteroaryl, OR°, OC(O)—R°, C(O)—OR°, C(O)—R°, NR°R$^p$, NR°—C(O)R$^p$, C(O)—NR°R$^p$, N[C(O)R°][C(O)R$^p$], SR°, halogen, CN, and NO$_2$;

$C_{6-14}$-aryl and 5 to 14 membered heteroaryl can be substituted with one to five substituents independently selected from the group consisting of $C_{1-10}$-alkyl, $C_{2-10}$-alkenyl, $C_{2-10}$-alkynyl, $C_{5-6}$-cycloalkyl, $C_{6-10}$-aryl, 5 to 10 membered heteroaryl, OR°, OC(O)—R°, C(O)—OR°, C(O)—R°, NR°R$^p$, NR°—C(O)R$^p$, C(O)—NR°R$^p$, N[C(O)R°][C(O)R$^p$], SR°, halogen, CN, and NO$_2$;

wherein

R° and R$^p$ are independently selected from the group consisting of H, $C_{1-10}$-alkyl, $C_{2-10}$-alkenyl and $C_{2-10}$-alkynyl, wherein $C_{1-10}$-alkyl, $C_{2-10}$-alkenyl and $C_{2-10}$-alkynyl can be substituted with one to five substituents selected from the group consisting of halogen, CN and NO$_2$.

More preferably, L$^3$ and are L$^4$ are independently from each other and at each occurrence 5 to 20 membered heteroarylene wherein 5 to 20 membered heteroarylene can be substituted with one to six substituents R$^9$ at each occurrence selected from the group consisting of $C_{1-30}$-alkyl, $C_{2-30}$-alkenyl, $C_{2-30}$-alkynyl, $C_{5-12}$-cycloalkyl, $C_{6-18}$-aryl and 5 to 20 membered heteroaryl, OR$^{91}$, OC(O)—R$^{91}$, C(O)—OR$^{91}$, C(O)—R$^{91}$, NR$^{91}$R$^{92}$, NR$^{91}$—C(O)R$^{92}$, C(O)—NR$^{91}$R$^{92}$, SR$^{91}$, halogen, CN, SiR$^{Siy}$R$^{Siz}$R$^{Siaa}$ and OH, and wherein R$^{91}$ and R$^{92}$ are independently from each other and at each occurrence selected from the group consisting of H, $C_{1-30}$-alkyl, $C_{2-30}$-alkenyl, $C_{2-30}$-alkynyl, $C_{5-12}$-cycloalkyl, $C_{6-18}$-aryl and 5 to 20 membered heteroaryl, and $C_{1-30}$-alkyl, $C_{2-30}$-alkenyl and $C_{2-30}$-alkynyl can be substituted with one to ten substituents independently selected from the group consisting of $C_{5-8}$-cycloalkyl, $C_{6-14}$-aryl, 5 to 14 membered heteroaryl, OR$^m$, OC(O)—R$^m$, C(O)—OR$^m$, C(O)—R$^m$, NR$^m$R$^n$, NR$^m$—C(O)R$^n$, C(O)—NR$^m$R$^n$, N[C(O)R$^n$][C(O)R$^m$], SR$^n$, halogen, CN, SiR$^{Siy}$R$^{Siz}$R$^{Siaa}$ and NO$_2$; and at least two CH$_2$-groups, but not adjacent CH$_2$-groups of $C_{1-30}$-alkyl, $C_{2-30}$-alkenyl and $C_{2-30}$-alkynyl can be replaced by O or S, $C_{5-12}$-cycloalkyl can be substituted with one to six substituents independently selected from the group consisting of $C_{1-20}$-alkyl, $C_{2-20}$-alkenyl, $C_{2-20}$-alkynyl, $C_{5-8}$-cycloalkyl, $C_{6-14}$-aryl, 5 to 14 membered heteroaryl, OR$^m$, OC(O)—R$^m$, C(O)—OR$^m$, C(O)—R$^m$, NR$^m$R$^n$, NR$^m$—C(O)R$^n$, C(O)—NR$^m$R$^n$, N[C(O)R$^n$][C(O)R$^m$], SR$^m$, halogen, CN, SiR$^{Siy}$R$^{Siz}$R$^{Siaa}$ and NO$_2$; and one or two CH$_2$-groups, but not adjacent CH$_2$-groups, of $C_{5-12}$-cycloalkyl can be replaced by O, S, OC(O), CO, NR$^m$ or NR$^m$—CO, $C_{6-18}$-aryl and 5 to 20 membered heteroaryl can be substituted with one to six substituents independently selected from the group consisting of $C_{1-20}$-alkyl, $C_{2-20}$-alkenyl, $C_{2-20}$-alkynyl, $C_{5-8}$-cycloalkyl, $C_{6-14}$-aryl, 5 to 14 membered heteroaryl, OR$^m$, OC(O)—R$^m$, C(O)—OR$^m$, C(O)—R$^m$, NR$^m$R$^n$, NR$^m$—C(O)R$^n$, C(O)—NR$^m$R$^n$, N[C(O)R$^m$][C(O)R$^n$], SR$^m$, halogen, CN, SiR$^{Siy}$R$^{Siz}$R$^{Siaa}$ and NO$_2$, R$^{Siy}$, R$^{Siz}$, R$^{Siaa}$ are independently from each other selected from the group consisting of H, $C_{1-20}$-alkyl, $C_{2-20}$-alkenyl, $C_{2-20}$-alkynyl, $C_{5-6}$-cycloalkyl, phenyl and O—Si(CH$_3$)$_3$, wherein R$^m$ and R$^n$ are independently selected from the group consisting of H, $C_{1-20}$-alkyl, $C_{2-20}$-alkenyl, $C_{2-20}$-alkynyl, $C_{5-8}$-cycloalkyl, $C_{6-14}$-aryl, and 5 to 14 membered heteroaryl, $C_{1-20}$-alkyl, $C_{2-20}$-alkenyl and $C_{2-20}$-alkynyl can be substituted with one to five substituents selected from the group consisting of $C_{5-6}$-cycloalkyl, $C_{6-10}$-aryl, 5 to 10 membered heteroaryl, OR°, OC(O)—R°, C(O)—OR°, C(O)—R°, NR°R$^p$, NR°—C(O)R$^p$, C(O)—NR°R$^p$, N[C(O)R°][C(O)R$^p$], SR°, halogen, CN, and NO$_2$;

$C_{5-8}$-cycloalkyl can be substituted with one to five substituents selected from the group consisting of $C_{1-10}$-alkyl, $C_{2-10}$-alkenyl, $C_{2-10}$-alkynyl, $C_{5-6}$-cycloalkyl, $C_{6-10}$-aryl, 5 to 10 membered heteroaryl, OR°, OC(O)—R°, C(O)—OR°, C(O)—R°, NR°R$^p$, NR°—C(O)R$^p$, C(O)—NR°R$^p$, N[C(O)R°][C(O)R$^p$], SR°, halogen, CN, and NO$_2$;

$C_{6-14}$-aryl and 5 to 14 membered heteroaryl can be substituted with one to five substituents independently selected from the group consisting of $C_{1-10}$-alkyl, $C_{2-10}$-alkenyl, $C_{2-10}$-alkynyl, $C_{5-6}$-cycloalkyl, $C_{6-10}$-aryl, 5 to 10 membered heteroaryl, OR°, OC(O)—R°, C(O)—OR°, C(O)—R°, NR°R$^p$, NR°—C(O)R$^p$, C(O)—NR°R$^p$, N[C(O)R°][C(O)R$^p$], SR°, halogen, CN, and NO$_2$;

wherein

R° and R$^p$ are independently selected from the group consisting of H, $C_{2-10}$-alkenyl and $C_{2-10}$-alkynyl, wherein $C_{1-10}$-alkyl, $C_{2-10}$-alkenyl and $C_{2-10}$-alkynyl can be substituted with one to five substituents selected from the group consisting of halogen, CN and NO$_2$.

Even more preferably, L$^3$ and are L$^4$ are independently from each other and at each occurrence 5 to 20 membered heteroarylene, wherein 5 to 20 membered heteroarylene is selected from the group consisting of

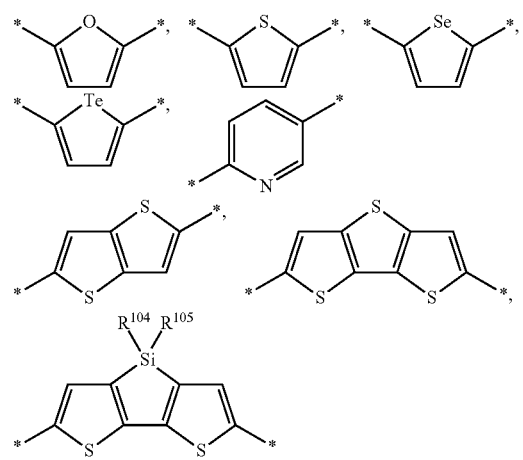

-continued

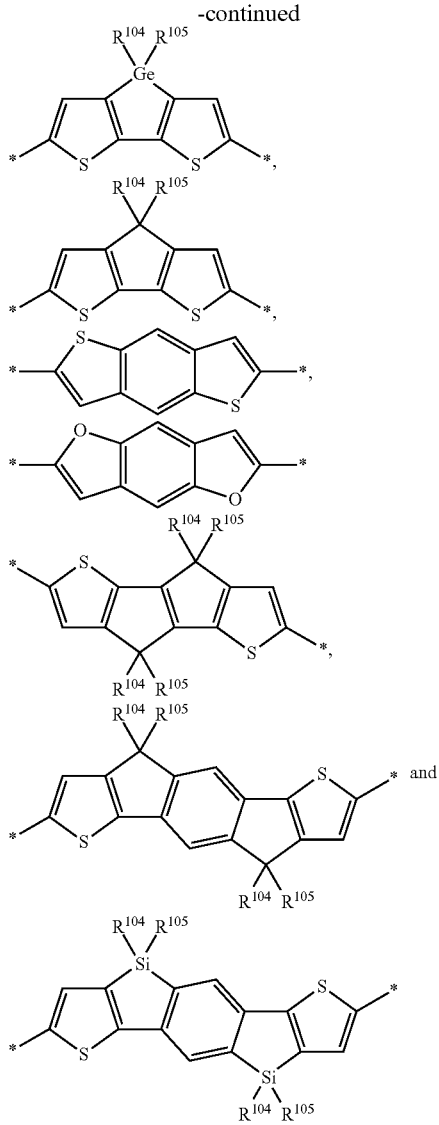

wherein $R^{104}$ and $R^{105}$ are independently and at each occurrence selected from the group consisting of H, $C_{1-20}$-alkyl, $C_{2-20}$-alkenyl, $C_{2-20}$-alkynyl, $C_{5-8}$-cycloalkyl, $C_{6-14}$-aryl, and 5 to 14 membered heteroaryl, or $R^{104}$ and $R^{105}$, if attached to the same atom, together with the atom, to which they are attached, form a 5 to 12 membered ring system, wherein $C_{1-20}$-alkyl, $C_{2-20}$-alkenyl and $C_{2-20}$-alkynyl can be substituted with one to five substituents selected from the group consisting of $C_{5-6}$-cycloalkyl, $C_{6-10}$-aryl, 5 to 10 membered heteroaryl, $OR^u$, $OC(O)$—$R^u$, $C(O)$—$OR^u$, $C(O)$—$R^u$, $NR^uR^v$, $NR^u$—$C(O)R^v$, $C(O)$—$NR^uR^v$, $N[C(O)R^u][C(O)R^v]$, $SR^u$, halogen, CN, and $NO_2$;

$C_{5-8}$-cycloalkyl can be substituted with one to five substituents selected from the group consisting of $C_{1-10}$-alkyl, $C_{2-10}$-alkenyl, $C_{2-10}$-alkynyl, $C_{5-6}$-cycloalkyl, $C_{6-10}$-aryl, 5 to 10 membered heteroaryl, $OR^u$, $OC(O)$—$R^u$, $C(O)$—$OR^u$, $C(O)$—$R^u$, $NR^uR^v$, $NR^u$—$C(O)R^v$, $C(O)$—$NR^uR^v$, $N[C(O)R^u][C(O)R^v]$, $SR^u$, halogen, CN, and $NO_2$;

$C_{6-14}$-aryl and 5 to 14 membered heteroaryl can be substituted with one to five substituents independently selected from the group consisting of $C_{1-10}$-alkyl, $C_{2-10}$-alkenyl, $C_{2-10}$-alkynyl, $C_{5-6}$-cycloalkyl, $C_{6-10}$-aryl, 5 to 10 membered heteroaryl, $OR^u$, $OC(O)$—$R^u$, $C(O)$—$OR^u$, $C(O)$—$R^u$, $NR^uR^v$, $NR^u$—$C(O)R^v$, $C(O)$—$NR^uR^v$, $N[C(O)R^u][C(O)R^v]$, $SR^u$, halogen, CN, and $NO_2$;

5 to 12 membered ring system can be substituted with one to five substituents selected from the group consisting of $C_{1-10}$-alkyl, $C_{2-10}$-alkenyl, $C_{2-10}$-alkynyl, $C_{5-6}$-cycloalkyl, $C_{6-10}$-aryl, 5 to 10 membered heteroaryl, $OR^u$, $OC(O)$—$R^u$, $C(O)$—$OR^u$, $C(O)$—$R^u$, $NR^uR^v$, $NR^u$—$C(O)R^v$, $C(O)$—$NR^uR^v$, $N[C(O)R^u][C(O)R^v]$, $SR^u$, halogen, CN, and $NO_2$;

wherein $R^u$ and $R^v$ are independently selected from the group consisting of H, $C_{1-10}$-alkyl, $C_{2-10}$-alkenyl and $C_{2-10}$-alkynyl, wherein $C_{1-10}$-alkyl, $C_{2-10}$-alkenyl and $C_{2-10}$-alkynyl can be substituted with one to five substituents selected from the group consisting of halogen, CN and $NO_2$, wherein 5 to 20 membered heteroarylene can be substituted with one to three substituents $R^9$ at each occurrence selected from the group consisting of $C_{1-30}$-alkyl and halogen.

Most preferably, $L^3$ and $L^4$ are independently from each other and at each occurrence 5 to 20 membered heteroarylene, wherein 5 to 20 membered heteroarylene is selected from the group consisting of

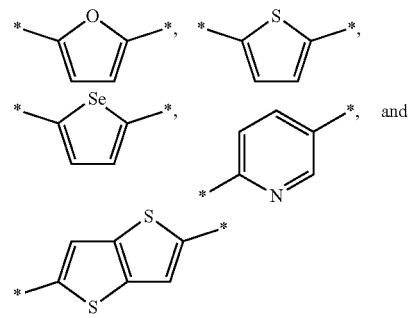

wherein 5 to 20 membered heteroarylene can be substituted with one substituent $R^9$ at each occurrence selected from the group consisting of $C_{1-30}$-alkyl and halogen.

In particular, $L^3$ and $L^4$ are independently from each other and at each occurrence 5 to 20 membered heteroarylene, wherein 5 to 20 membered heteroarylene is

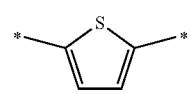

wherein 5 to 20 membered heteroarylene is unsubstituted.

Preferably, A is selected from the group consisting of

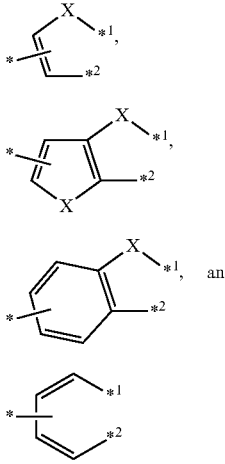

wherein
X is at each occurrence O, S or NR$^1$, and
A1, A2, A3 and A4 can be substituted with one to three substituents R$^2$.
More preferably, A is

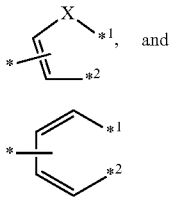

wherein
X is at each occurrence S or NR$^1$, and
A1 and A4 can be substituted with one to three substituents R$^2$.
Most preferably, A is

A4

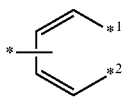

wherein
A4 is not substituted.
Preferably, B is selected from the group consisting of

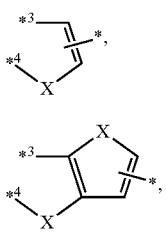

wherein
X is at each occurrence O, S or NR$^1$, and
B1, B2, B3 and B4 can be substituted with one to three substituents R$^2$.
More preferably, B is

B1

*3—$\overset{*}{\underset{X}{\diagdown}}$*, or

B4

*3—$\diagup$*
*4—$\diagdown$ wherein
X is at each occurrence S or NR$^1$, and
B1 and B4 can be substituted with one to three substituents R$^2$.
Most preferably, B is

B4

*3—$\diagup$*
*4—$\diagdown$* wherein
B4 is not substituted.
Preferably, R$^2$ is at each occurrence selected from the group consisting of C$_{1-30}$-alkyl and halogen,
wherein
C$_{1-30}$-alkyl can be substituted with one to ten substituents independently selected from the group consisting of C$_{5-8}$-cycloalkyl, C$_{6-14}$-aryl, 5 to 14 membered heteroaryl, OR$^e$, OC(O)—R$^e$, C(O)—OR$^e$, C(O)—R$^e$, NR$^e$R$^f$, NR$^e$—C(O)R$^f$, C(O)—NR$^e$R$^f$, N[C(O)R$^e$][C(O)R$^f$], SR$^e$, halogen, CN, SiR$^{Sis}$R$^{Sit}$R$^{Siu}$ and NO$_2$; and
at least two CH$_2$-groups, but not adjacent CH$_2$-groups, of C$_{1-30}$-alkyl can be replaced by O or S,
wherein
R$^{Sis}$, R$^{Sit}$ and R$^{Siu}$ are independently from each other selected from the group consisting of H, C$_{1-20}$-alkyl, C$_{2-20}$-alkenyl, C$_{2-20}$-alkynyl, C$_{5-6}$-cycloalkyl, phenyl and O—Si(CH$_3$)$_3$,
R$^e$ and R$^f$ are independently selected from the group consisting of H, C$_{1-20}$-alkyl, C$_{2-20}$-alkenyl, C$_{2-20}$-alkynyl, C$_{5-8}$-cycloalkyl, C$_{6-14}$-aryl, and 5 to 14 membered heteroaryl,
C$_{1-20}$-alkyl, C$_{2-20}$-alkenyl and C$_{2-20}$-alkynyl can be substituted with one to five substituents selected from the group consisting of C$_{5-6}$-cycloalkyl, C$_{6-10}$- aryl, 5 to 10 membered heteroaryl, $OR^g$, $OC(O)$—$R^g$, $C(O)$—$OR^g$, $C(O)$—$R^g$, $NR^gR^h$, $NR^g$—$C(O)R^h$, $C(O)$—$NR^gR^h$, $N[C(O)R^g][C(O)R^h]$, $SR^g$, halogen, CN, and $NO_2$;

$C_{5-8}$-cycloalkyl can be substituted with one to five substituents selected from the group consisting of $C_{1-10}$-alkyl, $C_{2-10}$-alkenyl, $C_{2-10}$-alkynyl, $C_{5-6}$-cycloalkyl, $C_{6-10}$-aryl, 5 to 10 membered heteroaryl, $OR^g$, $OC(O)$—$R^g$, $C(O)$—$OR^g$, $C(O)$—$R^g$, $NR^gR^h$, $NR^g$—$C(O)R^h$, $C(O)$—$NR^gR^h$, $N[C(O)R^g][C(O)R^h]$, $SR^g$, halogen, CN, and $NO_2$;

$C_{6-14}$-aryl and 5 to 14 membered heteroaryl can be substituted with one to five substituents independently selected from the group consisting of $C_{1-10}$-alkyl, $C_{2-10}$-alkenyl, $C_{2-10}$-alkynyl, $C_{5-6}$-cycloalkyl, $C_{6-10}$-aryl, 5 to 10 membered heteroaryl, $OR^g$, $OC(O)$—$R^g$, $C(O)$—$OR^g$, $C(O)$—$R^g$, $NR^gR^h$, $NR^g$—$C(O)R^h$, $C(O)$—$NR^gR^h$, $N[C(O)R^g][C(O)R^h]$, $SR^g$, halogen, CN, and $NO_2$;

wherein $R^g$ and $R^h$ are independently selected from the group consisting of H, $C_{1-10}$-alkyl, $C_{2-10}$-alkenyl and $C_{2-10}$-alkynyl, wherein $C_{1-10}$-alkyl, $C_{2-10}$-alkenyl and $C_{2-10}$-alkynyl can be substituted with one to five substituents selected from the group consisting of halogen, CN and $NO_2$.

More preferably, $R^2$ is at each occurrence selected from the group consisting of unsubstituted $C_{1-30}$-alkyl and halogen.

Most preferably $M^1$ or $M^2$ are not substituted by a substituent $R^2$.

In every case where an alkenyl or alkynyl substituent is bound to an O, N, or S atom, the double bond or triple bond is preferably not directly bound to the hetero atom.

In every case where an alkenyl or alkynyl substituent is bound to an O, N, or S atom, the alkenyl or alkynyl substituent is preferably at least a $C_3$-alkenyl or a $C_3$-alkynyl moiety.

The polymers of the invention can be prepared through a direct condensation of diamines containing r units $M^1$ and dialdehydes containing s units $M^2$ or of dialdehydes containing r units $M^1$ and diamines containing s units $M^2$. The polymers of the invention can be synthesized without any noble metal catalyst and without any toxic phosphorous ligands.

The present invention also provides for a process for preparing the degradable polymer of the invention, comprising the step of reacting monomers (1a) with monomers (2a)

$H_2N$-[-$M^1$-]$_r$-$NH_2$ (1a)

OHC-[-$M^2$-]$_s$-CHO (2a)

or the step of reacting monomers (1b) with monomers (2b)

OHC-[-$M^1$-]$_r$-CHO (1b)

$H_2N$-[-$M^2$-]$_s$-$NH_2$ (2b)

The present invention also provides for a process for separating semiconducting single-walled carbon nanotubes from a mixture of semiconducting and metallic single-walled carbon nanotubes, comprising the steps:

(i) Providing a mixture A of semiconducting and metallic single-walled carbon nanotubes;

(ii) Dispersing the mixture A containing semiconducting and metallic single-walled carbon nanotubes in a solvent using the degradable polymer of the invention as a dispersing agent to obtain a dispersion B of the semiconducting single-walled carbon nanotubes in a solvent, the dispersion further containing metallic single-walled carbon nanotubes;

(iii) Separating the metallic single-walled carbon nanotubes from the dispersion B of the semiconducting single-walled carbon nanotubes in a solvent, to obtain an enriched dispersion C of the semiconducting single-walled carbon nanotubes in a solvent;

(iv) Degrading by hydrolysis the polymer of the invention in dispersion C of the semiconducting single-walled carbon nanotubes in a solvent;

(v) Separating the semiconducting single-walled carbon nanotubes from a solution D containing a solvent and the degraded polymer.

The present invention also provides for a process for preparing semiconducting single-walled carbon nanotubes, comprising steps (i) to (v).

In another embodiment the present invention also provides for a process for preparing semiconducting single-walled carbon nanotubes, comprising steps (i) to (iii).

Solvents can be halogenated or non-halogenated, aromatic or non-aromatic, heteroaromatic or non-heteroaromatic.

Suitable solvents are e.g. aromatic solvents, preferably selected from the group consisting of benzene, naphthalene, biphenyl and mixtures thereof, which benzene, naphthalene and biphenyl can be substituted with one to four substituents independently selected from the group consisting of halogen, $C_{1-20}$-alkyl, wherein $C_{1-20}$-alkyl can be substituted with one or more halogen. Naphthalenes and biphenyls are preferably used in their liquid forms at temperatures above their melting points.

Examples of aromatic solvents are benzene, toluene, o-xylene, m-xylene, p-xylene, 1,3,5-trimethylbenzene (mesitylene), 1,2,3-trimethylbenzene, 1,2,4-trimethylbenzene, chloro-benzene, 1,2-dichlorobenzene (ortho-dichlorobenzene), 1,3-dichlorobenzene, 1,2,4-trichlorobenzene, indane, tetraline, methoxybenzene (anisol), ethylbenzene, 1,2-diethylbenzene, 1,3-diethylbenzene, 1,4-diethylbenzene, propylbenzene, butyl-benzene, tert-butyl-benzene, isopropylbenzene, 1-methylnaphthalene, 2-methylnaphthalene and 1-chloronaphthalene.

Suitable solvents are also heteroaromatic solvents, preferably selected from the group consisting of thiophene, furan, pyridine, pyrrole, pyrimidine and mixtures thereof, which thiophene, furan, pyridine, pyrrole and pyrimidine can be substituted with one to four substitutents independently selected from the group consisting of halogen and $C_{1-20}$-alkyl, wherein $C_{1-20}$-alkyl can be substituted with one or more halogen.

Examples of heteroaromatic solvents are thiophene, 2-methyl-thiophene, 3-methyl-thiophene, pyridine, 2-methyl-pyridine, 3-methyl-pyridine, 4-methyl-pyridine, 2,4-dimethyl-pyridine and 2,4,6-trimethylpyridine.

In particular, the solvent is toluene, or mixtures containing toluene.

Preferably, the mixture A of semiconducting and metallic single-walled carbon nanotubes contains 20 to 95% by weight of semiconducting single-walled carbon nanotubes and 80-5% by weight of metallic single-walled carbon nanotubes based on the sum of the weight of semiconducting and metallic single-walled carbon nanotubes.

More preferably, the mixture A contains 30 to 95% by weight of semiconducting single-walled carbon nanotubes and 70-5% by weight of metallic single-walled carbon nanotubes based on the sum of the weight of semiconducting and metallic single-walled carbon nanotubes.

Even more preferably, the mixture A contains 40 to 95% by weight of semiconducting single-walled carbon nanotubes and 60-5% by weight of metallic single-walled carbon nanotubes based on the sum of the weight of semiconducting and metallic single-walled carbon nanotubes.

Preferably, the diameter of the semiconducting and metallic single-walled carbon nanotubes in mixture A is in the range of 0.5 to 5 nm. More preferably, the diameter of the semiconducting and metallic single-walled carbon nanotubes in the mixture is in the range of 0.8 to 2.5 nm. Most preferably, the diameter of the semiconducting and metallic single-walled carbon nanotubes in the mixture is in the range of 1.0 to 2.0 nm.

Preferably, the concentration of the semiconducting and metallic single-walled carbon nanotubes in the dispersion B is in the range of 0.001 to 20% by weight, more preferably in the range of 0.001 to 10% by weight, even more preferably in the range of 0.001 to 5% by weight, still more preferably in the range of 0.001 to 1% by weight, and most preferably in the range of 0.01 to 1% by weight.

Preferably, the weight ratio of the sum of semiconducting and metallic single-walled carbon nanotubes/polymer of the invention in the dispersion B is in the range of 0.01/1 to 10/1, preferably in the range of 0.05/1 to 5/1 and more preferably in the range of 0.25/1 to 3/1.

The mixture A of semiconducting and metallic single-walled carbon nanotubes can be prepared by methods known in the art such as arc discharge, laser ablation, plasma torch process or catalytic decomposition of carbon bearing molecules (CVD).

Preferably, the mixture A of semiconducting and metallic single-walled carbon nanotubes is prepared by arc discharge and plasma torch process.

Usually, the dispersion B of the semiconducting single-walled carbon nanotubes in the solvent is prepared in step (ii) by means of ultrasonication.

Preferably, the metallic single-walled carbon nanotubes are separated from the dispersion B of the semiconducting single-walled carbon nanotubes in the solvent in step (iii) by a centrifugation process. Preferably, the angular velocity used in the centrifugation process relates to g-values in the range of 100 to 100 000 g, more preferably in the range of 500 to 50 000 g and even more preferably in the range of 1 000 to 50 000 g. Most preferably, the g-values used in the centrifugation process are in the range of 4 000 to 30 000 g.

Any suitable type of centrifuge can be used in the centrifugation process such as microcentrifuge, high-speed centrifuge and ultracentrifuge. Preferably, a high-speed centrifuge is used.

Usually, the centrifugation process is performed at a temperature of 0 to 100° C., more preferably 0 to 50° C., even more preferably 0 to 30° C., most preferably 5 to 20° C., and in particular 10 to 20° C.

Preferably, the centrifugation process is followed by the collection of the supernatant liquid, in order to obtain the dispersion C of the semiconducting single-walled carbon nanotubes in the solvent, which can optionally be diluted with further solvent.

Preferably, the concentration of the semiconducting single-walled carbon nanotubes in the dispersion C is in the range of 0.0001 to 10% by weight, more preferably in the range of 0.001 to 10% by weight and most preferably in the range of 0.001 to 1% by weight.

The polymer of the invention in the dispersion C is degraded by hydrolysis, in general under acidic conditions by adding a catalytic amount of acid. Suitable acids are trifluoroacetic acid (TFA), acetic acid, p-toluenesulfonic acid (pTsOH), HCl, $H_2SO_4$, $HNO_3$.

The hydrolysis in step (iv) is performed at a temperature of 0 to 200° C., more preferably 0 to 100° C., even more preferably 20 to 80° C., especially room temperature.

Preferably, the hydrolysis of the degradable polymer in step (iv) is aided by ultrasonification and heating.

Preferably, the semiconducting single-walled carbon nanotubes are separated in step (v) by a centrifugation process from the solution D containing the solvent and the degraded polymer. The conditions of the centrifugation are as described above for step (iii).

The solution D contains the monomers from which the polymer of the invention is prepared. In an optional further step (vi), the monomers are isolated from solution D, preferably by flash column chromatography, in order to obtain pure monomers for polymer re-synthesis.

BRIEF DESCRIPTION OF THE SEVERAL VIEWS OF THE DRAWINGS

1. Polymer Synthesis and Characterization

Materials and General Methods

All reagents and starting materials were purchased from commercial sources and used without further purification. Thermal gravimetric analyses (TGA) were performed using a Mettler Toledo TGA/SDTA 851e at a heating rate of 10° C./min under a nitrogen flow (20 mL/min). Gel permeation chromatography (GPC) was performed on Tosoh High-temperature EcoSEC (RI detector) at high-temperature of 180° C. using 1,2,4-tricholorobenzene (TCB) as eluent. Compounds 1 was prepared according to the literature procedure. 2 was purchased from Sigma-Aldrich.

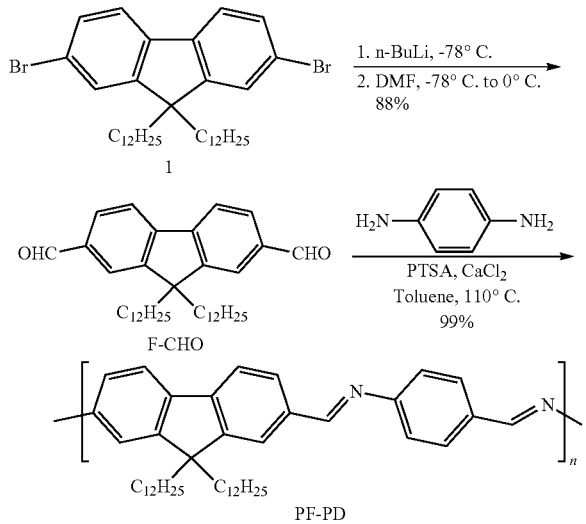

Scheme 1 Synthesis of the degradable polymers.

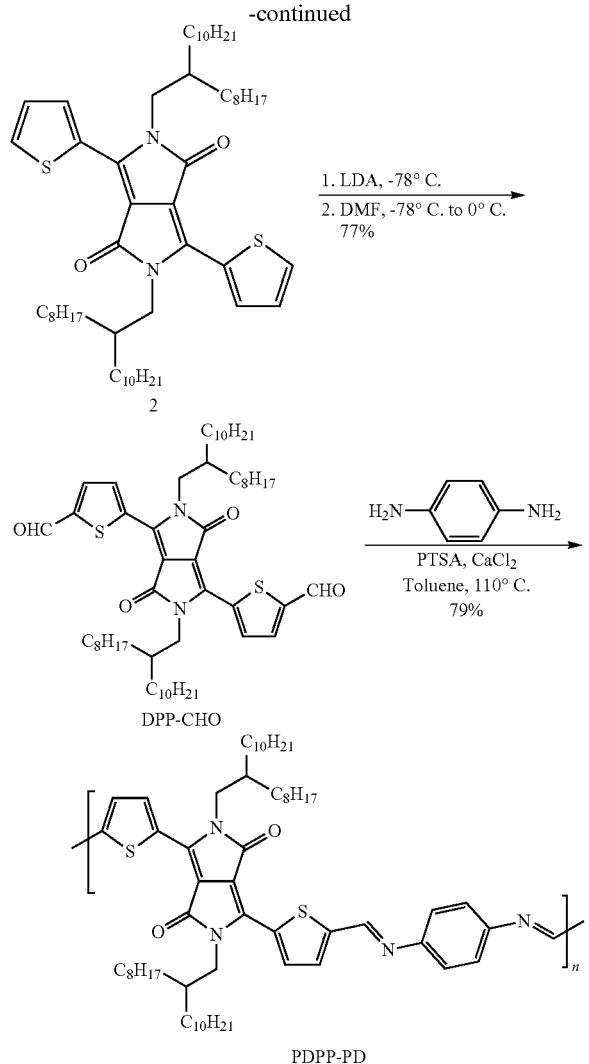

Compared with traditional conjugated polymers that synthesized with cross-coupling reactions (e.g. Suzuki or Stille coupling), the polymers of the invention can be synthesized without any noble metal catalysts and toxic phosphorous ligands. Thus the degradable polymers of the invention are cheaper and more environmentally friendly. The imine bonds are environmentally stable at ambient conditions, and no polymer degradation was observed for over six-month storage. Both polymers show excellent thermal stability with decomposition temperature over 400° C. (FIG. 1).

Figure 1:
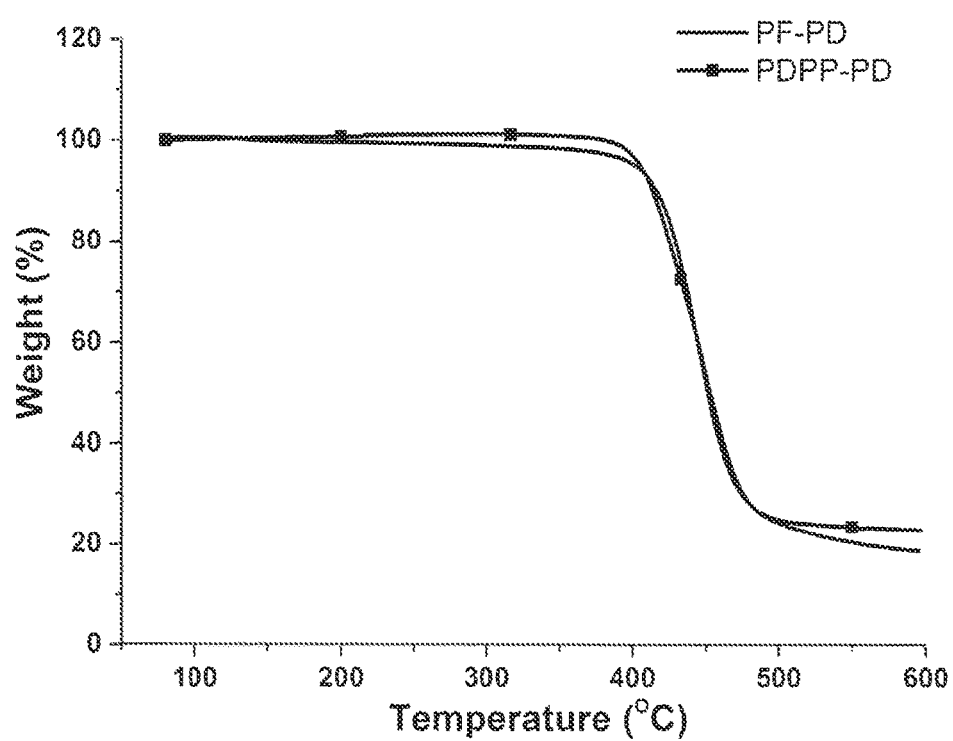

FIG. 1 shows Thermogravimetric analyses (TGA) of PDPP-PD (5% loss, 404° C.) and PFPD (5% loss, 400° C.).

Example 1

9,9-didodecyl-9H-fluorene-2,7-dicarbaldehyde (F-CHO): To a 100 mL round bottom flask, compound 1 (3 g, 4.54 mmol) and ethyl ether (40 mL) was added. n-BuLi (2.5 M, 4.54 mL, 11.4 mmol) was added at −78° C. After stirring at −78° C. for 30 min, dry DMF (1.16 g, 15.9 mmol) was added dropwise at −78° C. The mixture was allowed to warm up to room temperature and stirred for 1 h. Then the mixture was quenched with HCl (50 mL, 1 M aqueous solution). The aqueous layer was extracted with dichloromethane (3×50 mL). The combined extracts were washed with distilled water and dried over anhydrous $Na_2SO_4$. After removal of the solvents under reduced pressure, the residue was purified via chromatography with silica (eluent: hexane/dichloromethane=4/1 to 1/1) to afford F-CHO as an off-white solid. Yield: 2.23 g (88%). $^1$H NMR ($CDCl_3$, 300 MHz, ppm): δ 10.10 (s, 2H), 8.00-7.84 (m, 6H), 2.13-2.00 (m, 4H), 1.38-0.93 (m, 36H), 0.85 (t, J=6.8 Hz, 6H), 0.62-0.44 (m, 4H).

Example 2

5,5'-(2,5-bis(2-octyldodecyl)-3,6-dioxo-2,3,5,6-tetrahydropyrrolo[3,4-c]pyrrole-1,4-diyl)bis(thiophene-2-carbaldehyde) (DPP-CHO): To a 100 mL round bottom flask, diisopropylamine (0.98 mL, 6.96 mmol) and THF (50 mL) was added. n-BuLi (1.6 M, 2.9 mL, 4.64 mmol) was added and stirred at 0° C. for 30 min to prepare fresh lithium diisopropylamide (LDA). Compound 2 (1.0 g, 1.16 mmol) was then added dropwise into the flask at −78° C. After stirring at −78° C. for 30 min, dry DMF (0.46 mL, 6.96 mmol) was added dropwise at −78° C. The mixture was allowed to warm up to room temperature and stir for 1 h. Then the mixture was quenched with 20 mL of water. The aqueous layer was extracted with dichloromethane (3×50 mL). The combined extracts were washed with distilled water and dried over anhydrous $Na_2SO_4$. After removal of the solvents under reduced pressure, the residue was purified via chromatography with silica (eluent: hexane/ethyl acetate=20/1 to 10/1) to afford DPP-CHO as a dark red solid. Yield: 0.82 g (77%). $^1$H NMR ($CDCl_3$, 300 MHz, ppm): δ 10.03 (s, 2H), 9.04-9.02 (d, J=4.2 Hz, 2H), 7.88-7.86 (d, J=4.2 Hz, 2H), 4.05-4.03 (d, J=7.7 Hz, 4H), 1.89-1.86 (m, 2H), 1.45-1.18 (m, 64H), 0.94-0.81 (m, 12H).

Example 3

Polymerization for PF-PD: To a Schlenk tube (100 mL), F-CHO (800 mg, 1.43 mmol), p-phenylenediamine (154.8 mg, 1.43 mmol), p-toluenesulfonic acid (PTSA) (13.6 mg, 0.0715 mmol, 5 mol %), anhydrous $CaCl_2$ (200 mg), and anhydrous toluene (50 mL) were added under nitrogen atomsphere. The tube was then sealed under nitrogen atomsphere. The mixture was stirred for 48 h at 110° C. After completion, dry $K_2CO_3$ (20 mg) was added and the mixture was stirred at 110° C. for 30 mins. Then the mixture was filtered through a nylon filter to remove the drying agent and any insoluble salts. After removing the solvent in the filtrate, the polymers were collected to afford a yellow solid (890 mg, yield 99%). $^1$H NMR ($C_2D_2Cl_4$, 400 MHz, ppm): δ 8.64-8.57 (m, 2H), 8.00-7.83 (m, 6H), 7.40-7.23 (m, 2H), 6.77-6.74 (m, 2H), 2.12-2.05 (m, 4H), 1.28-1.06 (m, 36H), 0.88-0.85 (t, J=6.8 Hz, 6H), 0.69-0.55 (m, 4H). Molecular weight from HT-GPC, $M_w$: 15,580 Da, PDI: 2.19.

Example 4

Polymerization for PDPP-PD: To a Schlenk tube (100 mL), DPP-CHO (250 mg, 0.273 mmol), p-phenylenediamine (29.5 mg, 0.273 mmol), p-toluenesulfonic acid (PTSA) (2.6 mg, 0.014 mmol, 5 mol %), anhydrous $CaCl_2$ (100 mg, drying agent), and anhydrous toluene (30 mL) were added under nitrogen atomsphere. The tube was then sealed under nitrogen atomsphere. The mixture was stirred for 48 h at 110° C. After completion, dry $K_2CO_3$ (10 mg) was added and the mixture was stirred at 110° C. for 30 mins. Then the mixture was filtered through a nylon filter to remove the drying agent and any insoluble salts. After removing the solvent in the filtrate, the polymers were purified via Soxhlet extraction for 2 h with dry acetone, 2 h with hexane, and finally was collected with chloroform. The chloroform fraction was then evaporated to remove the solvent and afford a dark green solid (213 mg, yield 79%). $^1$H NMR ($C_2D_2Cl_4$, 400 MHz, 393 K, ppm): δ 10.07-10.05 (m, 2H), 8.95-8.67 (m, 3H), 7.89-7.67 (m, 2H), 7.40 (m, 1H), 7.26-7.24 (m, 1H), 6.76-6.74 (m, 1H), 4.15-4.07 (m, 4H), 2.06-2.19 (m, 2H), 1.51-1.32 (m, 64H), 0.96-0.93 (m, 12H). Molecular weight from HT-GPC, $M_w$: 39,574 Da, PDI: 2.64.

2. Polymer Degradation Under Acidic Conditions

Example 5

To explore the polymer degradation process, we prepared polymer solutions in THF and monitored their degradation process by UV-Vis-NIR spectroscopy (Cary 6000i spectrophotometer, Varian) after adding a small amount of trifluoroacetic acid (TFA) and a drop of DI water. The degradation can also be performed in toluene, which requires sonication (bath sonicator) to accelerate the degradation reaction, because water has low solubility in toluene.

Figure 2:
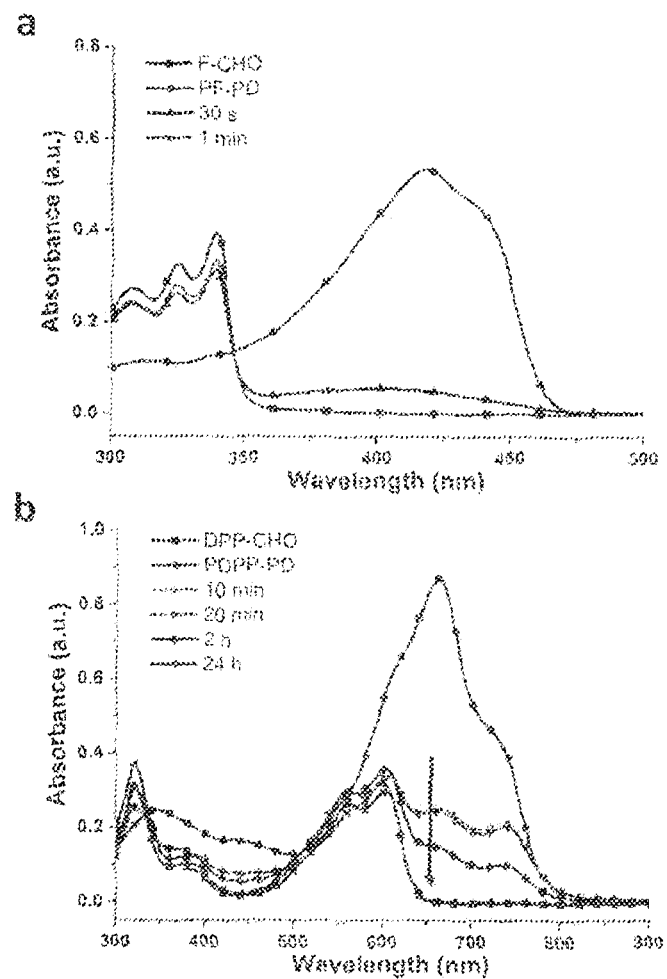

FIG. 2a, b show polymer degradation under the catalysis of acid. Absorption spectrum changes of (a) PF-PD and (b) PDPP-PD after adding a small amount of trifluoroacetic acid (TFA) and a drop of water.

FIG. 2a, b display the degradation process of polymer PF-PD and PDPP-PD, respectively, under acidic conditions at room temperature. Both polymers can be degraded into monomers under a catalytic amount of acid. After complete degradation, their absorption spectra were almost identical as their monomers. PF-PD degrades faster, usually within several minutes, whereas PDPP-PD degrades much slower. It was found that sonicating or heating the polymer solutions could accelerate the degradation process. For example, the degradation of PDPP-PD can be completed within 30 mins using a bath sonicator at 50° C.

3. Selective Dispersion and SWNT Characterization

General Sorting Procedure for Polymer PF-PD Using Plasma Grown SWNTs:

Example 6

5 mg of PF-PD and 5 mg of plasma grown SWNTs (RN-020, as obtained from Raymor Nanotech, contains 30% SWNTs) were mixed in 25 mL of toluene and ultrasonicated for 30 min at an amplitude level of 50% (Cole Parmer ultrasonicator 750 W). The solution was then centrifuged at 17 000 rpm (22 000 g) for 30 min at 16° C. The supernatants were collected and provided the final sorted s-SWNT solutions.

The absorption spectrum of PF-PD do not overlap with the absorption of metallic SWNTs. Therefore, both the dispersion concentration and the selectivity can be evaluated by UV-Vis-NIR measurement.

General Sorting Procedure for PDPP-PD Using Arc-Discharged SWNTs:

Example 7

5 mg of PDPP-PD and 10 mg of arc-discharged SWNTs (P2-SWNTs, purchased from Carbon Solutions, Inc., contains ~65% SWNTs) were mixed in 25 mL of toluene and ultrasonicated for 30 min at an amplitude level of 70% (Cole Parmer ultrasonicator 750 W). The mixture was then centrifuged at 17 000 rpm for 30 min at 16° C. The supernatant (80%) was collected to afford the final sorted SWNT solution.

The dispersion concentration was evaluated by UV-Vis-NIR measurements using a 1 cm path-length quartz cells with toluene as a background. To determine the selectivity, SWNT thin films on glass substrate were prepared by drop-casting the supernatant on the substrate and annealing the film at 500° C. under Ar for 1 h to remove the wrapping polymers.

General Procedure for Polymer Removal and Recycling:

Example 8

To degrade the wrapping polymers, a small amount of TFA (10 uL) and several drops of water was added to the sorted SWNT solution. The solution was bath sonicated for 0.5~1 h to complete the hydrolysis reaction. SWNT precipitates were formed after polymer degradation. Then the solution was centrifuged at 17 000 rpm for 5 min to sediment the SWNTs. After collecting the supernatant, 20 mL acetone was added. The mixture was sonicated for 10 min in a bath sonicator and centrifuge again to wash the SWNT sediments. Repeating the washing step twice. Then the s-SWNT sediments were collect by filtration.

The sediments produced in the polymer sorting, which contains amorphous carbon, met-SWNTs, and undispersed s-SWNTs, absorbed a significant amount of polymers. To recycle these polymers, 20 mL THF was added to the sediments. The mixture was sonicated for 10 min in a bath sonicator and centrifuge at 17 000 rpm for 15 min to wash the SWNT sediments. Repeating the washing step twice. Then the sediments were removed by filtration.

All the supernatants and filtrates from the above steps were combined for polymer recycling. After removal of the solvents under reduced pressure, the monomers were purified via flash chromatography and provided pure monomers. The purified and cycled monomers can be used for polymerization another time.

Determination of the Sorting Yield and Polymer Cycling Efficiency:

Example 9

50 mg of PF-PD and 50 mg of plasma grown SWNTs (RN-020) were mixed in 25 mL of toluene and ultrasonicated for 30 min at an amplitude level of 50% (Cole Parmer ultrasonicator 750 W) while externally cooled with a dry ice bath. The solution was then centrifuged at 17 000 rpm (22 000 g) for 30 min at 16° C. 80% of the supernatants (20 mL) was collected. Absorption spectroscopy revealed a peak absorption of A=2.486 at λ=939 nm for a d=1 cm cuvette (FIG. 4a).

Following the above polymer removal steps for the supernatants, the sorted SWNTs were finally filtered through a 0.2 um pore-size PTFE membrane, washed with toluene 3 times (30 mL), and dried in vacuum at 60° C. A SWNT film was formed on the membrane. Weighting the SWNT film gives a total mass of 1.41 mg. Thus the SWNT concentration of the sorted solution (20 mL) was calculated to be 0.0705 mg/mL. The optical density at 939 nm was used to calculate the absorbance coefficient (ε, mL mg$^{-1}$ cm$^{-1}$) via Beer-Lambert law: $A = OD_{939} = \varepsilon/c$, where l is the path length (cm) of the cuvette and c is the SWNT concentration (mg/mL). The absorbance coefficient (ε) was determined to be 35.3 mL mg$^{-1}$ cm$^{-1}$, consistent with a recently reported value of 34.9 mL mg$^{-1}$ cm$^{-1}$ for similar type of s-SWNTs. With this absorbance coefficient (ε), the sorting yields for different conditions can be calculated using their absorption peaks at 939 nm. The yield calculated for PF-PD sorted SWNTs was based on the semiconducting SWNT amounts of the raw SWNTs, which is ~20% of the total mass of the raw SWNTs (RN-020).

Raman and PLE Characterization of Sorted SWNTs:

Raman spectroscopy was carried out at 2.33 eV (532 nm), 1.93 eV (638 nm) and 1.58 eV (785 nm) excitation at ×100 magnification and 1-μm spot size. The peak positions were calibrated with the Si line at 521 $cm^{-1}$. The Raman peaks can be assinged to metallic or semiconducting SWNTs according to the Raman Kataura plot. The PLE spectra of various SWNT samples in toluene were taken according to our previous reported method.

Figure 3:
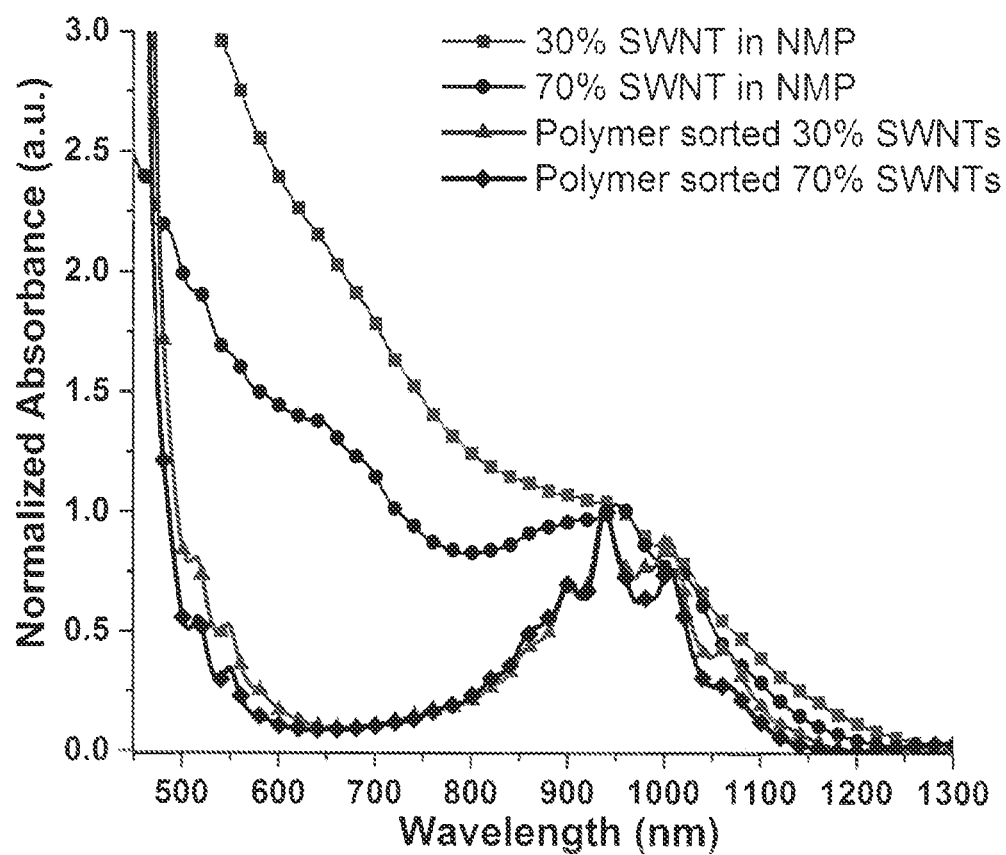

FIG. 3 shows a comparison for using different purity SWNTs under the same conditions (polymer/SWNT ratio=1:1).

As-produced 30% SWNTs (RN-020, 10 USD/g) and Semi-purified SWCNT (RN-220, 60~70% purity, 45 USD/g) were purchased from Raymor Industries Inc. Semi-purified SWNTs display obviously higher SWNT contents than as-produced raw SWNTs, as demonstrated by their NMP dispersed solutions. After PF-PD sorting, 30% SWNTs showed a φ value of 0.407 and a yield of 23.7%, while 70% SWNTs showed a φ value of 0.408 and a yield of 19.8%. The yield calculation was based on the s-SWNT amounts of the total mass of raw SWNTs (for RN-020, the s-SWNTs amount is 20%; for RN-220, the s-SWNT amount is 46%). Therefore, compared with 70% semi-purified SWNTs, 30% raw SWNTs showed very similar selectivity and even higher yield.

Figure 4:
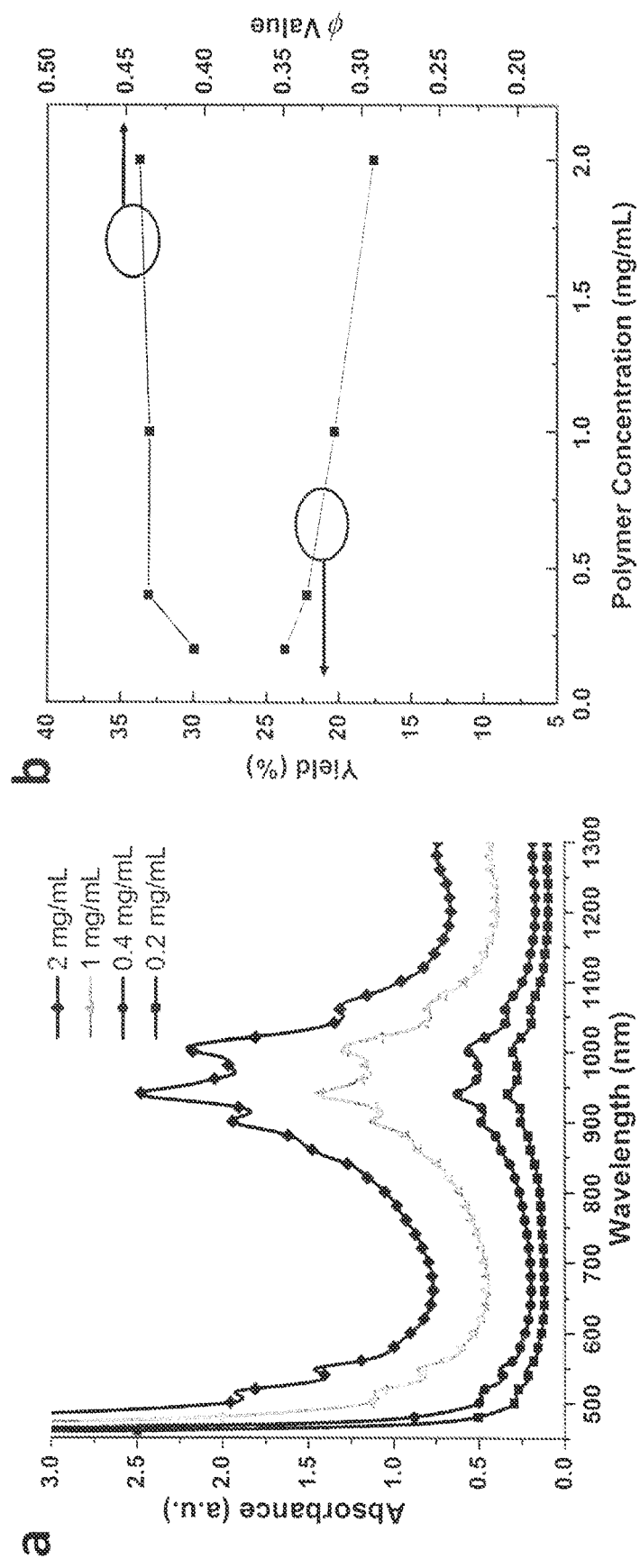

FIG. 4 shows (a) Absorption spectra of raw SWNTs (30% purity) dispersed by PF-PD using different polymer concentrations (polymer/SWNT ratio is 1:1). Spectra were taken in a 1 cm path length cuvette. (b) Plot of yields and φ values for different polymer/SWNT concentrations. Higher concentrations gives lower yield but provides higher throughput for large-scale production.

Figure 5:
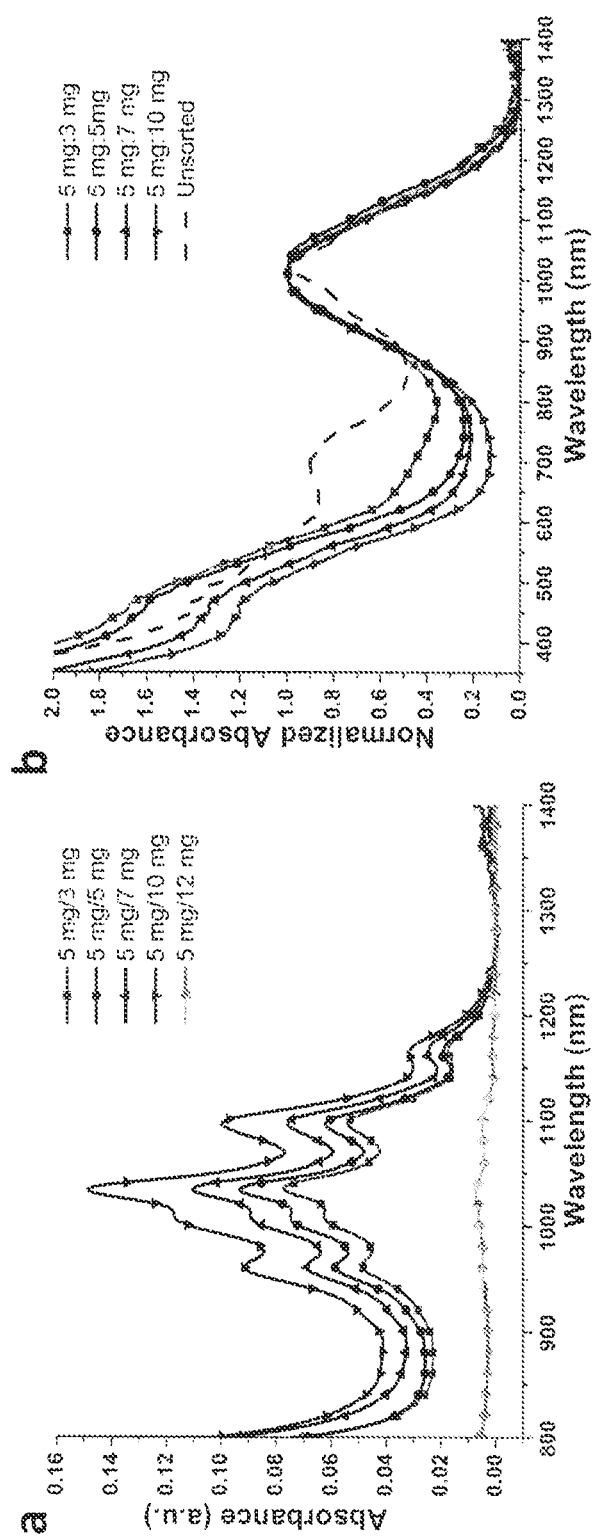

FIG. 5 shows (a) Absorption spectra of SWNTs dispersed by PDPP-PD with various polymer/SWNT ratios in toluene. (b) Normalized absorption spectra of the PDPP-PD sorted SWNT thin films for various polymer/SWNT ratios. The SWNT thin films were prepared by drop-casting the supernatants on glass substrates and then annealing at 500° C. under Ar for 1 h to remove the wrapping polymers.

As the SWNT amount increases while keeping a constant polymer amount, the dispersion concentration first increased and then decreased. The decrease in the dispersion concentration might due to the absorption of the polymers by the excessive carbonaceous sediment, which then decreased the available polymer concentration for sorting in solution. The sorting selectivity is also dependent on the polymer/AD-SWNT ratio, 5 mg/10 mg ratio gives the best selectivity.

Figure 6:
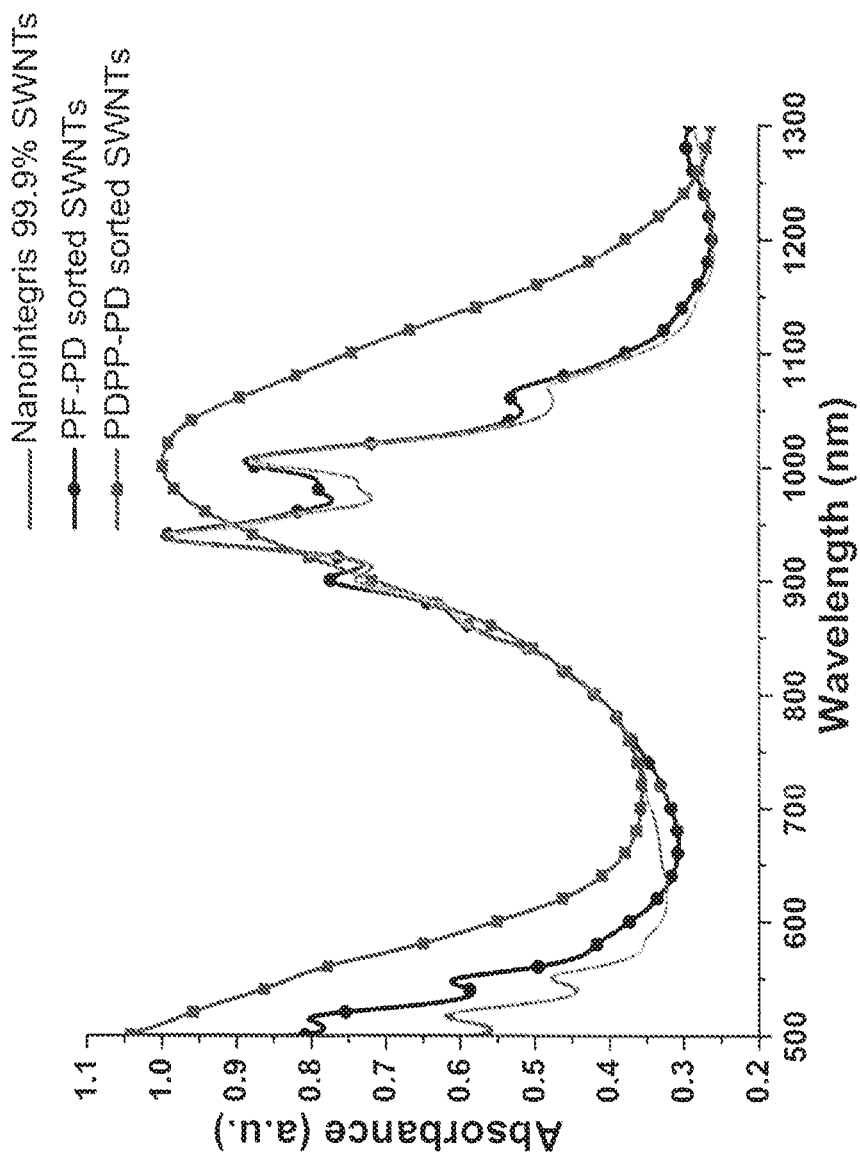

FIG. 6 shows purity comparison of the s-SWNTs dispersed by PF-PD and PDPP-PD with commercial available 99.9% pure s-SWNTs from Nanointegris. PDD-PD sorted s-SWNTs with larger tube diameters showed similar selectivity, while PF-PD sorted s-SWNTs with similar tube diameters showed obviously better selectivity.

Figure 7:
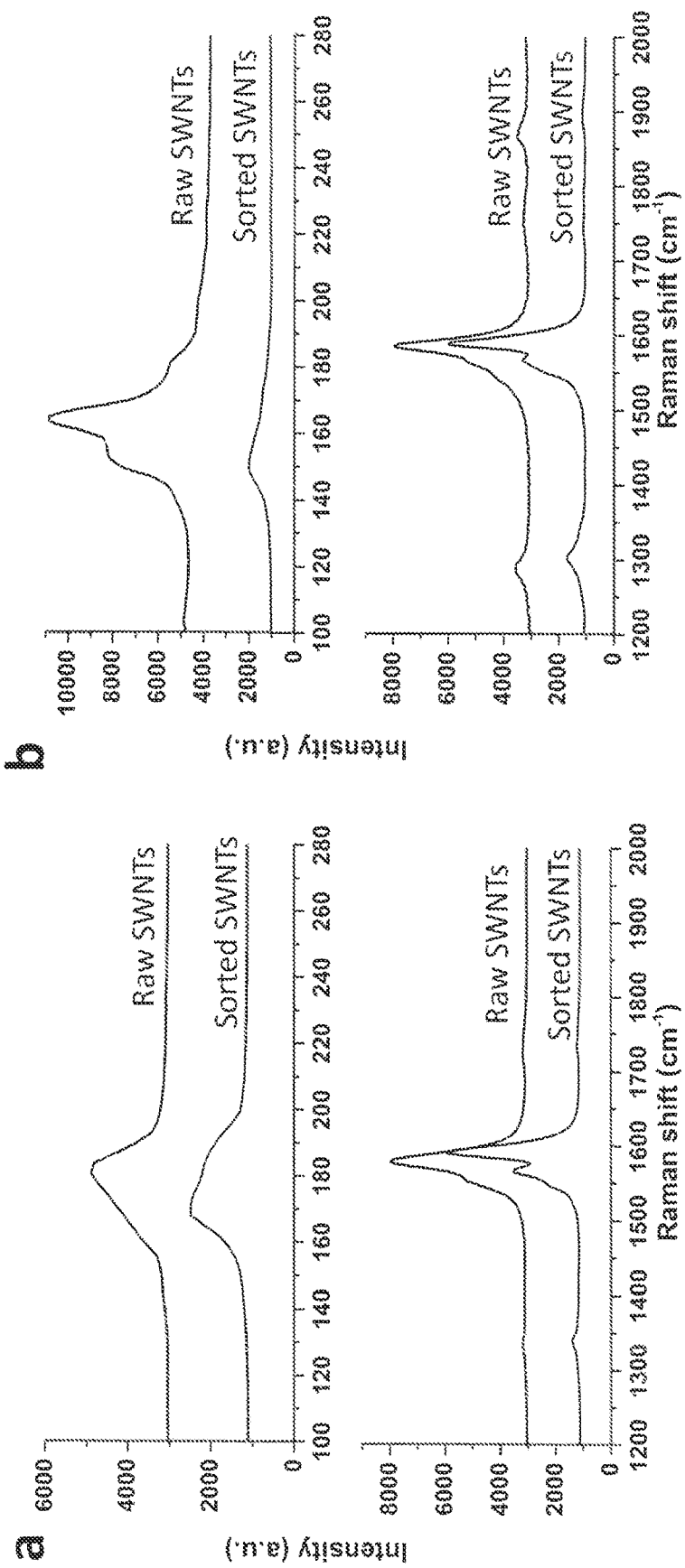

FIG. 7 shows Raman spectra of pristine SWNTs and SWNTs sorted by polymer PF-PD, excited using (a) 532 nm and (b) 638 nm lasers. Under 532 nm and 638 nm excitation, several RBM peaks of s-SWNTs were observed in the range of 150-200 $cm^{-1}$ in the pristine SWNTs. After sorting, some peaks remained and the relative peak intensity also changed, indicating that the polymer prefers to disperse certain chiralities of s-SWNTs. To compare peak intensities of pristine and sorted SWNTs, their $G^+$ peaks were normalized to the same intensity.

Figure 8:
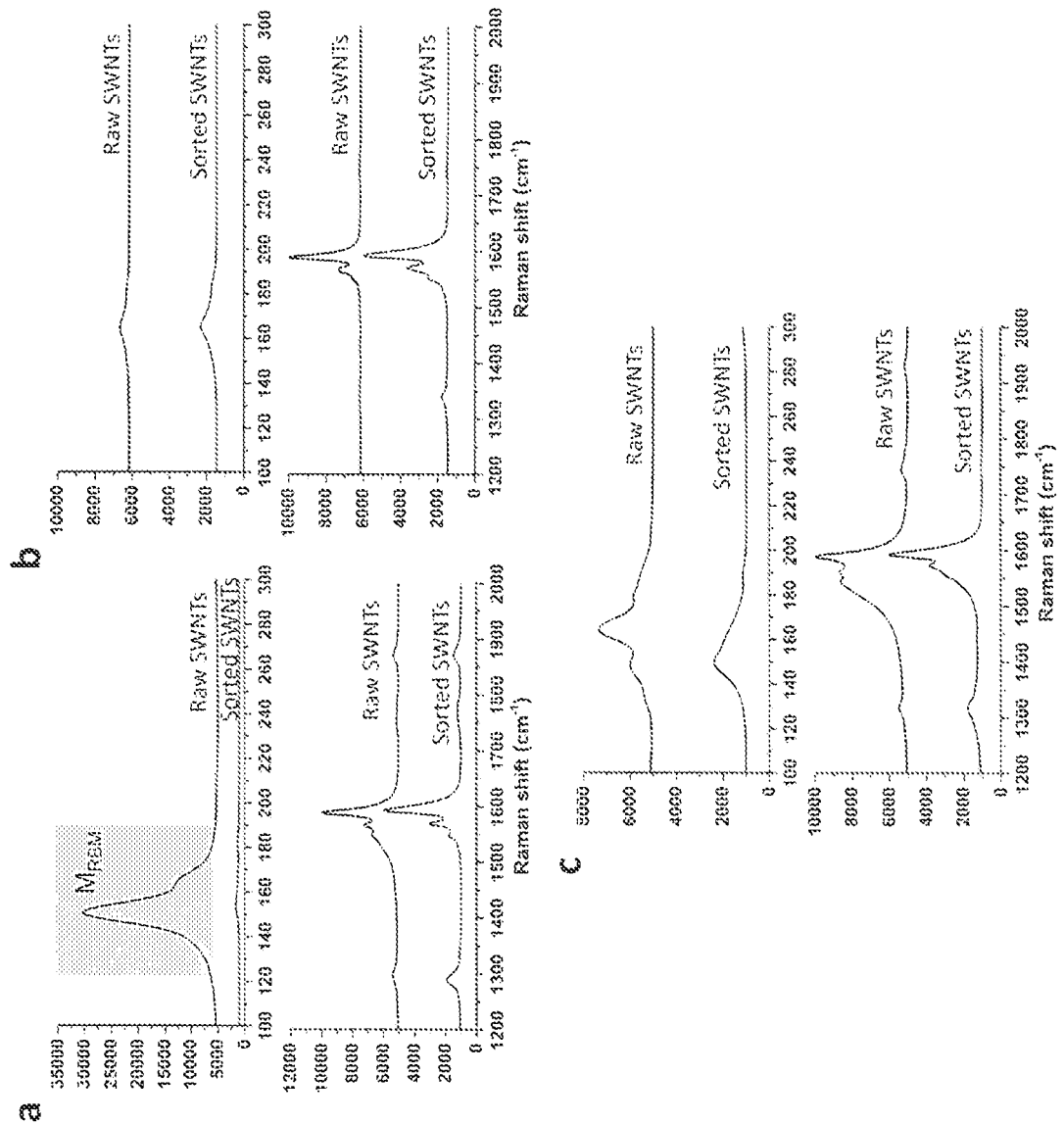

FIG. 8 shows Raman spectra of pristine SWNTs and SWNTs sorted by polymer PDPP-PD, excited using (a) 785 nm, (b) 532 nm and (c) 638 nm lasers. To compare peak intensities of pristine and sorted SWNTs, their $G^+$ peaks were normalized to the same intensity.

Figure 9:
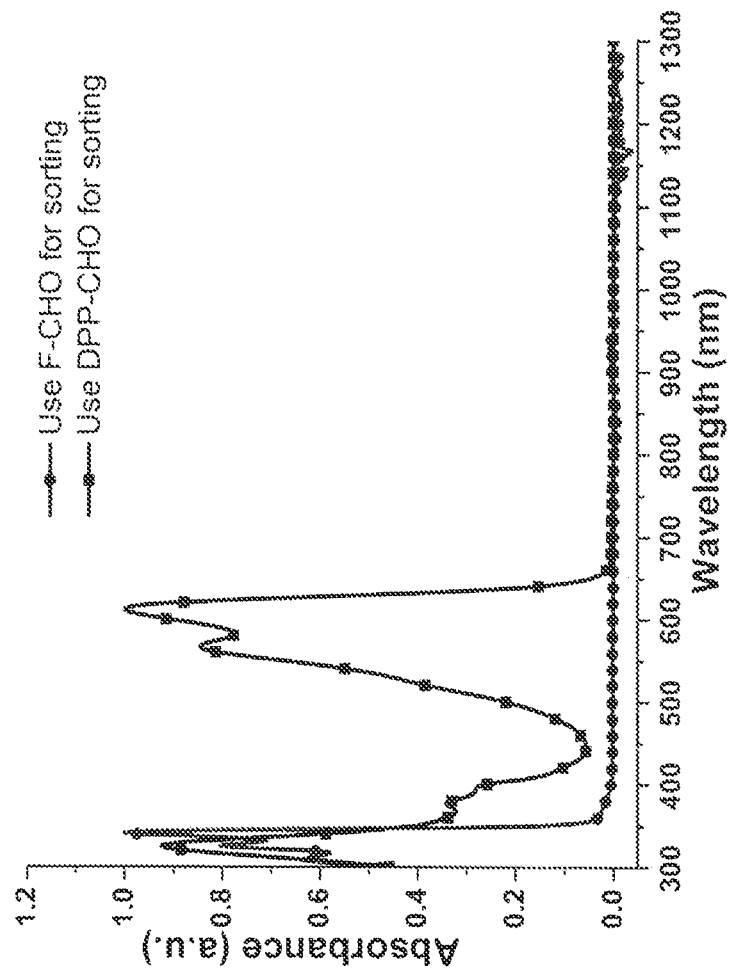

FIG. 9 shows absorption spectra of the solutions using monomers for dispersion. No SWNT absorption was detected, indicating that both monomers cannot disperse any SWNTs.

First the ability of PF-PD to disperse a low-cost raw SWNTs with diameters of 0.9-1.5 nm (RN-020, $10/g from Raymor Industries Inc., ~30% SWNTs purity) was tested. FIG. 10a demonstrates that PF-PD can disperse high concentrations of large-diameter s-SWNTs with barely detectable metallic peak in the $M_{11}$ region. The optical density (OD) at 939 nm for PF-PD sorted SWNTs is up to 2.498 in a 1 cm path length cuvette, corresponding to a SWNT concentration of 0.0705 mg/mL. The OD value is significantly higher than other reported conjugated polymers used for large diameter SWNTs, indicating the strong dispersion ability of PF-PD. Compared with previous sorting methods using more expensive purified SWNTs (50~70% purity, prices are usually 4~8 times higher), the results indicate that as-produced raw SWNTs (30% purity) can be directly used for polymer wrapping without affecting the sorting yield and selectivity (FIG. 3). Polymer/SWNT ratios and concentrations are factors that affect the yield and selectivity of SWNT dispersion. The sorting yield was determined by absorption intensity of the $S_{22}$ peak and calculated relative to s-SWNT amounts of the total mass of SWNTs. The selectivity was evaluated based on φ value, which is defined by the ratio of peak and background area of both $S_{22}$ and $M_{11}$ absorptions. Higher φ values indicate higher s-SWNT purities and φ values>0.40 were correlated to a purity>99%.

FIG. 10b plots the relationship between the yield and selectivity for different polymer/SWNT ratios. Compared with literature reports that reaching high φ values>0.40 usually resulted in low yields (<5%) for large-diameter SWNTs, polymer PF-PD demonstrated both high φ value of 0.407 and high yield of 23.7% simultaneously (polymer/SWNT ratio=1 in FIG. 10b), suggesting the strong dispersion ability and high selectivity of this polymer. Reducing the polymer/SWNT ratios lead to even higher selectivity with a φ value up to 0.445 but relatively lower yield. Polymer/SWNT concentrations were also varied from 0.2 mg/mL to 2 mg/mL (FIG. 4a). Under the same polymer/SWNT ratio (1:1), higher concentration resulted in higher selectivity but lower yield. This inverse relationship between yield and selectivity was also observed in many other polymer systems.

Compared with traditional conjugated polymers, DPP based polymers tend to disperse larger diameter SWNTs. Arc-discharged SWNT were used to investigate the ability of PDPP-PD for dispersing SWNTs (FIG. 5). PDPP-PD can disperse a significant amount of arc-discharged SWNTs with an estimated yield of 2.3%. Because the absorption spectra of DPP based polymers overlap with the $M_{11}$ region of the sorted SWNTs, the polymers were removed by thermally annealing polymer-SWNT films at 500° C. under Ar before estimating the selectivity for different sorting conditions. Since the φ value cannot be directly used to estimate the selectivity for DPP sorted SWNTs due to interference from the polymers, the sorted absorption spectra were compared with that of commercially available 99.9% s-SWNTs (FIG.

6). Both PDPP-PD sorted s-SWNTs and PF-PD sorted s-SWNTs showed similar or even better selectivity compared with the 99.9% s-SWNTs, indicating the high selectivity of the degradable polymers.

To further validate the enrichment of s-SWCNTs, Raman spectra of the pristine SWNTs and the polymer sorted SWNTs were measured (FIG. 10c, FIG. 7, and FIG. 8). Under the 785 nm excitation, strong radial-breathing-mode (RBM) peaks of metallic tubes in the range of 140~190 cm$^{-1}$ were observed for the pristine SWNTs. After sorting, this peak almost disappeared. In the G peak region (1500-1600 cm$^{-1}$), the intensity of G$^-$ peaks mainly from m-SWNTs at 1550 cm$^{-1}$ significantly decreased, whereas the G$^+$ peaks mainly from s-SWNTs at 1600 cm$^{-1}$ remained unchanged. Other laser excitations (532 nm and 633 nm) also confirmed the removal m-SWNTs and the dispersion of certain charilites of s-SWNTs (FIG. 7).

Both dialdehyde monomer of PF-PD and PDPP-PD are not able to disperse SWNTs (FIG. 5), suggesting their weak interactions with SWNTs. To release the s-SWNTs, a catalytic amount of TFA and some DI water were added to the sorted solution. The solution was sonicated to accelerate the hydrolysis reaction. SWNT precipitates were formed after polymer degradation. The SWNT precipitates were centrifuged and collected by filtration though a 0.2 μm PTFE membrane. The absorption spectra of the filtrate only showed the monomer absorption, indicating all the enriched s-SWNTs were quantitatively collected (FIG. 10d). The filtered s-SWNTs can be redispersed in NMP and aqueous solutions using surfactants with almost identical absorption spectra in both $M_{11}$ and $S_{22}$ region (FIG. 10d), indicating that the sorted SWNTs can also be used for NMP or aqueous based deposition methods in electronic applications. No polymers or monomers can be detected by absorption spectroscopy for the redispersed SWNTs in NMP, demonstrating the quantitative removal of the polymers. This result was further confirmed by the by X-ray photoelectron spectroscopy (XPS) measurement of the SWNT solids, where the N 1 s peaks attributed to the N atoms in the polymers disappeared in the released SWNT samples (FIG. 10e). It was found that ~½ to ⅔ of the conjugated polymers were absorbed by the sediments containing undispersed s-SWNTs, m-SWNTs, and amorphous carbons. Thus, to recycle the polymers, polymers in both supernatants and sediments were degraded and filtered. The filtrates can be purified by flash column chromatography to obtain pure monomers for polymer re-synthesis. Almost all of the monomers can be recycled with recycling yield up to 93% after purification, indicating that degradable polymer approach of the invention will effectively lower the polymer costs for SWNT separation.

4. Thin-Film Transistor Characterization of Sorted SWNTs

Example 10

Thin-film transistors (TFTs) were fabricated by drop-casting the PF-PD sorted SWNT solution on patterned Au (source-drain)/SiO$_2$ (300 nm)/doped Si substrates. Then the substrates were rinsed with toluene and annealed at 200° C. for 20 min under ambient conditions. Toluene rinsing was used to remove most of the polymers, which can lead to better tube-tube junctions and improved charge carrier mobility. FIG. 11a displays the atomic force microscopy (AFM) image showing a SWNT network with a tube density ca. 50 tubes/μm$^2$. Most of the sorted tubes exhibited tube lengths in the range of 0.5 to 2 μm. The TFT devices exhibited high hole mobilities in the range of 20-49 cm$^2$ V$^{-1}$ s$^{-1}$ with on/off ratios>10$^5$ (FIG. 11b). Compared to the unsorted raw SWNTs with on/off ratios lower than 10, the high on/off ratio of our sorted s-SWNTs further confirms the high purity of the sorted s-SWNTs.

In summary, imine-based conjugated polymers based on different types of building blocks have been tested for selective dispersion of s-SWNTs. They exhibited strong dispersion ability for large-diameter s-SWNTs with high yield (up to 23.7%) and high selectivity (>99%). The inventive approach offers significant advantages (e.g. low-cost, high-selectivity, recyclable, and less-damage to SWNTs) over other methods but still employs regular building blocks without specific structure design. More importantly, the degradable polymer design can be readily used for other π-conjugated structures, thus demonstrating a general approach for low-cost separation of "clean" s-SWNTs.

FIG. 10a-e show selective dispersion and release of s-SWNTs using PF-PD. (a) Absorption spectra of raw SWNTs (30% purity) dispersed by PF-PD (PF-PD/SWNT ratio=1:1, concentration 2 mg/mL) and NMP. Spectra were taken in a 1 cm path length cuvette. (b) Plot of yields and φ values for different polymer/SWNT ratios (polymer concentration 0.2 mg/mL). (c) Raman spectra of the raw SWNTs and PF-PD sorted SWNTs (excited by 785 nm laser). Polymers were degraded and removed for the sorted SWNTs. (d) Absorption spectra of the as-sorted SWNTs, sorted SWNTs redispersed in NMP and surfactant SC (1% aqueous) polymer PF-PD, and monomer (F-CHO) after polymer degradation. (e) XPS results for the PF-PD wrapped SWNTs and released SWNTs.

FIG. 11b shows transfer characteristics of a typical TFT device (V$_{DS}$=−40V).

The invention claimed is:

1. A process for separating semiconducting single-walled carbon nanotubes from a mixture of semiconducting and metallic single-walled carbon nanotubes, the process comprising:
(i) providing a mixture A of semiconducting and metallic single-walled carbon nanotubes,
(ii) dispersing the mixture A in a solvent using a degradable polymer comprising at least one unit of formula (1):

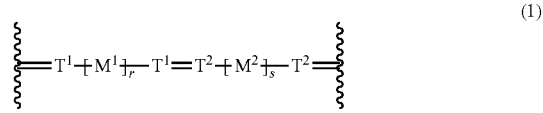

wherein

T$^1$ is a carbon atom or a nitrogen atom,

T$^2$ is a carbon atom if T$^1$ is a nitrogen atom, or is a nitrogen atom if T$^1$ is a carbon atom, r is 1, 2, 3 or 4, s is 1, 2, 3, or 4, wherein M¹ is selected from the group consisting of

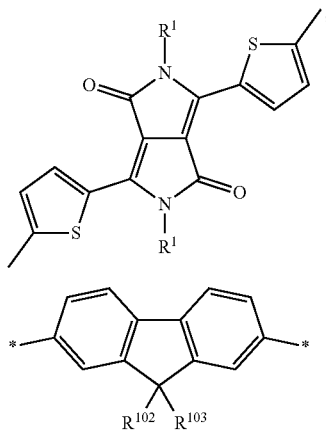

and M² is selected from the group consisting of

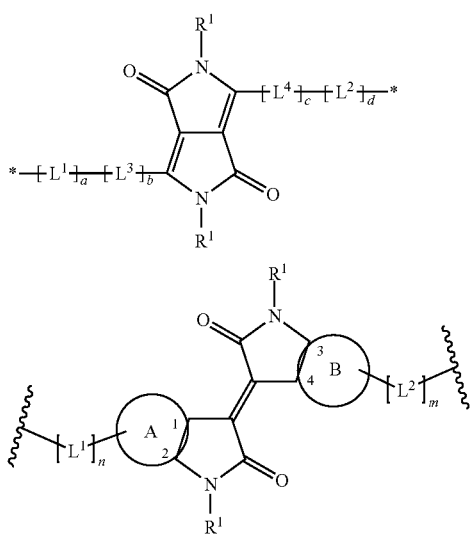

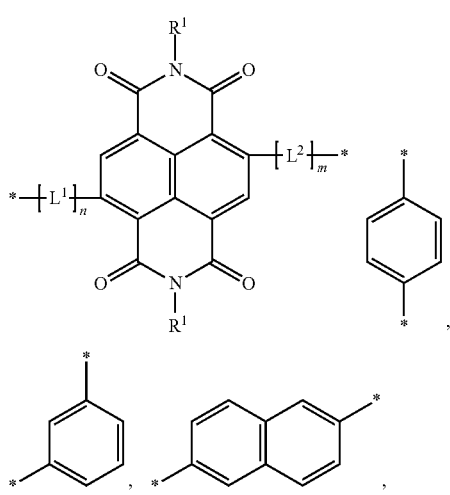

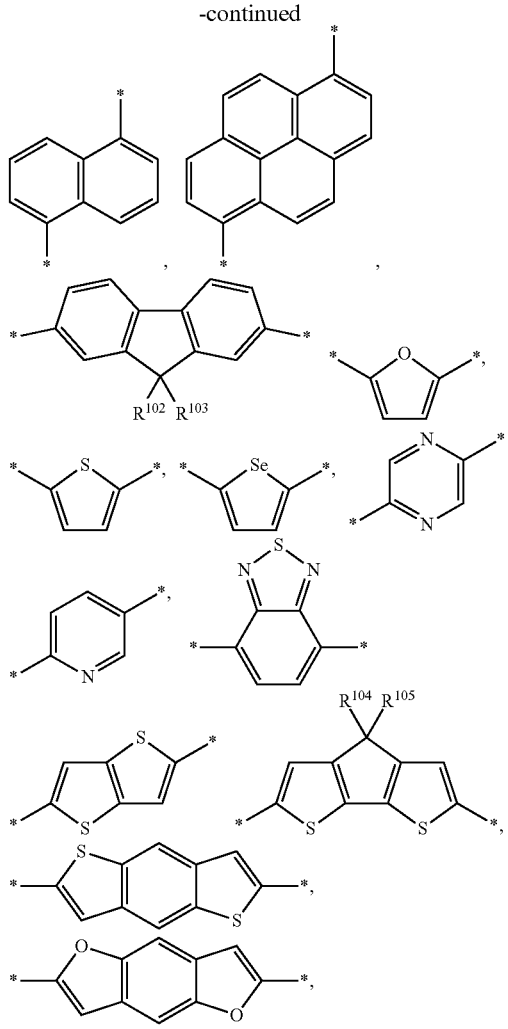

wherein
R¹ is $C_{1-36}$-alkyl,
R¹⁰² and R¹⁰³ are independently selected from the group consisting of H and $C_{1-20}$-alkyl, which is optionally prepared through a direct condensation of diamines comprising r units of M¹ and dialdehydes comprising s units of M² or of dialdehydes comprising r units of M¹ and diamines comprising s units of M², as a dispersing agent to obtain a dispersion B comprising the semiconducting single-walled carbon nanotubes in a solvent, the dispersion B further comprising metallic single-walled carbon nanotubes, (iii) separating the metallic single-walled carbon nanotubes from the dispersion B, to obtain an enriched dispersion C of the semiconducting single-walled carbon nanotubes in a solvent, (iv) degrading by hydrolysis the degradable polymer in the enriched dispersion C, and (v) separating the semiconducting single-walled carbon nanotubes from a solution D comprising a solvent and the degradable polymer.

2. The process according to claim 1,
wherein the mixture A is prepared by arc discharge or a plasma torch process.

3. The process according to claim 1,
where the dispersing is carried out by means of ultrasonication.

4. The process according to claim 1,
wherein the hydrolysis of the degradable polymer in the degrading is aided by ultrasonication.

5. The process according to claim
wherein the solvent in the providing is toluene.

6. The process according to claim 1, further comprising:
(vi) isolating pure monomers (1a) and (2a):

$$H_2N\text{-}[\text{-}M^1\text{-}]_r\text{-}NH_2 \quad (1a)$$

$$OHC\text{-}[\text{-}M^2\text{-}]_s\text{-}CHO \quad (2a)$$

or pure monomers (1b) and (2b)

$$OHC\text{-}[\text{-}M^1\text{-}]_r\text{-}CHO \quad (1b)$$

$$H_2N\text{-}[\text{-}M^2]_s\text{-}NH_2 \quad (2b)$$

from the solution D for re-synthesis of the degradable polymer.

7. The process according to claim 6,
wherein the pure monomers are isolated by flash column chromatography.

* * * * *

UNITED STATES PATENT AND TRADEMARK OFFICE
CERTIFICATE OF CORRECTION

Page 1 of 1

PATENT NO. : 10,889,499 B2
APPLICATION NO. : 15/779380
DATED : January 12, 2021
INVENTOR(S) : Zhenan Bao et al.

It is certified that error appears in the above-identified patent and that said Letters Patent is hereby corrected as shown below:

On the Title Page

Item (71), the Applicant's information is incorrect. Item (71) should read:
--(71) Applicant: The Board of Trustees of the Leland Stanford Junior University Office of the General Counsel, Stanford, CA (US)--

Signed and Sealed this
Twenty-third Day of March, 2021

Drew Hirshfeld
*Performing the Functions and Duties of the*
*Under Secretary of Commerce for Intellectual Property and*
*Director of the United States Patent and Trademark Office*